United States Patent
Lynn et al.

(10) Patent No.: US 10,487,217 B2
(45) Date of Patent: Nov. 26, 2019

(54) SYNTHETIC SURFACES WITH ROBUST AND TUNABLE UNDERWATER SUPEROLEOPHOBICITY

(71) Applicant: Wisconsin Alumni Research Foundation, Madison, WI (US)

(72) Inventors: David Lynn, Middleton, WI (US); Uttam Manna, Madison, WI (US); Matthew Carter, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 408 days.

(21) Appl. No.: 15/192,364

(22) Filed: Jun. 24, 2016

(65) Prior Publication Data

US 2017/0022372 A1    Jan. 26, 2017

Related U.S. Application Data

(60) Provisional application No. 62/184,184, filed on Jun. 24, 2015.

(51) Int. Cl.
```
C09D 5/16       (2006.01)
C09D 139/04     (2006.01)
C09D 179/02     (2006.01)
```
(52) U.S. Cl.
CPC .......... *C09D 5/1681* (2013.01); *C09D 139/04* (2013.01); *C09D 179/02* (2013.01)

(58) Field of Classification Search
CPC .. C09D 5/1668; C09D 5/1681; C09D 5/1693; C09D 139/04; C09D 179/02
See application file for complete search history.

(56) References Cited

U.S. PATENT DOCUMENTS

| | | | |
|---|---|---|---|
| 7,642,285 B2 | 1/2010 | Blackwell et al. | |
| 7,910,622 B2 | 3/2011 | Blackwell et al. | |
| 8,071,210 B2 | 12/2011 | Lynn et al. | |
| 8,269,024 B2 | 9/2012 | Blackwell et al. | |
| 8,367,680 B2 | 2/2013 | Blackwell et al. | |
| 8,624,063 B2 | 1/2014 | Blackwell et al. | |

(Continued)

OTHER PUBLICATIONS

Buck, et al., "Free-Standing and Reactive Thin Films Fabricated by Covalent Layer-by-Layer Assembly and Subsequent Lift-Off of Azlactone-Containing Polymer Multilayers," Langmuir 2010, 26(20), 16134-16140.*

(Continued)

*Primary Examiner* — Fred M Teskin
(74) *Attorney, Agent, or Firm* — Leydig, Voit & Mayer, Ltd.

(57) ABSTRACT

The present invention provides multilayer polymer films, materials and coatings which exhibit robust underwater superoleophobicity and have remarkable structural functional tolerance to a broad range of physical, chemical, and environmental challenges encountered by surfaces deployed in aqueous or aquatic environments. These materials can be fabricated on surfaces of arbitrary shape, size, and composition and provide straightforward means to manipulate surface chemistry and fine-tune other useful features of the interfacial behavior (e.g., underwater oil-adhesiveness). These materials address key obstacles to the application of non-wetting surfaces and anti-fouling 'super-phobic' materials in practical, real-world scenarios.

35 Claims, 17 Drawing Sheets

(56) References Cited

U.S. PATENT DOCUMENTS

| | | |
|---|---|---|
| 8,815,943 B2 | 8/2014 | Blackwell et al. |
| 2017/0022371 A1 | 1/2017 | Lynn et al. |

OTHER PUBLICATIONS

U.S. Appl. No. 15/192,425, filed Jun. 24, 2016, 2017/0022371, Jan. 26, 2017.

U.S. Appl. No. 15/471,628, filed Mar. 28, 2017.

Allen et al. (Mar. 14, 2014) "Targeting virulence: can we make evolution-proof drugs?" Nat. Rev. Microbiol. 12:300-308.

Antipov et al. (2001) "Sustained Release Properties of Polyelectrolyte Multilayer Capsules," J. Phys. Chem. B. 105:2281-2284.

Arciola et al. (2012) "Biofilm formation in Staphylococcus implant infections. A review of molecular mechanisms and implications for biofilm-resistant materials," Biomaterials. 33:5967-5982.

Bae et al. (Dec. 18, 2013) "25th Anniversary Article: Scalable Multiscale Patterned Structures Inspired by Nature: The Role of Hierarchy," Adv. Mater. 26:675-700.

Bai et al. (2011) "Recent Advances in Colloidal and Interfacial Phenomena Involving Liquid Crystals," Langmuir. 27:5719-5738.

Banerjee et al. (2011) "Antifouling Coatings: Recent Developments in the Design of Surfaces That Prevent Fouling by Proteins, Bacteria, and Marine Organisms," Adv. Mater. 23:690-718.

Barthlott et al. (1997) "Purity of the sacred lotus, or escape from contamination in biological surfaces," Planta. 202:1-8.

Bassler et al. (2006) "Bacterially speaking," Cell. 125:237-246.

Bellanger et al. (Jan. 9, 2014) "Chemical and Physical Pathways for the Preparation of Superoleophobic Surfaces and Related Wetting Theories," Chem. Rev. 114:2694-2716.

Bhargava et al. (1996) "Triclosan: applications and safety," Am. J. Infect. Control. 24:209-218.

Bortleson et al. (1972) "Recent sedimentary history of Lake Mendota, Wis," Environ. Sci. Technol. 6:799-808.

Boudou et al. (2010) "Multiple functionalities of polyelectrolyte multilayer films: new biomedical applications," Adv. Mater. 22:441-467.

Brake et al. (2003) "Biomolecular interactions at phospholipid-decorated surfaces of liquid crystals," Science. 302:2094-2097.

Breitbach et al. (2011) "Surface-mediated release of a synthetic small-molecule modulator of bacterial quorum sensing: Gradual release enhances activity," Chem. Comm. 47:370-372.

Brock et al. (1984) "Significance of algal excretory products for growth of epilimnetic bacteria," Appl. Environ. Microbiol. 47:731-734.

Broderick et al. (2012) "Covalent Layer-by-Layer Assembly of Water-Permeable and Water-Impermeable Polymer Multilayers on Highly Water-Soluble and Water-Sensitive Substrates," Chem. Mater. 24:1786-1795.

Broderick et al. (2012) "In situ Synthesis of Oligonucleotide Arrays on Surfaces Coated with Crosslinked Polymer Multilayers," Chem. Mater. 24:938-945.

Broderick et al. (Jan. 20, 2013) "Surface-mediated release of a small-molecule modulator of bacterial biofilm formation: A non-bactericidal approach to inhibiting biofilm formation in Pseudomonas aeruginosa," Adv. Healthcare Mater. 2:993-1000.

Broderick et al. (Jun. 28, 2014) "Surface coatings that promote rapid release of peptide-based AgrC inhibitors for attenuation of quorum sensing in Staphylococcus aureus," Adv. Healthcare Mater. 3:97-105.

Buck et al. (2007) "Layer-by-layer assembly of reactive ultrathin films mediated by click-type reactions of poly(2-alkenyl azlactone)s," Adv. Mater. 19:3951-3955.

Buck et al. (2009) "Chemical Modification of Reactive Multilayered Films Fabricated from Poly(2-alkenyl azlactone)s: Design of Surfaces that Prevent or Promote Mammalian Cell Adhesion and Bacterial Biofilm Growth," Biomacromolecules. 10:1564-1574.

Buck et al. (2010) "Functionalization of Fibers Using Azlactone-Containing Polymers: Layer-by-Layer Fabrication of Reactive Thin Films on the Surfaces of Hair and Cellulose-Based Materials," ACS Appl. Mater. Interfaces. 2:1421-1429.

Buck et al. (2010) "Superhydrophobic thin films fabricated by reactive layer-by-layer assembly of azlactone-functionalized polymers," Chem. Mater. 22:6319-6327.

Buck et al. (Oct. 12, 2011) "Azlactone-functionalized polymers as reactive platforms for the design of advanced materials: Progress in the last ten years," Polym. Chem. 3:66-80.

Busscher et al. (2012) "Biomaterial-associated infection: Locating the finish line in the race for the surface," Sci. Transl. Med. 4:153rv110.

Cai et al. (2014) "Filefish-Inspired Surface Design for Anisotropic Underwater Oleophobicity," Adv. Funct. Mater. 24(6):809-816.

Camilli et al. (2006) "Bacterial small-molecule signaling pathways," Science. 311:1113-1116.

Campoccia et al. (Aug. 15, 2013) "A review of the biomaterials technologies for infection-resistant surfaces," Biomaterials. 34:8533-8554.

Cassie et al. (1944) "Wettability of porous surfaces," Trans. Faraday Soc. 40:546-551.

Chapman et al. (2000) "Surveying for Surfaces that Resist the Adsorption of Proteins," J. Am. Chem. Soc. 122:8303-8304.

Chu et al. (Jan. 31, 2014) "Superamphiphobic surfaces," Chem. Soc. Rev. 43:2784-2798.

Chung et al. (2002) "Methods of Loading and Releasing Low Molecular Weight Cationic Molecules in Weak Polyelectrolyte Multilayer Films," Langmuir. 18:1176-1183.

Clatworthy et al. (2007) "Targeting virulence: a new paradigm for antimicrobial therapy," Nat. Chem. Biol. 3:541-548.

Costerton et al. (1999) "Bacterial biofilms: A common cause of persistent infections," Science. 284:1318-1322.

Daniel et al. (Jun. 2013) "Lubricant-infused micro/nano-structured surfaces with tunable dynamic omniphobicity at high temperatures," Appl. Phys. Lett. 102:231603.

De Kievit et al. (2001) "Quorum-sensing genes in Pseudomonas aeruginosa biofilms: their role and expression patterns," Appl. Environ. Microbiol. 67:1865-1873.

Deng et al. (2010) "Laundering Durability of Superhydrophobic Cotton Fabric," Adv. Mater. 22:5473-5477.

Deng et al. (2011) "Transparent, Thermally Stable and Mechanically Robust Superhydrophobic Surfaces Made from Porous Silica Capsules," Adv. Mater. 23:2962-2965.

Deng et al. (2012) "Candle soot as a template for a transparent robust superamphiphobic coating," Science. 335:67-70.

Eibergen et al. (Oct. 13, 2015) "Potent and selective modulation of the RhlR quorum sensing receptor by using non-native ligands: An emerging target for virulence control in Pseudomonas aeruginosa," ChemBioChem. 16(16):2348-2356.

Epstein et al. (2012) "Liquid-infused structured surfaces with exceptional anti-biofouling performance," Proc. Natl. Acad. Sci. USA. 109:13182-13187.

Feng et al. (2002) "Super-Hydrophobic Surfaces: From Natural to Artificial," Adv. Mater. 14:1857-1860.

Frei et al. (2012) "2-Aminobenzimidazole derivatives strongly inhibit and disperse Pseudomonas aeruginosa biofilms," Angew. Chem. Int. Ed. 51:5226-5229.

Gao et al. (2004) "Biophysics: Water-repellent legs of water striders," Nature. 432:36.

Genzer et al. (2000) "Creating long-lived superhydrophobic polymer surfaces through mechanically assembled monolayers," Science. 290:2130-2133.

Geske et al. (2008) "Comparative analyses of N-acylated homoserine Lactones reveal unique structural features that dictate their ability to activate or inhibit quorum sensing," ChemBioChem. 9:389-400.

Geske et al. (2008) "Evaluation of a focused library of N-aryl L-homoserine lactones reveals a new set of potent quorum sensing modulators," Bioorg. Med. Chem. Lett. 18:5978-5981.

Glavan et al. (Jul. 26, 2013) "Omniphobic 'RF Paper' Produced by Silanization of Paper with Fluoroalkyltrichlorosilanes," Adv. Funct. Mater. 24:60-70.

Grinthal et al. (Oct. 14, 2013) "Mobile interfaces: Liquids as a perfect structural material for multifunctional, antifouling surfaces," Chem. Mater. 26:698-708.

(56) References Cited

OTHER PUBLICATIONS

Heilmann et al. (1984) "Chemistry of alkenyl azlactones. I. Radiation-sensitive materials derived from azlactone-containing copolymers," J. Polym. Sci. Part A. 22(5):1179-1186.
Heilmann et al. (1998) "The chemistry of 2-alkenyl-5(4H)-oxazolones. VIII acid-catalyzed reaction with alcohols," Tetrahedron. 54(40):12151-12160.
Heilmann et al. (2001) "Chemistry and technology of 2-alkenyl azlactones," J. Polymer Sci. Part A. 39(21):3655-3677.
Holloway (1955) "Genetic recombination in Pseudomonas aeruginosa," J. Gen. Microbiol. 13:572-581.
Howell et al. (Feb. 4, 2015) "Stability of Surface-Immobilized Lubricant Interfaces under Flow," Chem. Mater. 27:1792-1800.
Howell et al. (Jul. 23, 2014) "Self-Replenishing Vascularized Fouling-Release Surfaces," ACS Appl. Mater. Inter. 6:13299-13307.
Huang et al. (2011) "Controllable Underwater Oil-Adhesion-Interface Films Assembled from Nonspherical Particles," Adv. Funct. Mater. 21:4436-4441.
Huang et al. (Sep. 4, 2013) "Omniphobic slippery coatings based on lubricant-infused porous polyelectrolyte multilayers," ACS Macro Lett. 2:826-829.
Ionov et al. (2012) "Self-healing superhydrophobic materials," Phys. Chem. Chem. Phys. 14:10497-10502.
Jewell et al. (2008) "Multilayered polyelectrolyte assemblies as platforms for the delivery of DNA and other nucleic acid-based therapeutics," Adv. Drug Deliver. Rev. 60:979-999.
Ji et al. (2006) "Fabrication of a Superhydrophobic Surface from the Amplified Exponential Growth of a Multilayer," Adv. Mater. 18:1441-1444.
Jin et al. (2011) "Underwater Oil Capture by a Three-Dimensional Network Architectured Organosilane Surface," Adv. Mater. 23:2861-2864.
Jisr et al. (2005) "Hydrophobic and Ultrahydrophobic Multilayer Thin Films from Perfluorinated Polyelectrolytes," Angew. Chem. Int. Ed. 44:782-785.
Johnston et al. (2007) "Assembling DNA into Advanced Materials: From Nanostructured Films to Biosensing and Delivery Systems," Adv. Mater. 19 :3727-3730.
Jones et al. (2000) "Triclosan: A review of effectiveness and safety in health care settings," Am. J. Infect. Control. 28:184-196.
Jung et al. (2009) "Wetting Behavior of Water and Oil Droplets in Three-Phase Interfaces for Hydrophobicity/philicity and Oleophobicity/philicity," Langmuir. 25:14165-14173.
Kharlampieva et al. (2004) "Release of a Dye from Hydrogen-Bonded and Electrostatically Assembled Polymer Films Triggered by Adsorption of a Polyelectrolyte," Langmuir. 20:9677-9685.
Kim et al. (2012) "Liquid-Infused Nanostructured Surfaces with Extreme Anti-Ice and Anti-Frost Performance," ACS Nano. 6:6569-6577.
Kim et al. (2013) "Hierarchical or Not? Effect of the Length Scale and Hierarchy of the Surface Roughness on Omniphobicity of Lubricant-Infused Substrates," Nano Lett. 13:1793-1799.
Kim et al. (2008) "Hydrogen-Bonding Layer-by-Layer-Assembled Biodegradable Polymeric Micelles as Drug Delivery Vehicles from Surfaces," ACS Nano. 2:386-392.
Kojic et al. (2004) "Candida infections of medical devices," Clin. Microbiol. Rev. 17:255-267.
Kool et al. (Nov. 12, 2013) "Fast Hydrazone Reactants: Electronic and Acid/Base Effects Strongly Influence Rate at Biological pH," Journal of the American Chemical Society. 135(47):17663-17666.
Kota et al. (2012) "Hygro-responsive membranes for effective oil-water separation," Nat. Commun. 3:1025.
Kratochvil et al. (Aug. 26, 2015) "Nanoporous superhydrophobic coatings that promote the extended release of water-labile quorum sensing inhibitors and enable long-term modulation of quorum sensing in *Staphylococcus aureus*," ACS Biomater. Sci. Eng. 1:1039-1049.
Leslie et al. (Oct. 12, 2014) "A bioinspired omniphobic surface coating on medical devices prevents thrombosis and biofouling," Nat. Biotechnol. 32:1134-1140.

Levkin et al. (2009) "Porous Polymer Coatings: a Versatile Approach to Superhydrophobic Surfaces," Adv. Funct. Mater. 19:1993-1998.
Li et al. (2010) "Bioinspired self-healing superhydrophobic coatings," Angew. Chem. Int. Ed. 49:6129-6133.
Li et al. (2012) "Printable Superhydrophilic-Superhydrophobic Micropatterns Based on Supported Lipid Layers," Langmuir. 28:8286-8291.
Li et al. (Dec. 18, 2014) "Reactive superhydrophobic surface and its photoinduced disulfide-ene and thiol-ene (bio)functionalization," Nano Lett. 15:675-681.
Li et al. (Jul. 5, 2013) "Hydrophobic liquid-infused porous polymer surfaces for antibacterial applications," ACS Appl. Mater. Interfaces 5:6704-6711.
Lin et al. (2010) "Bio-inspired hierarchical macromolecule-nanoclay hydrogels for robust underwater superoleophobicity," Adv. Mater. 22:4826-4830.
Lin et al. (2011) "Endotoxin-induced structural transformations in liquid crystalline droplets," Science. 332:1297-1300.
Lipinski (2000) "Drug-like properties and the causes of poor solubility and poor permeability," Journal of Pharmacological and Toxicological Methods. 44:235-249.
Liu et al. (2008) "Ultrathin Multilayered Films that Promote the Release of Two DNA Constructs with Separate and Distinct Release Profiles," Adv. Mater. 20:4148-4153.
Liu et al. (2009) "Bioinspired Design of a Superoleophobic and Low Adhesive Water/Solid Interface," Adv. Mater. 21:665-669.
Liu et al. (2010) "Recent developments in bio-inspired special wettability," Chem. Soc. Rev. 39:3240-3255.
Liu et al. (2012) "Bioinspired oil strider floating at the oil/water interface supported by huge superoleophobic force," ACS Nano. 6:5614-5620.
Liu et al. (2012) "Bio-Inspired Self-Cleaning Surfaces," Ann. Rev. Mater. Res. 42:231-263.
Liu et al. (2012) "Clam's shell inspired high-energy inorganic coatings with underwater low adhesive superoleophobicity," Adv. Mater. 24:3401-3405.
Liu et al. (2012) "Complementary effects of nanosilver and superhydrophobic coatings on the prevention of marine bacterial adhesion," ACS Appl. Mater. Interfaces. 4:4683-4690.
Liu et al. (Jun. 17, 2013) "Organogel-based thin films for self-cleaning on various surfaces," Adv. Mater. 25:4477-4481.
Lynn (2007) "Peeling Back the Layers: Controlled Erosion and Triggered Disassembly of Multilayered Polyelectrolyte Thin Films," Adv. Mater. 19:4118-4130.
Ma et al. (Feb. 11, 2014) "Substrate-Independent Underwater Superoleophobic Surfaces Inspired by Fish-Skin and Mussel-Adhesives," Adv. Mater. Interfaces. 1:1300092.
MacDonald et al. (2008) "Release of a model protein from biodegradable self assembled films for surface delivery applications," J. Control. Release. 131:228-234.
Manna et al. (2008) "Encapsulation of Uncharged Water-Insoluble Organic Substance in Polymeric Membrane Capsules via Layer-by-Layer Approach," J. Phys. Chem. B. 112:13258-13262.
Manna et al. (2012) "Chemical Patterning and Physical Refinement of Reactive Superhydrophobic Surfaces," Adv. Mater. 24:4291-4295.
Manna et al. (Apr. 27, 2016) "Slippery liquid-infused porous surfaces that prevent microbial surface fouling and kill non-adherent pathogens in surrounding media: A controlled release approach," Advanced Functional Materials. 26(21):3599-3611.
Manna et al. (Apr. 8, 2015) "Fabrication of liquid-infused surfaces using reactive polymer multilayers: Principles for manipulating the behaviors and mobilities of aqueous fluids on slippery liquid interfaces," Adv. Mater. 27:3007-3012.
Manna et al. (Aug. 13, 2013) "Restoration of Superhydrophobicity in Crushed Polymer Films by Treatment with Water: Self-Healing and Recovery of Damaged Topographic Features Aided by an Unlikely Source," Adv. Mater. 25:5104-5108.
Manna et al. (Aug. 25, 2013) "Superhydrophobic polymer multilayers that promote the extended, long-term release of embedded water-soluble agents," Adv. Mater. 25:6405-6409.

(56) References Cited

OTHER PUBLICATIONS

Manna et al. (Feb. 4, 2015) "Synthetic Surfaces with Robust and Tunable Underwater Superoleophobicity," Adv. Funct. Mater. 25:1672-1681.
Mattmann et al. (2011) "Potent and selective synthetic modulators of a quorum sensing repressor in Pseudomonas aeruginosa identified from second-generation libraries of N-acylated L-homoserine lactones," ChemBioChem. 12:942-949.
Mavor et al. (2005) "Systemic fungal infections caused by *Candida* species: epidemiology, infection process and virulence attributes," Curr. Drug Targ. 6:863-874.
Mellbye et al. (Dec. 27, 2013) "Physiological framework for the regulation of quorum sensing-dependent public goods in Pseudomonas aeruginosa," J. Bacterial. 196:1155-1164.
Moore et al. (Oct. 22, 2015) "A comparative analysis of synthetic quorum sensing modulators in Pseudomonas aeruginosa: New insights into mechanism, active efflux susceptibility, phenotypic response, and next-generation ligand design," J. Am. Chem. Soc. 137:14626-14639.
Muh et al. (2006) "Novel Pseudomonas aeruginosa quorum-sensing inhibitors identified in an ultra-high-throughput screen," Antimicrob. Agents Chemother. 50:3674-3679.
Ng et al. (2009) "Bacterial quorum-sensing network architectures," Annu. Rev. Genet. 43:197-222.
Nicolle (2005) "Catheter-related urinary tract infection," Drug. Aging. 22:627-639.
Nishimoto et al. (Oct. 23, 2013) "Bioinspired self-cleaning surfaces with superhydrophobicity, superoleophobicity, and superhydrophilicity," RSC Adv. 3:671-690.
O'Reilly et al. (Nov. 2, 2015) "Structure-Based Design and Biological Evaluation of Triphenyl Scaffold-Based Hybrid Compounds as Hydrolytically Stable Modulators of a LuxR-Type Quorum Sensing Receptor," ACS Infect. Dis. 2:32-38.
O'Loughlin et al. (Oct. 29, 2013) "A quorum-sensing inhibitor blocks Pseudomonas aeruginosa virulence and biofilm formation," Proc. Natl. Acad. Sci. USA. 110:17981-17986.
Orner et al. (2004) "Arrays for the Combinatorial Exploration of Cell Adhesion," J. Am. Chem. Soc. 126:10808-10809.
Parker et al. (2001) "Water capture by a desert beetle," Nature. 414:33-34.
Passerini et al. (1992) "Biofilms on indwelling vascular catheters," Crit. Care Med. 20:665-673.
Peeters et al. (2008) "Comparison of multiple methods for quantification of microbial biofilms grown in microtiter plates," J. Microbiol. Meth. 72:157-165.
Pereira et al. (May 20, 2014) "Brønsted acid catalyzed azlactone ring opening by nucleophiles," Tetrahedron. 70(20):3271-.
Ramage et al. (2005) "Candida biofilms: an update," Eukaryot. Cell. 4:633-638.
Ramage et al. (2009) "Our current understanding of fungal biofilms," Crit. Rev. Microbiol. 35:340-355.
Rasmussen et al. (1984) "Chemistry of alkenylazlactones, 2 Reaction with thiols," Makromol. Chem. Rapid Commun. 5(2):67-70.
Schmitt et al. (Feb. 15, 2016) "Peptide Conjugation to a Polymer Coating via Native Chemical Ligation of Azlactones for Cell Culture," Biomacromolecules. 17(3):1040-1047.
Schmitt et al. (May 20, 2015) "Polyethylene Glycol Coatings on Plastic Substrates for Chemically Defined Stem Cell Culture," Adv. Healthcare Mater. 4(10):1555-1564.
Seon et al. (Nov. 18, 2015) "Polyelectrolyte Multilayers: A Versatile Tool for Preparing Antimicrobial Coatings," Langmuir. 31:12856-12872.
Shen et al. (2012) "Asymmetric free-standing film with multifunctional anti-bacterial and self-cleaning properties," ACS Appl. Mater. Interfaces. 4:4476-4483.
Smith et al. (2009) "Layer-by-layer platform technology for small-molecule delivery," Angew. Chem. Int. Ed. 48:8974-8977.
Smith et al. (Dec. 17, 2012) "Droplet mobility on lubricant-impregnated surfaces," Soft Matter. 9:1772-1780.
Soike et al. (2010) "Engineering a Material Surface for Drug Delivery and Imaging using Layer-by-Layer Assembly of Functionalized Nanoparticles," Adv. Mater. 22:1392-1397.
Stacy et al. (2012) "Attenuation of quorum sensing in the pathogen Acinetobacter baumannii using non-native N-acyl homoserine lactones," ACS Chem. Biol. 7:1719-1728.
Starkey et al. (Aug. 21, 2014) "Identification of Anti-virulence Compounds That Disrupt Quorum-Sensing Regulated Acute and Persistent Pathogenicity," PLoS Pathog. 10(8):e1004321. pp. 1-17.
Subramanyam et al. (Sep. 26, 2013) "Ice Adhesion on Lubricant-Impregnated Textured Surfaces," Langmuir. 29:13414-13418.
Sun et al. (2010) "Release of DNA from polyelectrolyte multilayers fabricated using 'charge-shifting' cationic polymers: Tunable temporal control and sequential, multi-agent release," J. Control. Release. 148:91-100.
Sunny et al. (Sep. 1, 2014) "Lubricant-infused nanoparticulate coatings assembled by layer-by-layer deposition," Adv. Funct. Mater. 24:6658-6667.
Taff et al. (2012) "Comparative analysis of Candida biofilm quantitation assays," Med. Mycology. 50:214-218.
Tian et al. (Jul. 8, 2014) "Interfacial Material System Exhibiting Superwettability," Adv. Mater. 26:6872-6897.
Timonen eet al. (Jul. 19, 2013) "Switchable Static and Dynamic Self-Assembly of Magnetic Droplets on Superhydrophobic Surfaces," Science. 341:253-257.
Tuteja et al. (2007) "Designing superoleophobic surfaces," Science. 318:1618-1622.
Ueda et al. (Jan. 23, 2013) "Emerging applications of superhydrophilic-superhydrophobic micropatterns," Adv. Mater. 25:1234-1247.
Ueda et al. (May 28, 2013) "Micropatterning hydrophobic liquid on a porous polymer surface for long-term selective cell-repellency," Adv. Healthcare Mater. 2(11):1425-1429.
Verho et al. (2011) "Mechanically Durable Superhydrophobic Surfaces," Adv. Mater. 23:673-678.
Vogel et al. (Jul. 31, 2013) "Transparency and damage tolerance of patternable omniphobic lubricated surfaces based on inverse colloidal monolayers," Nat. Commun. 4:2176.
Wei et al. (Sep. 18, 2014) "Supramolecular polymers as surface coatings: Rapid fabrication of healable superhydrophobic and slippery surfaces," Adv. Mater. 26:7358-7364.
Welsh et al. (Feb. 18, 2016) "Chemical genetics reveals environment-specific roles for quorum sensing circuits in Pseudomonas aeruginosa," Cell Chem. Biol. 23:361-369.
Welsh et al. (Jan. 9, 2015) "Small molecule disruption of quorum sensing cross-regulation in Pseudomonas aeruginosa causes major and unexpected alterations to virulence phenotypes," J. Am. Chem. Soc. 137:1510-1519.
Wenzel (1936) "Resistance of Solid Surfaces to Wetting by Water," Ind. Eng. Chem. 28:988-994.
Wong et al. (2011) "Bioinspired self-repairing slippery surfaces with pressure-stable omniphobicity," Nature. 477:443-447.
Xiao et al. (Sep. 25, 2013) "Slippery liquid-infused porous surfaces showing marine antibiofouling properties," ACS Appl. Mater. Interfaces. 5:10074-10080.
Xin et al. (2012) "Schiff's base as a stimuli-responsive linker in polymer chemistry," Polymer Chemistry. 3(11):3045-3055.
Xu et al. (May 17, 2013) "Nacre-Inspired Design of Mechanical Stable Coating with Underwater Superoleophobicity," ACS Nano. 7:5077-5083.
Xu et al. (Nov. 7, 2012) "An Ion-Induced Low-Oil-Adhesion Organic/Inorganic Hybrid Film for Stable Superoleophobicity in Seawater," Adv. Mater. 25:606-611.
Yao et al. (2011) "Applications of Bio-Inspired Special Wettable Surfaces," Adv. Mater. 23:719-734.
Yao et al. (Apr. 7, 2013) "Adaptive fluid-infused porous films with tunable transparency and wettability," Nat. Mater. 12:529-534.
Yao et al. (Dec. 17, 2013) "Temperature-Driven Switching of Water Adhesion on Organogel Surface," Adv. Mater. 26:1895-1900.
Yohe et al. (2012) "3D superhydrophobic electrospun meshes as reinforcement materials for sustained local drug delivery against colorectal cancer cells," J. Control. Release. 162:92-101.

(56) References Cited

OTHER PUBLICATIONS

Yohe et al. (2012) "Superhydrophobic Materials for Tunable Drug Release: Using Displacement of Air to Control Delivey Rates," J. Am. Chem. Soc. 134:2016-2016.
Yohe et al. (2013) "A Mechanistic Study of Wetting Superhydrophobic Porous 3D Meshes," Adv. Funct. Mater. 23:3628-3637.
You et al. (Sep. 4, 2014) "Fabrication of a Micro-omnifluidic Device by Omniphilic/Omniphobic Patterning on Nanostructured Surfaces," ACS Nano. 8:9016-9024.
Yuan et al. (2008) "Superwetting nanowire membranes for selective absorption," Nat. Nanotechnol. 3:332-336.
Zelikin (2010) "Drug Releasing Polymer Thin Films: New Era of Surface-Mediated Drug Delivery," ACS Nano. 4:2494-2509.
Zhai et al. (2004) "Stable Superhydrophobic Coatings from Polyelectrolyte Multilayers," Nano Lett. 4:1349-1353.
Zhai et al. (2006) "Patterned Superhydrophobic Surfaces: Toward a Synthetic Mimic of the Namib Desert Beetle," Nano Lett. 6:1213-1217.
Zhang et al. (Feb. 18, 2013) "Superhydrophobic and Superoleophilic PVDF Membranes for Effective Separation of Water-in-Oil Emulsions with High Flux," Adv. Mater. 25:2071-2076.
Zhang et al. (Oct. 2, 2013) "Nepenthes Pitcher Inspired Anti-Wetting Silicone Nanofilaments Coatings: Preparation, Unique Anti-Wetting and Self-Cleaning Behaviors," Adv. Funct. Mater. 24:1074-1080.

\* cited by examiner

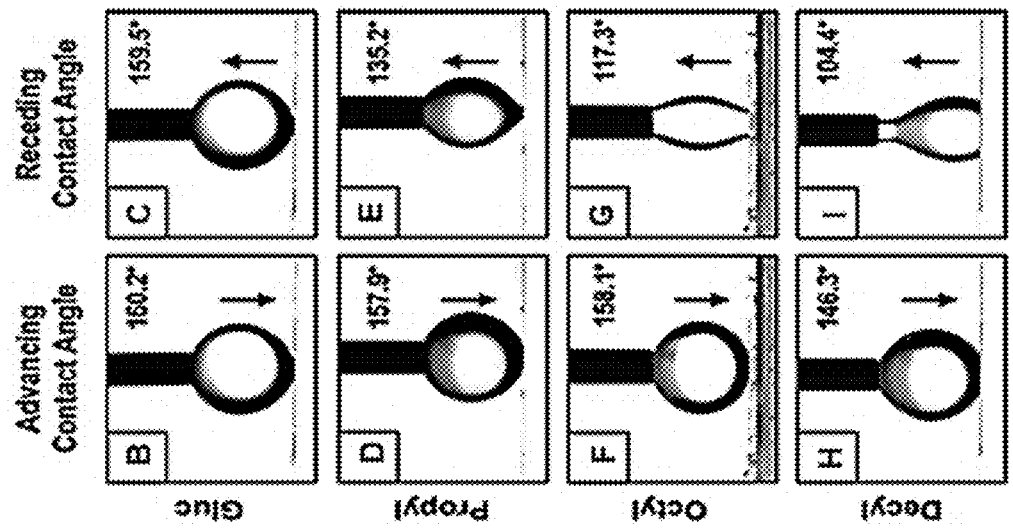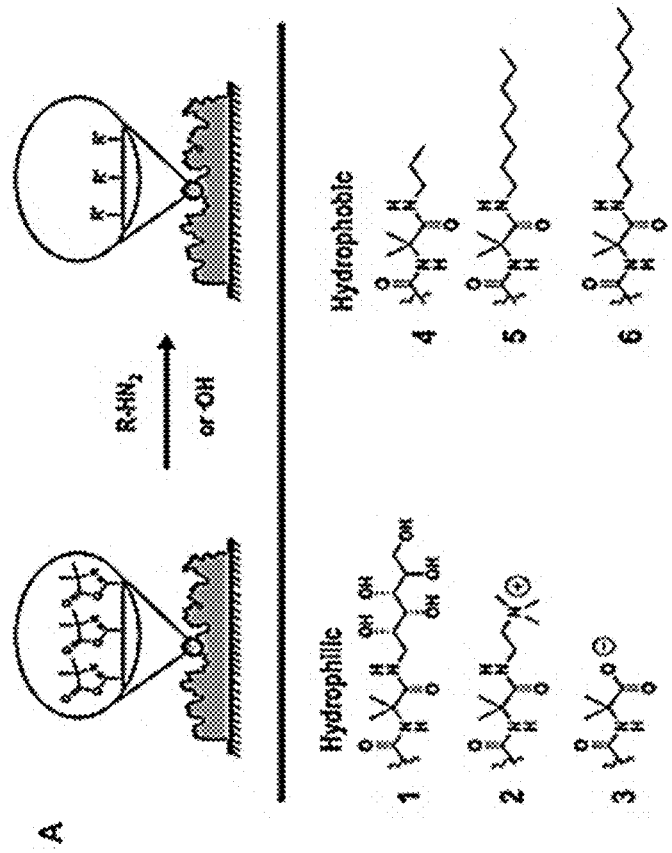
Figs. 3A-3I

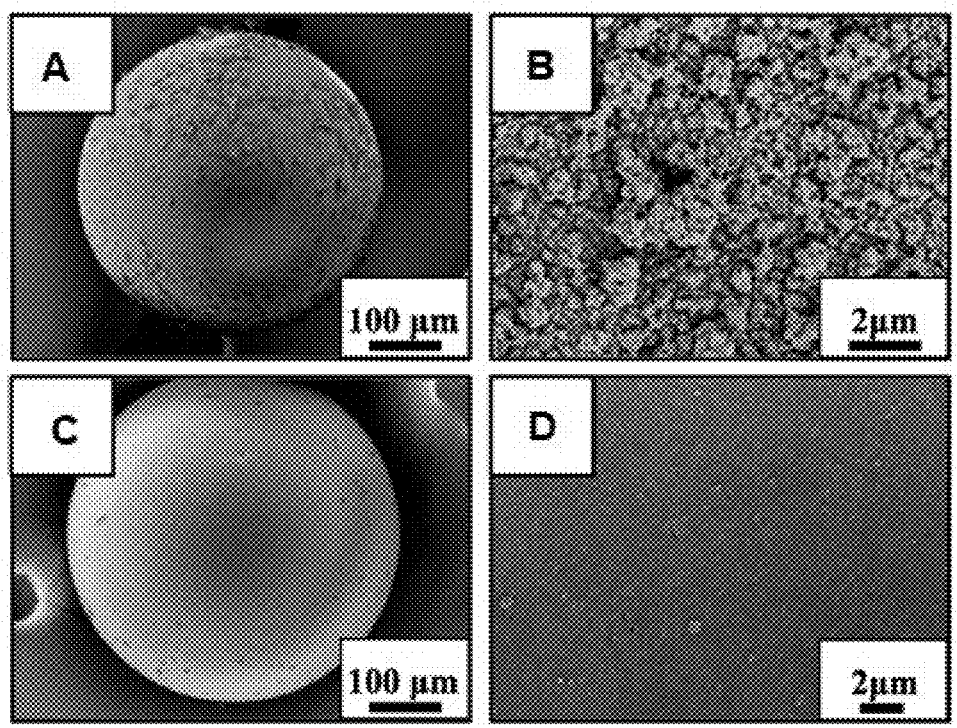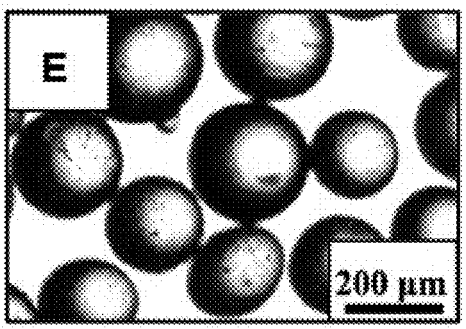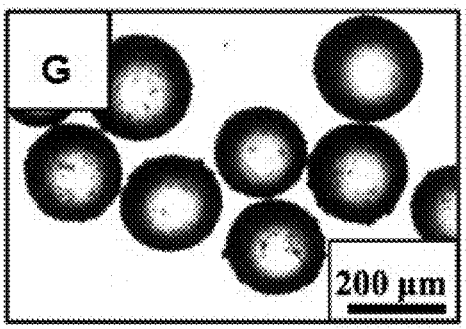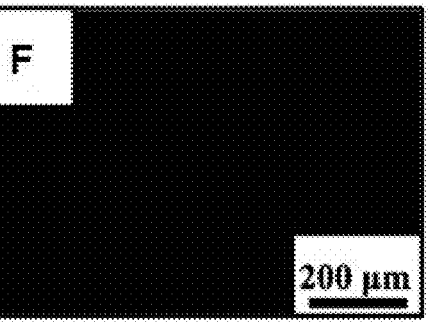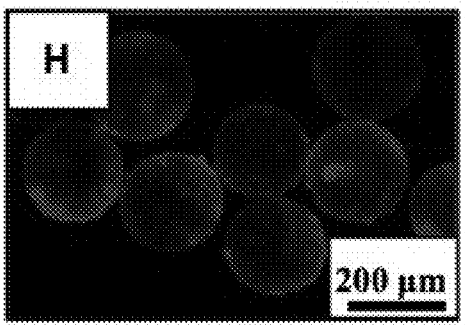
Figs. 12A-12H

SYNTHETIC SURFACES WITH ROBUST AND TUNABLE UNDERWATER SUPEROLEOPHOBICITY

CROSS-REFERENCE TO RELATED APPLICATIONS

This application claims priority from U.S. Provisional Patent Application No. 62/184,184, filed Jun. 24, 2015, which is incorporated by reference herein to the extent that there is no inconsistency with the present disclosure.

STATEMENT REGARDING FEDERALLY SPONSORED RESEARCH OR DEVELOPMENT

This invention was made with government support under 1121288 awarded by the National Science Foundation and N00014-07-1-0255 and N00014-14-1-0791 awarded by the US Navy/ONR. The government has certain rights in the invention.

BACKGROUND OF THE INVENTION

Surfaces with extreme wetting properties are of special interest and practical utility in many commercial, industrial, military, and biotechnological contexts. Synthetic materials that are completely non-wetting to water (superhydrophobic), to oils (superoleophobic), or to both oil and water (superomniphobic) have enabled the design of self-cleaning and anti-fouling surfaces, new generations of smart textiles and stain-resistant clothing, and innovative methods for the collection and manipulation of complex fluids, including approaches to oil recovery and oil/water separation (see, for example, Genzer et al., Science (2000), 290: 2130; Liu et al., Chem. Soc. Rev. (2010), 39:3240; Tuteja et al., Science (2007), 318:1618; Bellanger et al., Chem. Rev. (2014), 114: 2694; Deng et al., Science (2012), 335:67; Chu et al., Chem. Soc. Rev. (2014), 43: 2784; Yuan et al., Nat. Nanotechnol. (2008), 3:332; Deng et al., Adv. Mater. (2010), 22: 5473; Yao et al., Adv. Mater. (2011), 23:719; Jin et al., Adv. Mater. (2011), 23: 2861; Banerjee et al., Adv. Mater. (2011) 23: 690; Kota et al., Nat. Commun. (2012), 3:1; Ueda et al., Adv. Mater. (2013), 25: 1234; Timonen et al., Science (2013), 341:253; Tian et al., Adv. Mater. (2014), 26: 6872).

Advances toward these and other emerging applications have been made possible by an understanding of the ways that features found on natural non-wetting surfaces (e.g., the lotus leaf) (see Barthlott et al., Planta (1997), 202:1) work in synergy to promote anti-fouling behavior, (Gao et al., Nature (2004), 432:36) and by the development of new approaches to the fabrication of hard and soft material interfaces (Bae et al., Adv. Mater. (2014), 26:675) that can recapitulate those critical features on synthetic surfaces better suited for every-day use (so-called "bio-inspired" approaches to materials design).

One major challenge to the application of synthetic non-wetting surfaces in practical settings lies in developing materials that are durable and able to withstand the rigors of use without loss of special wetting behavior (Deng et al., Science (2012), 335:67; Li et al., Angew. Chem. Int. Ed. (2010), 49:6129; Deng et al., Adv. Mater. (2011), 23:2962; and Manna et al., Adv. Mater. (2013), 25:5104). The susceptibility of many synthetic non-wetting surfaces to physical insults, for example, is commonly regarded as an "Achilles heel" with respect to practical utility (Verho et al., Adv. Mater. (2011), 23:673; Ionov et al., Phys. Chem. Chem. Phys. (2012), 14:10497).

Other key challenges lie in developing anti-fouling interfaces that remain functional in harsh and chemically complex media—e.g., at extremes of pH and ionic strength, or upon contact with surface-active agents that can also adsorb and compromise non-wetting behavior (Deng et al., Adv. Mater. (2010), 22:5473). Non-wetting surfaces that permit interfacial properties to be tuned or spatially patterned could also open the door to new and advanced applications of these "super-phobic" materials. (Ueda et al., Adv. Mater. (2013), 25:1234; and Parker et al., Nature (2001), 414:33).

Recent reports describe materials that exhibit "underwater superoleophobicity", or surfaces that are extremely non-wetting to oils and organic liquids only when submerged in water (Tian et al., Adv. Mater. (2014), 26: 6872; Liu et al., Adv. Mater. (2009), 21:665; Jung et al., Langmuir (2009), 25:14165; Liu et al., Adv. Mater. (2012), 24:3401; Nishimoto et al., RSC Adv. (2013), 3:671; and Cai et al., Adv. Funct. Mater. (2014), 24:809). This unique behavior contrasts to that of conventional superoleophobic materials, on which organic liquids "bead up" and "roll off" when brought into contact under air (Tuteja et al., Science (2007), 318:1618) (superoleophobicity is defined here by an advancing oil contact angle $(\theta) \geq 150°$ and a roll-off angle $\leq 10°$).

Synthetic surfaces that exhibit underwater superoleophobicity have emerged only recently, based on designs that mimic, to varying extents, critical physical and chemical features found on the scales of fish (Liu et al., Adv. Mater. (2009), 21: 665; and Cai et al., Adv. Funct. Mater. (2014), 24:809) and other aquatic anti-oil-fouling surfaces (Liu et al., Adv. Mater. (2012), 24:3401; and Nishimoto et al., RSC Adv. (2013), 3:671). These materials typically have two key elements in common: (i) rough surfaces that present micro- and nanoscale topographic features, and (ii) an ability to adsorb or host water near their surfaces to minimize contact with oily liquids creating a conceptual and theoretical framework similar in principle to superhydrophobic surfaces with multiscale features that can "trap" air to repel water (Tian et al., Adv. Mater. (2014), 26:6872; and Liu et al., Adv. Mater. (2009), 21:665). Previous studies have used hydrogels, polyelectrolyte assemblies, and metal oxide nanorods to create model surfaces meeting these criteria (see, for example, Liu et al., Adv. Mater. (2009), 21:665; Lin et al., Adv. Mater. (2010), 22:4826; Xu et al., Adv. Mater. (2013), 25:606; Xu et al., ACS Nano (2013), 7:5077; Ma et al., Adv. Mater. Interfaces (2014), 1:1300092; Liu et al., ACS Nano (2012), 6:5614; and Zhang et al., Adv. Mater. (2013), 25: 2071).

Those approaches have advanced an understanding of key principles underlying underwater superoleophobicity, but they lead to soft surfaces and coatings that are susceptible to physical damage or disruption, particularly in harsh and chemically complex environments. They also provide limited means to tune non-wetting behavior or define and vary other important physicochemical or interfacial properties.

SUMMARY OF THE INVENTION

The current invention relates to the design of materials that exhibit 'underwater superoleophobicity', or surfaces that are extremely non-wetting and non-adhesive to oils and organic liquids in the presence of an aqueous liquid (including but not limited to water), when the surface is contacted or covered with an aqueous liquid, or when the surface is submerged in an aqueous liquid. The materials described herein also have improved structural strength and improved resistance to chemical and environmental degradation. Surfaces that exhibit these properties provide new principles for the design of antifouling surfaces and the collection, transport, or separation of oils and other organic fluids in underwater environments, including industrially and strategically important aquatic and marine environments.

The present invention provides multilayer polymer-based coatings, and methods of making such coatings and materials, that exhibit robust underwater superoleophobicity and structural and functional tolerance to a broad range of physical, chemical, and environmental challenges encountered by surfaces deployed in aqueous or aquatic environments. These coatings can be fabricated on surfaces of arbitrary shape, size, and composition and provide straightforward means to manipulate surface chemistry and fine-tune other useful features of their interfacial behavior (such as underwater oil-adhesiveness). These materials address key obstacles to the application of non-wetting surfaces and anti-fouling 'super-phobic' materials in practical, real-world scenarios.

One aspect of the invention provides thin polymer coatings (e.g., equal to or less than 50 µm, equal to or less than 10 µm, equal to or less than 2 µm, equal to or less than 1 µm, equal to or less than 100 nm, or less than or equal to 60 nm) that exhibit 'underwater superoleophobicity' (i.e., provide superoleophobicity when the surface, or a portion of the surface, is in contact with, covered, or submerged with an aqueous liquid such as water) and further address the aforementioned limitations of previously described materials. In an embodiment, the superoleophobic materials are fabricated using covalent layer-by-layer assembly of polymer multilayers such as described in U.S. Pat. No. 8,071,210. In a further embodiment, the polymer multilayers comprise branched and/or poly(ethyleneimine) (PEI) and the amine-reactive polymer poly(vinyl-4,4-dimethylazlactone) (PVDMA) which are reacted with small chemical groups containing a hydrophobic or hydrophilic amine to further functionalize the bilayer (i.e., to install secondary surface functionality).

In an embodiment, the present invention provides a method for preventing or reducing fouling by hydrophobic substances on a surface comprising the steps of: depositing an anti-fouling superoleophobic material on said surface, wherein said superoleophobic material comprises a multilayer polymer film attached to said substrate, said multilayer film comprising one or more bilayers, wherein each bilayer comprises a first polymer layer covalently linked with a second polymer layer, and wherein said multilayer polymer film attached to said substrate is non-wetting and non-adhesive to oils when contacted, covered, or submerged with an aqueous liquid. In specific embodiments, the multilayer polymer film comprises more than one bilayer. In specific embodiments, the multilayer polymer film has nanoscale or microscale porosity. Preferably, the multilayer film has nanoscale porosity.

The resulting material attached to the surface is superoleophobic when exposed to an aqueous liquid and is able to retain its superoleophobic properties at a pH range from 1 to 11. In an embodiment, the resulting material is also superoleophobic at extreme pH ranges (i.e., less than or 1 or greater than 11). The resulting material is also superoleophobic when submerged in salt water, sea water (having a salinity of 3.0% or greater) or aqueous liquids having high ionic strength. In embodiments, the resulting material is superoleophobic when exposed to temperatures ranging from approximately 0° C. (when the aqueous liquid may become frozen or partially frozen) to approximately 100° C. (boiling point of water). In embodiments, the resulting material remains superoleophobic when exposed to an aqueous liquid even after the material has been previously exposed to temperatures ranging from 0° C. to 100° C. In further embodiments, the resulting material remains superoleophobic when exposed to an aqueous liquid even after the material has been previously exposed to temperatures ranging from −50° C. to 200° C.

In an embodiment, the present invention also provides a method of fabricating an anti-fouling superoleophobic material on a substrate comprising the steps of: a) exposing the surface of the substrate to a first solution comprising a functionalized first polymer wherein a layer of the first polymer is deposited on at least a portion of the substrate; b) exposing the substrate to a second solution comprising a second polymer wherein the second polymer covalently reacts with the first polymer layer and a layer of the second polymer is deposited on at least a portion of the first polymer layer, thereby forming a bilayer on said substrate, wherein said bilayer attached on said substrate is non-wetting to oils when said substrate is contacted or covered with, or submerged in, an aqueous liquid. The method optionally comprises a rinsing step comprising exposing or washing the substrate with a rinse solvent or solution each time step a) is performed and each time step b) is performed. In an embodiment, a fresh rinse solvent or solution is employed for each rinsing step In a further embodiment, the same rinse solution is re-used for each rinsing step.

Steps a) and b) are repeated one or more times until the multilayer film reaches the desired thickness or desired number of layers, where each cycle of steps a) and b) deposits a new bilayer on the substrate. In a further embodiment, steps a) and b) are repeated 2 or more times, 5 or more times, 10 or more times, 20 or more times, 30 or more times, 50 or more times, or 100 or more times. The substrate can be exposed to the solutions containing the polymer solutions using methods known in the art, including but not limited to, dip coating. In an embodiment, the superoleophobic material has at least two bilayers and has nanoporous or microporous porosity. Preferably, the superoleophobic material has nanoporous porosity.

The substrate can be any material able to support the formation of the nanoporous bilayer, including but not limited to glass, metals and plastics. The substrate can include curved and irregularly shaped three dimensional surfaces, as well as completely solid surfaces and mesh surfaces (e.g., having a porosity between 100 µm and 250 µm). For example, the substrate can be the interior of a tube or container. More specifically, a tube or container transporting an aqueous liquid containing one or more oily or hydrophobic impurities. Alternatively, the substrate is a surface that is exposed to aquatic and marine environments (including fresh water and sea water), such as a boat hull. In another embodiment, the substrate is part of a filter or mesh which used to separate oily or hydrophobic impurities from an aqueous liquid. In an embodiment, the substrate material, bilayers, or combination thereof are at least partially optically transparent (i.e., able to transmit at least 50%, preferably 75%, more preferably 90% of incident light).

A specific embodiment yields coatings that are chemically crosslinked (owing to the formation of chemically stable amide/amide linkages during assembly) and contain amine-reactive azlactone groups that can be used to define and tailor interfacial properties after assembly (e.g., by treatment with molecules containing primary amines, hydroxyl groups or thiol groups). This residual functionality allows for the testing of a number of different secondary surface treatments, and allows for a molecular-level approach to be used to tune the underwater oil adhesiveness (i.e., to create surfaces that are either (i) non-wetting and non-adhesive to oils (using hydrophilic groups) or (ii) superoleophobic, but with tunable degrees of oil adhesiveness (varying the structures of hydrophobic groups)). These results indicate that these polymer coatings could be used to capture, release, pattern, and manipulate the transport of organic fluids on surfaces in aquatic environments.

The first and second polymer layers of the bilayer can comprise any polymers or combination of polymers able to form a stable bilayer and where the first polymer layer is able to be functionalized and the second polymer layer is optionally also able to be functionalized (as described in U.S. Pat. No. 8,071,210). The chemical reactivity of the functionalized bilayers provides means to tune interactions between the polymer layers, the aqueous liquid and hydrophobic substances.

In an embodiment, the first polymer layer of the bilayer comprises a functionalized azlactone having the formula:

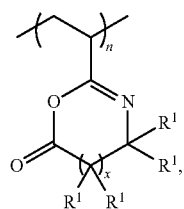

wherein x is 0 or the integers 1 or 2; and each $R^1$ is independently selected from the group consisting of: hydrogen, alkyl groups, alkenyl groups, alkynyl groups, carbocyclic groups, heterocyclic groups, aryl groups, heteroaryl groups, alkoxy groups, aldehyde groups, ether groups, and ester groups, any of which may be substituted or unsubstituted. In an embodiment, the first polymer layer comprises functionalized poly(vinyl-4,4-dimethylazlactone) (PVDMA). In an embodiment, the first polymer layer consists of functionalized poly(vinyl-4,4-dimethylazlactone) (PVDMA). In a further embodiment, the PVDMA was synthesized by free-radical polymerization of intentionally added cyclic azlactone-functionalized oligomer in an amount ranging from 1 wt % to 10 wt %, preferably between 5 wt % and 8 wt %.

Useful functionalized azlactone polymers include, but are not limited to, poly(vinyl-4,4-dimethylazlactone), poly(2-vinyl-4,4-dimethyl-2-oxazolin-5-one), poly(2-isopropenyl-4,4-dimethyl-2-oxazolin-5-one), poly(2-vinyl-4,4-diethyl-2-oxazolin-5-one), poly(2-vinyl-4-ethyl-4-methyl-2-oxazolin-5-one), poly(2-vinyl-4-dodecyl-4-methyl-2-oxazolin-5-one), poly(2-vinyl-4,4-pentamethylene-2-oxazolin-5-one), poly (2-vinyl-4-methyl-4-phenyl-2-oxazolin-5-one), poly(2-isopropenyl-4-benzyl-4-methyl-2-oxazolin-5-one), or poly (2-vinyl-4,4-dimethyl-1,3-oxazin-6-one). Useful azlactone functionalized polymers further include azlactone functionalized polyisoprenes and azlactone functionalized polybutadienes.

In an embodiment, the second polymer layer of the bilayer is optionally functionalized in addition to the first polymer and comprises an amine functionalized polymer, an alcohol functionalized polymer, or a thiol functionalized polymer. Creating specific functionalities with amine, alcohol, and thiol groups is a process well known in the art (for example, see *Bioconjugate Techniques*, $2^{nd}$ Edition, 2008, Greg T. Hermanson). In embodiments, the second polymer layer comprises an optionally functionalized polymer selected from the group consisting of poly(ethylene imine) (PEI), polylysine, pollyallylamine, poly(amidoamine) dendrimers, polyvinyl alcohol, poly hydroxyl ethyl methacrylate, poly (methacrlic acid) functionalized with cysteamine, and linear and hyperbranched and dendritic polymers functionalized with primary amines, hydroxyl groups, or thiol groups.

In embodiments, the second polymer layer comprises a polymer, which is optionally functionalized, selected from the group consisting of polyolefins, poly(alkyls), poly(alkenyls), poly(ethers), poly(esters), poly(imides), polyamides, poly(aryls), poly(heterocycles), poly(ethylene imines), poly (urethanes), poly($\alpha,\beta$-unsaturated carboxylic acids), poly($\alpha,\beta$-unsaturated carboxylic acid derivatives), poly(vinyl esters of carboxylic acids), poly(vinyl halides), poly(vinyl alkyl ethers), poly(N-vinyl compounds), poly(vinyl ketones), poly (vinyl aldehydes) and any combination thereof. In an embodiment, the second polymer layer comprises poly (ethylene imine) (PEI).

"Functionalized polymer" refers to a polymer in which at least a portion of the individual monomer units are substituted with a specific functional group. For the functionalized polymers of the present invention, at least 1% or more, at least 2% or more, at least 5% or more, at least 10% or more, at least 15% or more, at least 20% or more, at least 30% or more, at least 50% or more, at least 75% or more, or at least 90% or more of the portion of the monomer units is substituted with a specific functional group.

For some embodiments, it may be desirable to further functionalize a portion of the one or more bilayers. This can be achieved, for example, by reacting a portion of any residual functional groups in the one or more bilayers with an amine group, hydroxyl group, thiol group or hydrazine, or by reacting a portion of the first or second polymer with an amine reactive group or hydroxyl reactive group.

In an embodiment, at least a portion of the residual functional groups in the bilayer is reacted as described in Scheme 1 below with an amine, hydroxyl group, thiol group, or hydrazine group having the formula $R-NH_2$, $R-OH$, $R-SH$ or $R-NHNH_2$, where R is hydrophobic or hydrophilic.

Scheme 1

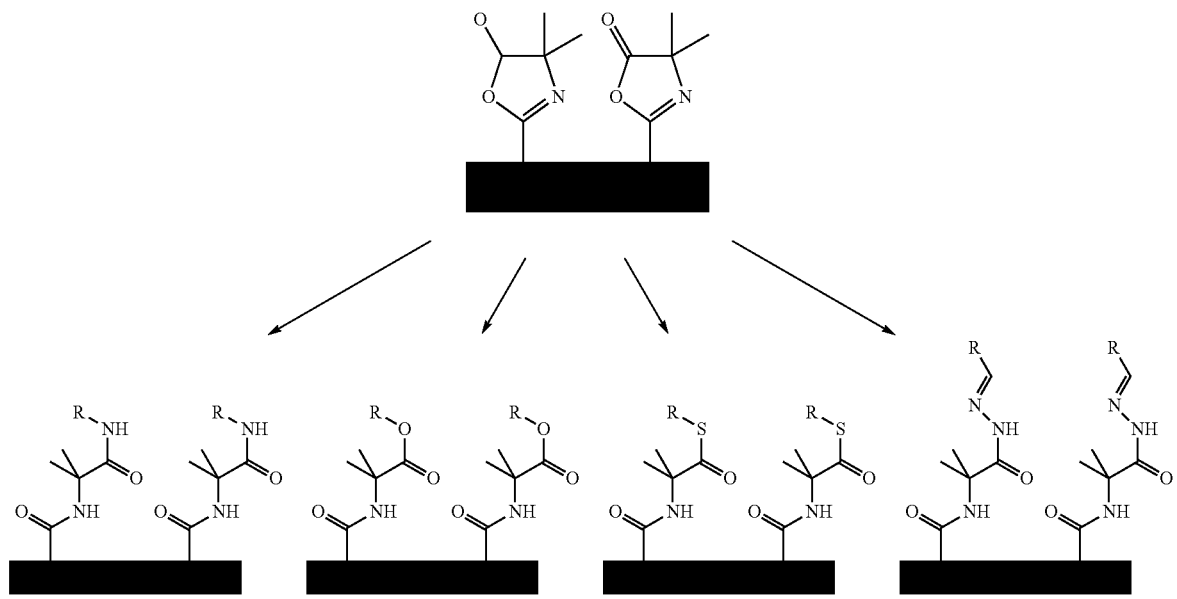

In embodiments, R is a substituted or unsubstituted $C_1$ to $C_{20}$ alkyl group, preferably a $C_1$ to $C_{12}$ alkyl group. In other embodiments, R is a substituted or unsubstituted $C_2$ to $C_{20}$ alkenyl group, preferably a $C_2$ to $C_{12}$ alkenyl group. In further embodiments, at least a portion of the residual functional groups in the bilayer is reacted with an amine selected from the group consisting of methylamine, ethylamine, propylamine, butylamine, pentylamine, hexylamine, heptylamine, octylamine, nonylamine, decylamine, and combinations thereof, preferably n-propylamine, n-octylamine, or n-decylamine. In other embodiments, R is an alkyl group substituted with one or more hydroxyl groups or charged groups such as $COO^-$ or $NR3^+$. In further embodiments, at least a portion of the residual functional groups in the bilayer is reacted with an alcohol selected from the group consisting of methanol, ethanol, propanol, butanol, pentanol, hexanol, heptanol, octanol, nonanol, decanol, and combinations thereof. In further embodiments, at least a portion of the residual functional groups in the bilayer is reacted with a thiol selected from the group consisting of methanethiol, ethanethiol, propanethiol, butanethiol, pentanethiol, hexanethiol, heptanethiol, octanethiol, nonanethiol, decanethiol, and combinations thereof. In an embodiment, at least a portion of the residual functional groups in the bilayer is reacted with an amino sugar, amino alcohol, amino polyol, glucamine (preferably D-glucamine), dimethylaminopropylamine (DMAPA), and combinations thereof. In other embodiments, at least a portion of the residual functional groups in the bilayer is reacted with a hydrazine group to form an acylhydrazine group.

In a further embodiment, at least a portion of the residual functional groups in the bilayer is reacted to form multilayer films with chemically labile amide/ester-, amide/thioester-, and amide/imine-type bonds. These chemically labile bonds are able to be broken in order to undergo stimuli-responsive and reversible changes in wetting behaviors.

In an embodiment, the present invention provides a superoleophobic material comprising: a) a substrate; and b) a multilayer polymer film attached to said substrate, said multilayer film comprising one or more bilayers, wherein each bilayer comprises a first polymer layer covalently linked with a second polymer layer, and wherein said multilayer polymer film attached to said substrate is non-wetting and non-adhesive to oils when covered with an aqueous liquid. In another embodiment, the present invention provides a superoleophobic coating comprising: a multilayer polymer film comprising one or more bilayers, wherein each bilayer comprises a first polymer layer covalently linked with a second polymer layer, wherein said multilayer polymer film attached to said substrate is non-wetting and non-adhesive to oils when covered with an aqueous liquid. In specific embodiments, the multilayer polymer films have nanoscale or microscale porosity. Preferably, the multilayer films have nanoscale porosity. Preferably, the multilayer polymer film comprises one or more PVDMA/PEI bilayers, which are functionalized with a hydrophobic or hydrophilic amine, hydroxyl group or thiol group, where the multilayer polymer film preferably has a thickness of 10 µm or less.

Preferably, the multilayer film comprises 2 or more bilayers, 5 or more bilayers, 10 or more bilayers, 20 or more bilayers, 30 or more bilayers, 50 or more bilayers, or 100 or more bilayers. Preferably each first polymer layer alternates with a second polymer layer. In embodiments, the multilayer film comprises 2 or more bilayers and has nanoscale or microscale porosity. Preferably, the multilayer film has nanoscale porosity.

In an embodiment, the present invention provides a method for filtering a liquid comprising the steps of: a) depositing an anti-fouling superoleophobic material on a mesh (preferably having a porosity between 100 µm and 250 µm), wherein said superoleophobic material comprises a multilayer polymer film attached to said mesh, said multilayer film comprising one or more bilayers, wherein each bilayer comprises a first polymer layer covalently linked with a second polymer layer, and wherein said multilayer polymer film attached to said mesh is non-wetting and non-adhesive to oils when covered with an aqueous liquid;

b) providing a liquid to a first side of said mesh having the superoleophobic material, wherein a hydrophilic phase of the liquid passes through to the second side of said mesh. In specific embodiments, the multilayer polymer film has nanoscale or microscale porosity. Preferably, the multilayer film has nanoscale porosity. The hydrophobic phase of the liquid is optionally collected on the first side of said mesh, and the hydrophilic phase of the liquid is optionally collected on the second side of the mesh. The collected hydrophobic phase can then be removed from the first side of the mesh.

In an embodiment, a number of PEI/PVDMA multilayer films are fabricated and brought into contact with aqueous organic fluids in air, in contact with water, or submerged underwater. For example, in one instance, the multilayers comprised 10 bilayer-pairs of PEI and PVDMA that formed thin (e.g. less than 10 μm) and nanoporous films with enhanced surface roughness and/or porosity. The films are then further functionalized by reaction with glucamine (or other hydrophilic and hydrophobic functional groups).

A number of additional tests have been performed, including the separation of oil and water using stainless steel mesh coated with the films described herein. The water passed rapidly through the coated mesh into a collection vessel while the oil remained suspended on the coated mesh.

The novel properties and behaviors of these materials are useful for the design of durable and injury-tolerant oil-repellant coatings and the development of advanced, multifunctional surfaces that enable new means of control over the capture, transport, manipulation, and separation of oils and other organic fluids from aqueous liquids in fundamental and applied contexts.

BRIEF DESCRIPTION OF THE DRAWINGS

FIGS. 1A and 1B show digital images of planar glass substrates coated with glucamine-functionalized multilayers showing wetting of water (FIG. 1A) and dichloroethane (DCE) (FIG. 1B) on dry films under air. FIGS. 1C and 1D show beading of a droplet of DCE (FIG. 1C) and the advancing underwater oil contact angle ($\theta \approx 161°$) when the coatings are submerged in water (FIG. 1D). FIGS. 1E and 1F provide low and high magnification SEM images of porous multilayers. FIG. 1G provides percent transmittance versus A for bare glass (top line) and coatings fabricated on glass substrates (bottom line) when submerged underwater; inset in FIG. 1G shows optical transparency and the beading of four model oils (DCE, $CCl_4$, the liquid crystal (E7), and $CH_2Br_2$; dyes are added to DCE and $CH_2Br_2$ to enhance visual contrast).

FIGS. 2A, 2C and 2E show advancing underwater oil contact angles and FIGS. 2B, 2D and 2F provide SEM images of glucamine-functionalized underwater superoleophobic coatings after exposure to falling sand in FIG. 2A and FIG. 2B ($\theta \approx 159°$), peeling of adhesive tape in FIG. 2C and FIG. 2D) ($\theta \approx 161°$), and glass beads dropped under water as shown in FIG. 2E and FIG. 2F ($\theta \approx 159°$). Also shown is wetting of droplets of DCE on thin sheets of bare PET (FIG. 2G) or PET coated with a glucamine-functionalized coating (FIG. 2H). FIG. 2I provides results of sandpaper abrasion tests, showing a digital picture of a film-coated glass slide abraded by repeated manual rubbing (25 times) with sandpaper (dotted line box); abraded material removed from the surface of the coating as a result of this treatment is shown at the sides of the image. FIG. 2J shows two droplets of DCE placed on the surface of a submerged glucamine-functionalized multilayer coating that was abraded with sandpaper (right: abraded region; left: non-abraded region). FIGS. 2K, 2L, 2M and 2N provide low- and high-magnification SEM images of coatings before and after abrasion, and FIGS. 2O and 2P provide underwater oil contact angle measurements on (FIG. 2O) non-abraded ($\theta \approx 161°$) and (FIG. 2P) abraded coatings ($\theta \approx 161°$). FIG. 2Q provides a plot showing contact angles and hysteresis for coatings exposed to simulated seawater, 1.0 M NaCl, and lake water for four months.

FIGS. 3A-3I illustrate chemical functionalization and tuning of the underwater oil adhesiveness of underwater superoleophobic multilayers in an embodiment of the invention. FIG. 3A provides a schematic illustration of azlactone-functionalized multilayers and the reactive process used to install secondary chemical functionality. FIG. 3A also shows the chemical structures of the hydrophilic (structures 1, 2, 3) and hydrophobic (structures 4, 5, 6) functionality investigated in this embodiment. FIGS. 3B, 3D, 3F and 3H illustrate underwater advancing contact angles and FIGS. 3C, 3E, 3G and 3I illustrate underwater receding contact angles of droplets of DCE on coatings functionalized with glucamine (FIG. 3B) ($\theta \approx 160°$) and (FIG. 3C) ($\theta \approx 159°$); propylamine (FIG. 3D) ($\theta \approx 158°$) and (FIG. 3E) ($\theta \approx 135°$); octylamine (FIG. 3F) ($\theta \approx 158°$) and (FIG. 3G) $\theta \approx 117°$); and decylamine (FIG. 3H) ($\theta \approx 146°$) and (FIG. 3I) $\theta \approx 104°$).

FIGS. 4A and 4B provide images showing behavior of droplets of DCE on the surface of a submerged glass slide patterned with a small ($\approx 3$ mm diameter) circular region functionalized to be superoleophobic and non-adhesive (dotted circle); the remainder of the surface was functionalized to be superoleophobic but adhesive (by treatment with propylamine). Droplets placed in adhesive regions (left and right) remained in place when the substrate was tilted at an angle ($\theta$ incl; e.g., 4° is shown) lower than that of the contact angle hysteresis. FIG. 4A shows droplets placed in the non-adhesive region (center) rolled downhill but FIG. 4B shows the droplet became pinned upon rolling into contact with the adhesive region (center-right). FIGS. 4C and 4D show droplets of DCE (15 μL) placed on a bed of glass beads coated with (FIG. 4C) glucamine-functionalized multilayers or (FIG. 4D) bare glass beads. FIG. 4E provides fluorescence microscopy images revealing no adsorption of DCE on beads coated with glucamine-functionalized films after incubation with DCE/water emulsions (see also FIGS. 12A-12H). The presence of bright signal in FIG. 4F indicates adsorption of DCE to control beads coated with adhesive decylamine-functionalized films. FIG. 4G shows beading of a droplet of DCE on stainless steel mesh coated with glucamine-functionalized multilayers. FIG. 4H shows wetting of a droplet of DCE on a sample of bare (uncoated) mesh. FIGS. 4I, 4J and 4K provide images demonstrating gravity-driven separation of motor oil and water promoted by pouring oil/water mixtures through mesh coated with glucamine-functionalized multilayers. Water passes through rapidly into a collection vessel as shown in FIG. 4J; while oil remains suspended on top of the mesh and can be recovered in near quantitative yields as shown in FIG. 4K.

FIGS. 7C and 7D show high and low magnification SEM images showing the absence of significant nanoscale porosity or nanoscale and microscale topographic features (e.g., compare to FIGS. 1E and 1F).

FIG. 8A illustrates the sand test in air, and FIG. 8B illustrates the underwater glass bead test.

FIGS. 9A and 9E show underwater wetting of DCE droplets on PET film coated with glucamine-functionalized underwater superoleophobic coatings (FIG. 9A) (θ~161°) and bare (uncoated) PET film (FIG. 9E) (θ~47°). FIGS. 9B, 9C, 9F and 9G provide SEM images showing low and high magnification images of the multilayer coating fabricated on PET (FIG. 9B) and (FIG. 9C) and bare, uncoated PET (FIG. 9F) and (FIG. 9G). FIGS. 9D and 9H provide images showing the beading (FIG. 9D) or wetting (FIG. 9H) of droplets of DCE placed at the creased regions of samples of coated PET (FIG. 9D) or bare, uncoated PET (FIG. 9H).

FIGS. 11Q-11T provide SEM images showing film morphology and associated nano/microscale features of films functionalized with glucamine (FIG. 11Q), propylamine (FIG. 11R), octylamine (FIG. 11S), and decylamine (FIG. 11T).

FIGS. 12A-12H provide images of coated and uncoated glass beads. FIGS. 12A-12D provide low and high magnification SEM images of glass beads coated with glucamine-functionalized multilayers (FIGS. 12 A and 12B), and bare, uncoated glass beads (FIGS. 12C and 12D). FIGS. 12E and 12G provide bright field microscopy images and FIGS. 12F and 12H provide fluorescence microscopy images revealing no adsorption of DCE on beads coated with glucamine-functionalized films (FIGS. 12E and 12F) after incubation with DCE/water emulsions. The presence of bright signal in FIG. 12H indicates significant adsorption of DCE to beads coated with decylamine-functionalized films after incubation with DCE/water emulsions.

FIG. 13B shows wetting of a droplet of DCE on a sample of bare (uncoated) stainless steel mesh. FIGS. 13C-13F show low and high magnification SEM images of coated stainless steel mesh (FIG. 13C and FIG. 13E) and bare, uncoated mesh (FIGS. 13D and 13F).

FIG. 15I provides ATR IR thin film spectra for the unfunctionalized film (azlactone C=O carbonyl stretch, 1819 cm$^{-1}$) and decylamine, decanol or decanethiol functionalized films, showing complete or near complete consumption of the azlactone peak.

FIG. 16C shows the change in the advancing WCA of decanol functionalized films are shown in (gray bars) and decylamine functionalized films (black bars) upon exposure to 50 mM aqueous NaOH. FIG. 16D shows the change in the advancing WCA of decanethiol functionalized films (gray bars) and decylamine functionalized films (black bars) upon exposure to hydrazine. FIG. 16E shows a digital picture of a 3×3 array of hydrophilic spots patterned by hydrolysis with aqueous base onto a decanol functionalized film; a large droplet of water placed nearby beads up on the untreated and still superhydrophobic region. FIG. 16F shows a fluorescence micrograph of a 2×2 array, prepared the same way as in FIG. 16E, after loading the hydrophilic spots with the fluorescent dye TMR. FIG. 16G shows a digital image of an oil (dichloroethane, DCE) droplet on the surface of an underwater-superoleophobic film (~1×1 cm) submerged in a vial underwater; the film was prepared as in FIG. 16B. FIG. 16H illustrates advancing oil contact angle underwater. Water and oil were dyed to aid visualization.

FIG. 17A shows chemical structure for the reaction of a PEI/PVDMA film functionalized with acylhydrazine and then octyl aldehyde (forward direction) and imine bond cleavage under acidic conditions (reverse direction). FIG. 17B shows advancing WCA for the hydrophilic acylhydrazine-presenting film and for the superhydrophobic octyl aldehyde functionalized film (FIG. 17C). FIG. 17D shows a plot showing the reversibility of the process illustrated in FIG. 17A, as monitored by changes in advancing WCA. One cycle begins with the superhydrophobic octyl aldehyde film, followed by treatment with acidic media, and the subsequent return to the superhydrophobic state. Error bars represent the standard deviation of measurements obtained on three identically prepared films.

DETAILED DESCRIPTION OF THE INVENTION

Definitions

Figures 1A, 1B, 1C, 1D, 1E, 1F, 1G:
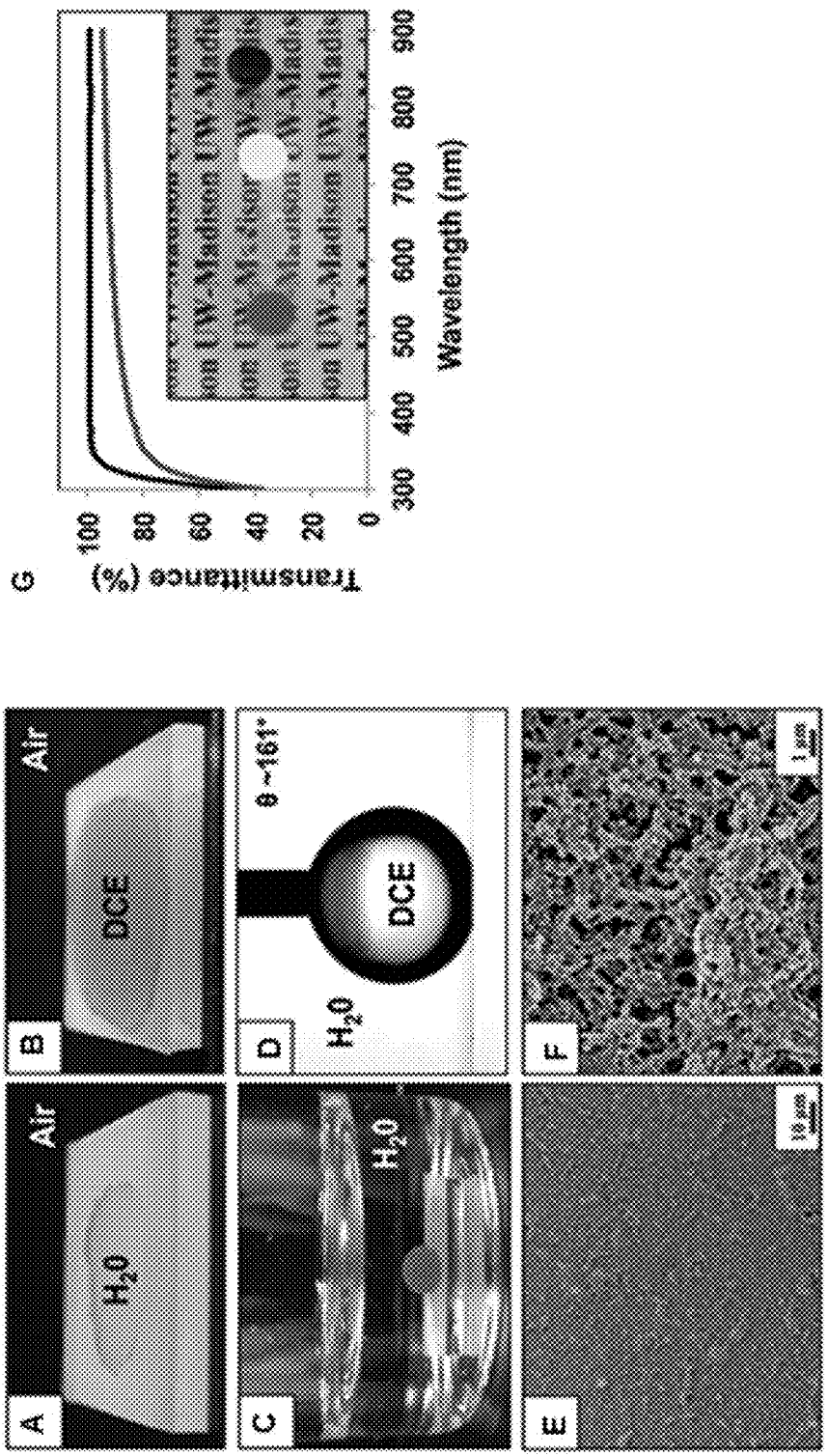
FIGS. 1A-1G illustrate physical and interfacial characterization of underwater superoleophobic polymer multilayers in an embodiment of the present invention.

An "amine reactive group" or "hydroxyl reactive group" can be any functional group able to react with an amine group or hydroxyl group, respectively.

As used herein, the term "anti-fouling" refers to a material's ability to resist adhesion by an undesirable material, such as oils, organic compounds, and organisms. In particular, it is desirable to prevent or reduce the adhesion of hydrophobic compounds and organisms to a material which is submerged or in contact with water.

As used herein, the terms "wetting", "wettability" and "non-wetting" refer to the ability of a liquid to maintain contact with a solid surface. A drop of a liquid will tend to spread out over a flat, solid surface when brought into contact with air or another liquid. For a surface having high wettability, the fluid will spread over a large area of the surface, while surfaces having non-wetting surfaces will result in the fluid minimizing contact with the surface and forming a compact liquid droplet. The degree of wetting or non-wetting can be measured by measuring the contact angle (8) (i.e., the angle at which the liquid-vapor interface meets the solid-liquid interface). As used herein, a contact angle ($\theta$) of a drop of liquid on the flat, solid surface less than or equal to 90° indicates that a surface has high wettability, while a contact angle ($\theta$) between 90° and 180° indicates that a surface is non-wetting. As used herein, a contact angle of greater than or equal to 150° indicates that a surface is "extremely non-wetting". As used herein, the term "superoleophobicity" refers to a material which produces a contact angle of greater than or equal to 150° for a drop of a hydrophobic oil.

As used herein the term "attached" includes both covalent and non-covalent binding.

The term "nanoscale" refers to a length less than 1,000 nm, preferably less than 100 nm, and the term "microscale" refers to a length less than 1,000 µm, preferably less than 100 µm.

The term "alkyl" refers to a monoradical of a branched or unbranched (straight-chain or linear) saturated hydrocarbon and to cycloalkyl groups having one or more rings. Alkyl groups as used herein include those having from 1 to 20 carbon atoms, preferably having from 1 to 12 carbon atoms. Alkyl groups include small alkyl groups having 1 to 3 carbon atoms. Alkyl groups include medium length alkyl groups having from 4-10 carbon atoms. Alkyl groups include long alkyl groups having more than 10 carbon atoms, particularly those having 10-20 carbon atoms. Cycoalkyl groups include those having one or more rings. Cyclic alkyl groups include those having a 3-, 4-, 5-, 6-, 7-, 8-, 9-, 10-, 11- or 12-member carbon ring and particularly those having a 3-, 4-, 5-, 6- or 7-member ring. The carbon rings in cyclic alkyl groups can also carry alkyl groups. Cyclic alkyl groups can include bicyclic and tricyclic alkyl groups. Alkyl groups are optionally substituted. Substituted alkyl groups include among others those which are substituted with aryl groups, which in turn can be optionally substituted. Specific alkyl groups include methyl, ethyl, n-propyl, iso-propyl, cyclopropyl, n-butyl, s-butyl, t-butyl, cyclobutyl, n-pentyl, branched-pentyl, cyclopentyl, n-hexyl, branched hexyl, and cyclohexyl groups, all of which are optionally substituted. Substituted alkyl groups include fully halogenated or semihalogenated alkyl groups, such as alkyl groups having one or more hydrogens replaced with one or more fluorine atoms, chlorine atoms, bromine atoms and/or iodine atoms. Substituted alkyl groups include fully fluorinated or semifluorinated alkyl groups, such as alkyl groups having one or more hydrogens replaced with one or more fluorine atoms. An alkoxy group is an alkyl group linked to oxygen and can be represented by the formula R—O. Examples of alkoxy groups include, but are not limited to, methoxy, ethoxy, propoxy, butoxy and heptoxy. Alkoxy groups include substituted alkoxy groups wherein the alky portion of the groups is substituted as provided herein in connection with the description of alkyl groups.

The term "alkenyl" refers to a monoradical of a branched or unbranched unsaturated hydrocarbon group having one or more double bonds and to cycloalkenyl groups having one or more rings wherein at least one ring contains a double bond. Alkenyl groups include those having 1, 2 or more double bonds and those in which two or more of the double bonds are conjugated double bonds. Alkenyl groups include those having from 2 to 20 carbon atoms, preferably having from 2 to 12 carbon atoms. Alkenyl groups include small alkenyl groups having 2 to 3 carbon atoms. Alkenyl groups include medium length alkenyl groups having from 4-10 carbon atoms. Alkenyl groups include long alkenyl groups having more than 10 carbon atoms, particularly those having 10-20 carbon atoms. Cycloalkenyl groups include those having one or more rings. Cyclic alkenyl groups include those in which a double bond is in the ring or in an alkenyl group attached to a ring. Cyclic alkenyl groups include those having a 3-, 4-, 5-, 6-, 7-, 8-, 9-, 10-, 11- or 12-member carbon ring and particularly those having a 3-4-, 5-, 6- or 7-member ring. The carbon rings in cyclic alkenyl groups can also carry alkyl groups. Cyclic alkenyl groups can include bicyclic and tricyclic alkyl groups. Alkenyl groups are optionally substituted. Substituted alkenyl groups include among others those which are substituted with alkyl or aryl groups, which groups in turn can be optionally substituted. Specific alkenyl groups include ethenyl, prop-1-enyl, prop-2-enyl, cycloprop-1-enyl, but-1-enyl, but-2-enyl, cyclobut-1-enyl, cyclobut-2-enyl, pent-1-enyl, pent-2-enyl, branched pentenyl, cyclopent-1-enyl, hex-1-enyl, branched hexenyl, cyclohexenyl, all of which are optionally substituted. Substituted alkenyl groups include fully halogenated or semihalogenated alkenyl groups, such as alkenyl groups having one or more hydrogens replaced with one or more fluorine atoms, chlorine atoms, bromine atoms and/or iodine atoms. Substituted alkenyl groups include fully fluorinated or semifluorinated alkenyl groups, such as alkenyl groups having one or more hydrogens replaced with one or more fluorine atoms.

The term "aryl" refers to a chemical group having one or more 5-, 6- or 7-member aromatic or heterocyclic aromatic rings. An aromatic hydrocarbon is a hydrocarbon with a conjugated cyclic molecular structure. Aryl groups include those having from 4 to 30 carbon atoms, preferably having from 6 to 18 carbon atoms. Aryl groups can contain a single ring (e.g., phenyl), one or more rings (e.g., biphenyl) or multiple condensed (fused) rings, wherein at least one ring is aromatic (e.g., naphthyl, dihydrophenanthrenyl, fluorenyl, or anthryl). Heterocyclic aromatic rings can include one or more N, O, or S atoms in the ring. Heterocyclic aromatic rings can include those with one, two or three N, those with one or two O, and those with one or two S, or combinations of one or two or three N, O or S. Aryl groups are optionally substituted. Substituted aryl groups include among others those which are substituted with alkyl or alkenyl groups, which groups in turn can be optionally substituted. Specific aryl groups include phenyl groups, biphenyl groups, pyridinyl groups, and naphthyl groups, all of which are optionally substituted. Substituted aryl groups include fully halogenated or semihalogenated aryl groups, such as aryl groups having one or more hydrogens replaced with one or more fluorine atoms, chlorine atoms, bromine atoms and/or iodine atoms. Substituted aryl groups include fully fluorinated or semifluorinated aryl groups, such as aryl groups having one or more hydrogens replaced with one or more fluorine atoms. Aryl groups include, but are not limited to, aromatic group-containing or heterocylic aromatic group-containing groups corresponding to any one of the following benzene, naphthalene, naphthoquinone, diphenylmethane, fluorene, fluoranthene, anthracene, anthraquinone, phenanthrene, tetracene, naphthacenedione, pyridine, quinoline, isoquinoline, indoles, isoindole, pyrrole, imidazole, oxazole, thiazole, pyrazole, pyrazine, pyrimidine, purine, benzimidazole, furans, benzofuran, dibenzofuran, carbazole, acridine, acridone, phenanthridine, thiophene, benzothiophene, dibenzothiophene, xanthene, xanthone, flavone, coumarin, azulene or anthracycline. As used herein, a group corresponding to the groups listed above expressly includes an aromatic or heterocyclic aromatic radical, including monovalent, divalent and polyvalent radicals, of the aromatic and heterocyclic aromatic groups listed above provided in a covalently bonded configuration in the compounds of the present invention. Aryl groups optionally have one or more aromatic rings or heterocyclic aromatic rings having one or more electron donating groups, electron withdrawing groups and/or targeting ligands provided as substituents.

Arylalkyl groups are alkyl groups substituted with one or more aryl groups wherein the alkyl groups optionally carry additional substituents and the aryl groups are optionally substituted. Specific alkylaryl groups are phenyl-substituted alkyl groups, e.g., phenylmethyl groups. Alkylaryl groups are alternatively described as aryl groups substituted with one or more alkyl groups wherein the alkyl groups optionally carry additional substituents and the aryl groups are optionally substituted. Specific alkylaryl groups are alkyl-substituted phenyl groups such as methylphenyl. Substituted arylalkyl groups include fully halogenated or semihalogenated arylalkyl groups, such as arylalkyl groups having one or more alkyl and/or aryl having one or more hydrogens replaced with one or more fluorine atoms, chlorine atoms, bromine atoms and/or iodine atoms.

Optional substitution of any alkyl, alkenyl and aryl groups includes substitution with one or more of the following substituents: halogens, —CN, —COOR, —OR, —COR, —OCOOR, —CON(R)$_2$, —OCON(R)$_2$, —N(R)$_2$, —NO$_2$, —SR, —SO$_2$R, —SO$_2$N(R)$_2$ or —SOR groups. Optional substitution of alkyl groups includes substitution with one or more alkenyl groups, aryl groups or both, wherein the alkenyl groups or aryl groups are optionally substituted. Optional substitution of alkenyl groups includes substitution with one or more alkyl groups, aryl groups, or both, wherein the alkyl groups or aryl groups are optionally substituted. Optional substitution of aryl groups includes substitution of the aryl ring with one or more alkyl groups, alkenyl groups, or both, wherein the alkyl groups or alkenyl groups are optionally substituted.

Optional substituents for alkyl and alkenyl groups include among others:
—COOR where R is a hydrogen or an alkyl group or an aryl group and more specifically where R is methyl, ethyl, propyl, butyl, or phenyl groups all of which are optionally substituted;
—COR where R is a hydrogen, or an alkyl group or an aryl groups and more specifically where R is methyl, ethyl, propyl, butyl, or phenyl groups all of which groups are optionally substituted;
—CON(R)$_2$ where each R, independently of each other R, is a hydrogen or an alkyl group or an aryl group and more specifically where R is methyl, ethyl, propyl, butyl, or phenyl groups all of which groups are optionally substituted; R and R can form a ring which may contain one or more double bonds;
—OCON(R)$_2$ where each R, independently of each other R, is a hydrogen or an alkyl group or an aryl group and more specifically where R is methyl, ethyl, propyl, butyl, or phenyl groups all of which groups are optionally substituted; R and R can form a ring which may contain one or more double bonds;
—N(R)$_2$ where each R, independently of each other R, is an alkyl group, acyl group or an aryl group and more specifically where R is methyl, ethyl, propyl, butyl, or phenyl or acetyl groups all of which are optionally substituted; or R and R can form a ring which may contain one or more double bonds.
—SR, —SO$_2$R, or —SOR where R is an alkyl group or an aryl groups and more specifically where R is methyl, ethyl, propyl, butyl, phenyl groups all of which are optionally substituted; for —SR, R can be hydrogen;
—OCOOR where R is an alkyl group or an aryl groups;
—SO$_2$N(R)$_2$ where R is a hydrogen, an alkyl group, or an aryl group and R and R can form a ring;
—OR where R is H, alkyl, aryl, or acyl; for example, R can be an acyl yielding —OCOR* where R* is a hydrogen or an alkyl group or an aryl group and more specifically where R* is methyl, ethyl, propyl, butyl, or phenyl groups all of which groups are optionally substituted.

As used herein, the term "alkylene" refers to a divalent radical derived from an alkyl group or as defined herein. Alkylene groups in some embodiments function as attaching and/or spacer groups in the present compositions. Compounds of the present invention include substituted and unsubstituted $C_1$-$C_{30}$ alkylene, $C_1$-$C_{12}$ alkylene and $C_1$-$C_5$ alkylene groups. The term "alkylene" includes cycloalkylene and non-cyclic alkylene groups.

As used herein, the term "cycloalkylene" refers to a divalent radical derived from a cycloalkyl group as defined herein. Cycloalkylene groups in some embodiments function as attaching and/or spacer groups in the present compositions. Compounds of the present invention include substituted and unsubstituted $C_1$-$C_{30}$ cycloalkenylene, $C_1$-$C_{12}$ cycloalkenylene and $C_1$-$C_5$ cycloalkenylene groups.

As used herein, the term "alkenylene" refers to a divalent radical derived from an alkenyl group as defined herein. Alkenylene groups in some embodiments function as attaching and/or spacer groups in the present compositions. Compounds of the present invention include substituted and unsubstituted $C_1$-$C_{20}$ alkenylene, $C_1$-$C_{12}$ alkenylene and $C_1$-$C_5$ alkenylene groups. The term "alkenylene" includes cycloalkenylene and non-cyclic alkenylene groups.

As used herein, the term "cycloalkenylene" refers to a divalent radical derived from a cylcoalkenyl group as defined herein. Cycloalkenylene groups in some embodiments function as attaching and/or spacer groups in the present compositions.

Specific substituted alkyl groups include haloalkyl groups, particularly trihalomethyl groups and specifically trifluoromethyl groups. Specific substituted aryl groups include mono-, di-, tri, tetra- and pentahalo-substituted phenyl groups; mono-, di-, tri-, tetra-, penta-, hexa-, and hepta-halo-substituted naphthalene groups; 3- or 4-halo-substituted phenyl groups, 3- or 4-alkyl-substituted phenyl groups, 3- or 4-alkoxy-substituted phenyl groups, 3- or 4-RCO-substituted phenyl, 5- or 6-halo-substituted naphthalene groups. More specifically, substituted aryl groups include acetylphenyl groups, particularly 4-acetylphenyl groups; fluorophenyl groups, particularly 3-fluorophenyl and 4-fluorophenyl groups; chlorophenyl groups, particularly 3-chlorophenyl and 4-chlorophenyl groups; methylphenyl groups, particularly 4-methylphenyl groups, and methoxyphenyl groups, particularly 4-methoxyphenyl groups.

As used herein, the term "halo" refers to a halogen group such as a fluoro (—F), chloro (—Cl), bromo (—Br) or iodo (—I).

As to any of the above groups which contain one or more substituents, it is understood, that such groups do not contain any substitution or substitution patterns which are sterically impractical and/or synthetically non-feasible. In addition, the compounds of this invention include all stereochemical isomers arising from the substitution of these compounds.

Superoleophobic and Non-Wetting Surfaces

Surfaces with extreme wetting properties, including superoleophobicity, are useful for the collection, manipulation, transport, and avoidance of aqueous and organic fluids of commercial and strategic importance. Two major obstacles to the deployment of synthetic non-wetting materials in practical scenarios are their lack of mechanical durability and their susceptibility to fouling in contaminated or chemically complex media. The present invention provides crosslinked microporous and nanoporous polymer multilayer films and coatings that overcome these limitations and exhibit robust and tunable "underwater superoleophobicity", or the ability to almost completely prevent contact with oils and other organic fluids when submerged in water. These multilayer films and coatings mimic key chemical and structural features found on the scales of fish and other natural anti-oil-fouling surfaces, and are remarkably tolerant to physical, chemical, and environmental insults commonly encountered in natural and synthetic aqueous environments. This approach also permits facile manipulation and patterning of surface chemistry and, thus, tunable spatial control over other important aspects of interfacial behavior, such as underwater oil adhesiveness, that extend and expand the potential utility of synthetic anti-oil-fouling surfaces in aqueous, aquatic, and marine environments.

The thin polymer multilayer films and coatings of the present invention exhibit robust underwater superoleophobicity and remarkable structural and functional tolerance to a broad range of physical, chemical, and environmental challenges encountered by surfaces deployed in aqueous or aquatic environments. These multilayer films and coatings can be entirely organic and can be applied to surfaces of arbitrary shape, size, and composition and provide straightforward means to manipulate surface chemistry and, thereby, fine-tune other useful features of their interfacial behavior. The materials exemplified herein address important obstacles to the deployment of synthetic "superphobic" materials in applied settings, provide new classes of durable anti-fouling and oil-resistant surfaces, and establish a framework for the investigation of molecular-level and nanoscale/microscale design features that expand the range of properties of synthetic surfaces that exhibit extreme anti-oil-fouling behaviors.

It is to be understood that this invention is not limited to only the specific methodology, protocols, subjects, or reagents described, and as such may vary. It is also to be understood that the terminology used herein is for the purpose of describing particular embodiments only, and is not intended to limit the scope of the present invention, which is limited only by the claims. The following examples are offered to illustrate, but not to limit the claimed invention.

EXAMPLE 1

Fabrication and Characterization

In one approach, the fabrication is performed using covalent layer-by-layer assembly of polymer bilayers using branched poly(ethyleneimine) (PEI) and the amine-reactive polymer poly(vinyl-4,4-dimethylazlactone) (PVDMA) (Buck et al., Adv. Mater. (2007), 19:3951). This approach yields multilayer films and coatings that are chemically crosslinked (owing to the formation of chemically stable amide/amide linkages during assembly) (see Buck et al., Adv. Mater. (2007), 19:3951) and contain amine-reactive azlactone groups that can be used to define and tailor interfacial properties after assembly (by treatment with molecules containing primary amines) (see Buck et al., Biomacromolecules (2009), 10:1564; Buck et al., ACS Appl. Mater. Interfaces (2010), 2: 1421; Broderick etal., Chem. Mater. (2012), 24:1786; and Manna et al., Adv. Mater. (2012), 24:4291).

A series of initial experiments was performed to compare the interfacial properties of PEI/PVDMA multilayers brought into contact with aqueous and organic fluids in air and when submerged underwater. For these studies, multilayer films were fabricated from 10 layer-pairs of PEI and PVDMA using a procedure that leads to thin (e.g., 10 μm or less, preferably 2 μm or less) and nanoporous films with enhanced surface roughness; these films were then functionalized by reaction with the model carbohydrate D-glucamine to install hydrophilic hydroxyl groups (Buck et al., Biomacromolecules (2009), 10:1564).

These coatings were 1.1±0.4 μm thick and were readily and rapidly wet by droplets of water (FIG. 1A) and the model oil dichloroethane (DCE; ρ=1.25 g mL$^{-1}$; FIG. 1B) under air (θ≈0°). In contrast, these coatings were extremely non-wetting to DCE when they were submerged in water (FIG. 1C). Small droplets of DCE (10 μL) settled onto submerged surfaces with contact angles of ≈161° (FIG. 1D), and rolled off immediately if surfaces were not held perfectly level (with a contact angle hysteresis, or "roll-off" angle, of ≈1°; FIGS. 5A-5H). Droplets of DCE dropped under water from a distance of 5 cm bounced freely on these surfaces (FIGS. 6A-6E), further revealing low oil adhesiveness. These coatings were also superoleophobic to other model oils, including $CCl_4$, $CH_2Br_2$, and the thermotropic liquid crystal E7 (θ≈160°-162°, see FIG. 1G), inset and Table 1 (below); the oils used were selected to be more dense than water (ρ=1.59 g mL$^{-1}$, 2.47 g mL$^{-1}$, and 1.03 g mL$^{-1}$, respectively) to facilitate characterization of θ). As revealed in FIG. 1G, these coatings were optically transparent when wet, with a transmittance ≈90% that of glass at λ>500 nm. This feature broadens the range of applications for which these materials are suited, and permits use of optical methods to interrogate and characterize the behaviors of non-wetting liquids (e.g., μ-scale droplets of oil-in-water emulsions, etc.).

TABLE 1

Contact Angles (Θ) of Model Oils

| Model Oils | $\theta_{adv}$ (°) | $\theta_{hys}$ (°) |
|---|---|---|
| DCE | 160.3 ± 0.9 | 0.9 ± 0.4 |
| CCl$_4$ | 159.7 ± 1.1 | 0.7 ± 0.3 |
| E7 | 159.6 ± 0.7 | 0.5 ± 0.3 |
| CH$_2$Br$_2$ | 161.8 ± 0.6 | 0.8 ± 0.5 |

Table 1 shows underwater advancing contact angles and associated hysteresis for these four oils. Data represent mean±s.d. (n=5).

Characterization of these coatings by scanning electron microscopy (SEM) revealed substantial nanoscale porosity and the presence of both micro and nanoscale topographic features (FIG. 1E and FIG. 1F). The underwater superoleophobicity of these thin films depended critically upon the presence of these features; otherwise identical smooth films devoid of these features did not exhibit underwater superoleophobicity (θ≈142°, with high hysteresis (≈19°); see FIGS. 7A-7D). The origins of these features are not completely understood, but they appear to result, at least in part, from the reactive deposition of nanoscale aggregates of PEI and PVDMA during assembly; protocols that prevented the formation of these aggregates lead to smooth films that lacked these features (FIGS. 7A-7D). The methods used here to coat planar glass surfaces could also be used to rapidly and reproducibly deposit uniform and porous superoleophobic coatings on other objects of diverse shape, size, and composition.

EXAMPLE 2

Tolerance to Physical, Chemical, and Environmental Challenges

Figures 2A, 2Q:
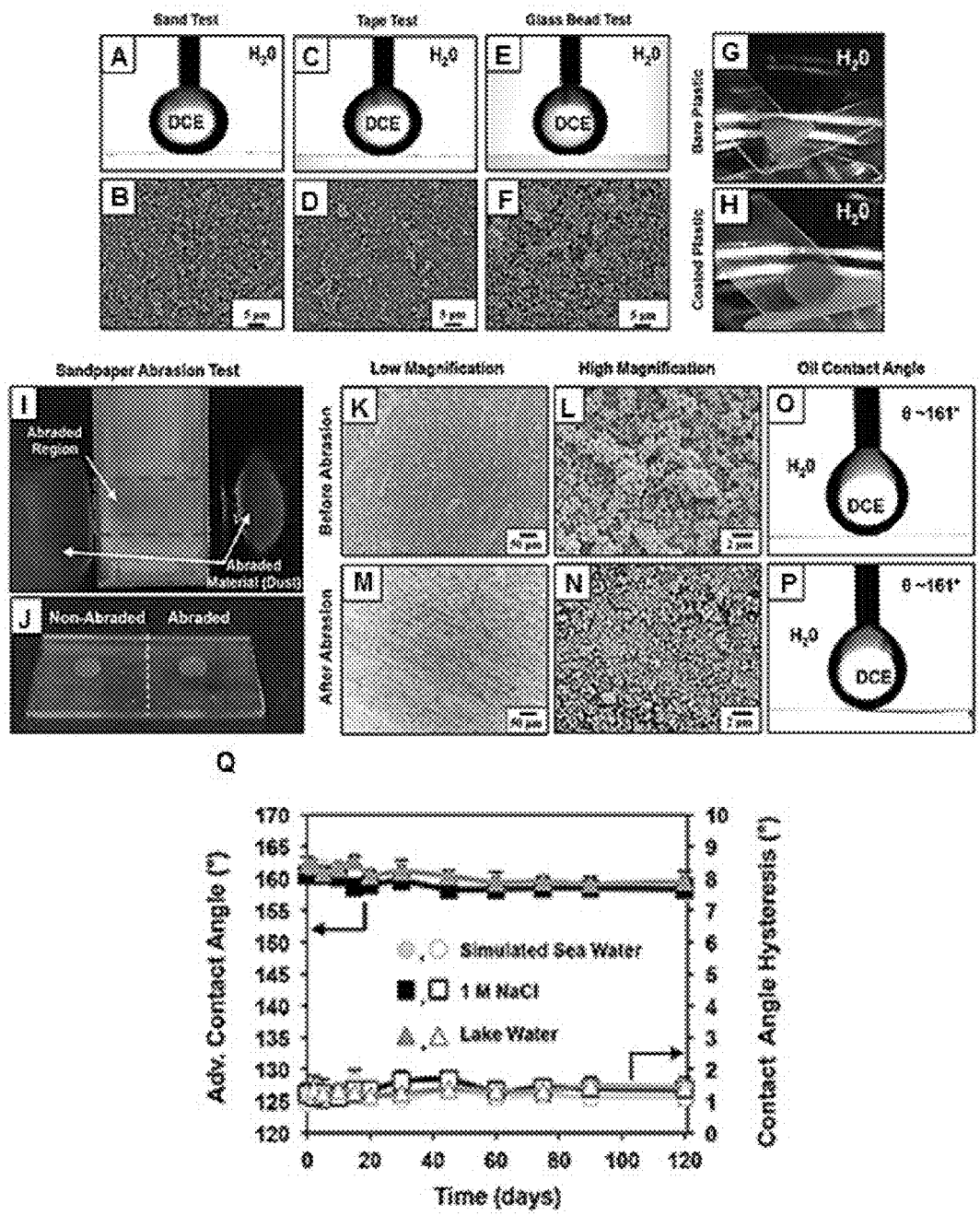
FIGS. 2A-2Q illustrate physical, chemical, and environmental stability of underwater superoleophobic multilayers in an embodiment of the invention.

The crosslinked and porous features of these coatings combine to endow them with remarkable tolerance to a wide range of different physical, chemical, and environmental challenges that can compromise non-wetting interfaces and are well-known to damage or disrupt hydrogels and polyelectrolyte assemblies used to design other synthetic underwater oil-repellant surfaces. The morphologies and wetting behaviors of the coatings were characterized using two tests for characterizing the durability of conventional non-wetting surfaces (Deng et al., Science (2012), 335: 67; and Deng et al., Adv. Mater. (2011), 23:2962). In the first test, sand grains were dropped onto dry coatings from a height of 20 cm (FIG. 2A and FIG. 2B; setup shown in FIGS. 8A and 8B). In the second test, adhesive tape was applied with a pressure of ≈445 kPa and then peeled off (FIG. 2C and FIG. 2D). No large-scale erosion, cracking, or peeling was observed, in either case, by visual inspection. Further characterization by SEM revealed no changes in micro/nanoscale morphology in response to these insults (FIG. 2B and FIG. 2C), and the underwater oil contact angles of both films remained unchanged (≈159° and hysteresis of ≈1°; FIG. 2A and FIG. 2C and Table 2).

TABLE 2

Results of Physical and Chemical Tests

| Tests | Θadv (°) | Θhys (°) |
|---|---|---|
| Sand test | 159.2 ± 1.1 | 0.9 ± 0.6 |
| Sandpaper Test | 161.2 ± 0.9 | 0.9 ± 0.7 |
| Tape Test | 159.4 ± 0.8 | 1.0 ± 0.5 |
| Glass Bead Test | 158.9 ± 1.2 | 0.9 ± 0.4 |
| Water Stream | 160.6 ± 0.9 | 0.9 ± 0.5 |
| Boiling Water | 159.7 ± 0.8 | 0.8 ± 0.7 |
| Autoclaving | 160.02 ± 0.7 | 0.9 ± 0.6 |
| Freezing Water | 159.9 ± 0.9 | 1.0 ± 0.8 |
| Acidic Water (pH 11) | 159.8 ± 1.1 | 0.9 ± 0.8 |
| Alkaline Water (pH 11) | 160.2 ± 0.9 | 1.1 ± 0.7 |
| Bending & Creasing | 161.1 ± 0.8 | 0.9 ± 0.7 |

Table 2 shows underwater advancing contact angles and associated hysteresis for coatings exposed to physical, chemical, and environmental challenges. Data represent mean±s.d. (n=5).

Repeated abrasion with sandpaper resulted in scratching and the removal of substantial amounts of material from these coatings (FIG. 2I). Remarkably, however, this severe physical damage did not impact underwater superoleophobicity (θ≈161°, hysteresis of ≈1°; FIGS. 2J, 2O and 2P and Table 2). SEM characterization of these severely scratched coatings revealed abrasion of these porous multilayers to expose new microscale and nanoscale topography with physical and chemical features sufficient to maintain extreme anti-oil-fouling behavior (FIGS. 2K-2N). Thus, while these crosslinked surfaces are not able to completely resist all forms of physical damage, their porous structures provide them with means to tolerate severe insults without loss of underwater non-wetting behavior. This property is unique and similar to that of several recently reported porous superhydrophobic materials (Deng et al., Science (2012), 335:67; Manna et al., Adv. Mater. (2013), 25:5104; and Levkin et al., Adv. Funct. Mater. (2009), 19:1993), and it increases the durability and potential utility of these surfaces relative to other synthetic underwater anti-oil-fouling coatings.

To characterize physical stability when hydrated, two other tests were performed in which (i) 50 g of solid glass beads (diameter=2-3 mm) were dropped onto coatings submerged under 15 cm of water (setup shown in FIGS. 8A-8B), and (ii) films were exposed to water ejected from a rapidly flowing faucet for 30 min (flow rate=100 mL s$^{-1}$; nozzle velocity=127.4 cm s$^{-1}$; distance of the surface from nozzle ≈2 cm). These challenges had no apparent impact on film morphology (FIG. 2F) or wetting behavior (θ159°-160°, hysteresis of ≈1°; FIG. 2E and Table 2). Finally, coatings fabricated on sheets of poly(ethylene terephthalate) (PET) permitted characterization of the influence of flexing and bending on physical and functional integrity. Coatings fabricated on PET exhibited micro/nanoscale morphologies and wetting behaviors similar to those deposited on glass (θ≈161°; FIG. 9A) and remained anti-fouling after repeated bending and permanent creasing (e.g., FIG. 2H and FIG. 2H, Table 2, and FIG. 9A; θ≈161° after creasing).

Coatings boiled in water for 1 h or exposed to autoclave steam cycles did not delaminate and remained non-wetting after cooling to ambient temperature (θ≈160°, hysteresis of ≈1°; Table 2). Coatings frozen into blocks of ice also retained their anti-fouling properties; freeze/thaw cycles were repeated at least 10× without loss of underwater superoleophobicity (θ≈160°, with hysteresis of ≈1° after 10 cycles; Table 2). It is concluded that these coatings can withstand the extremes of temperature (from 0° C. to 100° C., preferably from −50° C. to 200° C.) and full range of associated water phase changes likely to be encountered during use in synthetic or natural aqueous environments. The ability to withstand autoclaving provides opportunities to exploit these anti-fouling surfaces in contexts where sterilization is critical.

Figure 10:
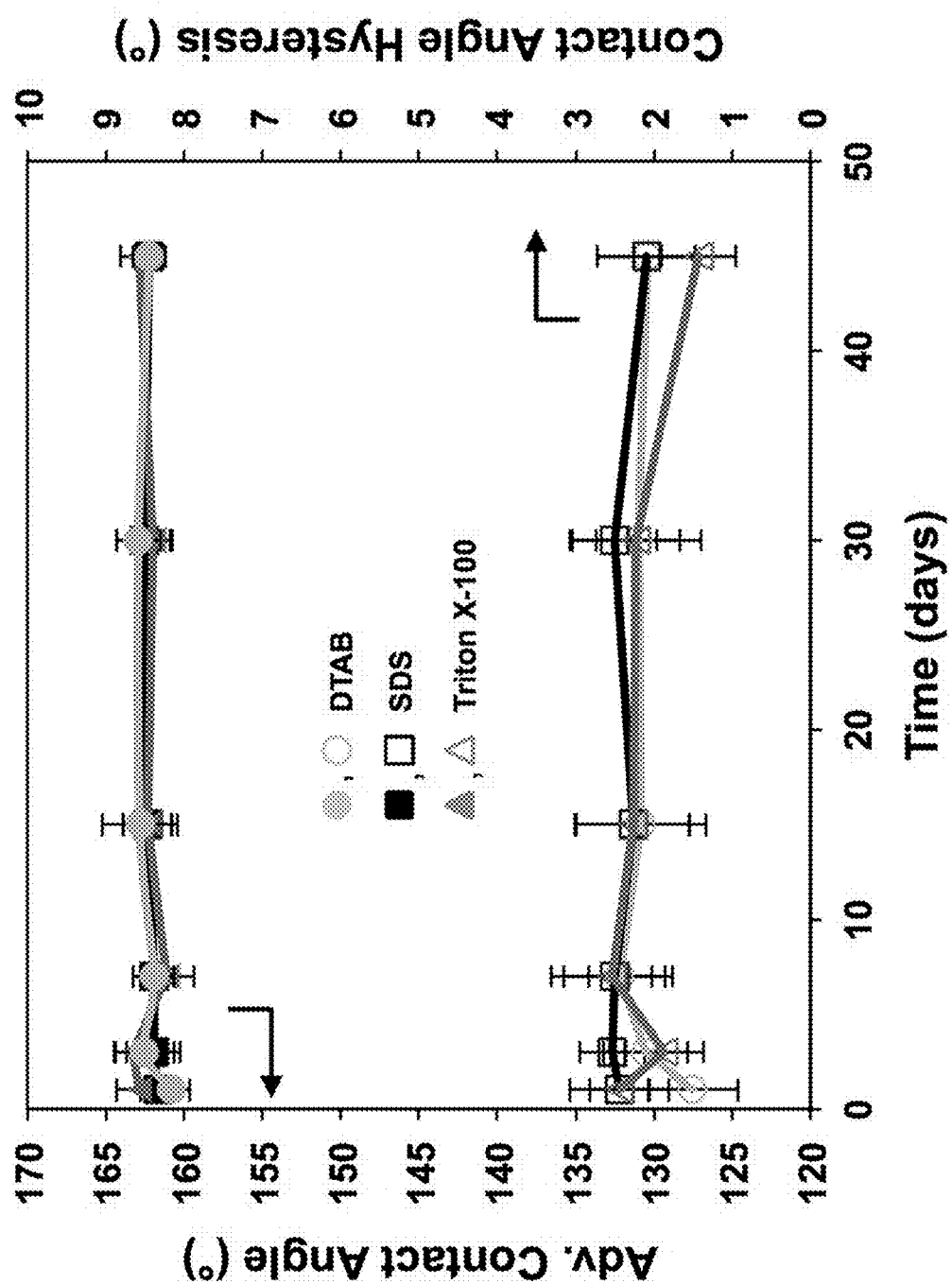
FIG. 10 provides a plot showing advancing oil contact angles and associated hysteresis for coatings exposed to concentrated solutions of cationic (DTAB, 5.0 M), anionic (SDS, 5.0 M) and nonionic (Triton 100-X, 1.0 M) surfactants for 45 days. Data represent the mean±s.d (n=5).

The impact of harsh chemical environments and media of increasing complexity on film integrity and non-wetting behavior was also investigated, including exposure to (i) extremes of pH (e.g., a pH of 1 or lower or a pH of 11 or greater) and ionic strength and (ii) surface-active agents and other species (surfactants, lipids, and proteins) known to adsorb at interfaces and cause changes in wettability. Coatings submerged in solutions of HCl (0.5 M, pH=1) and NaOH (0.5 M, pH=11) for 30 min remained superoleophobic (Table 2; ≈160°) with low oil adhesion (hysteresis ≈1°). Films incubated in high concentrations of cationic, anionic, and nonionic surfactants [5.0 M sodium dodecyl sulfate (SDS) or dodecyltrimethyl-ammonium bromide (DTAB), and Triton X-100 (1.0 M)] and mammalian cell culture media containing 10% serum did not exhibit changes in non-wetting behavior for at least 45 days (FIG. 10). The potential utility of these coatings in marine environments and other high ionic strength media was also assessed by incubating them in simulated seawater and solutions of 1.0 M NaCl (FIG. 2Q); the advancing oil contact angles of these surfaces remained above 158° (with hysteresis <2°) for at least 4 months under these conditions. Finally, to assess stability in other complex aquatic environments, coatings were submerged in eutrophic lake water containing well-characterized concentrations of dissolved and suspended organic matter, inorganic compounds, and microbial flora (Bortleson et al., Environ. Sci. Technol. (1972), 6:799; and Brock et al., Appl. Environ. Microbiol. (1984), 47:731). Underwater superoleophobicity remained unaffected by the components of this complex medium for at least 4 months (FIG. 2Q).

EXAMPLE 3

Chemical Manipulation and Spatial Patterning of Underwater Oil Adhesiveness

The reactive process used to assemble these crosslinked multilayers leaves behind residual azlactone groups that enable installation of secondary surface functionality (e.g., glucamine) (see Buck et al., Adv. Mater. (2007), 19:3951). This unique feature allowed for the systematic varying and characterization of the impact of different chemical motifs on non-wetting properties while maintaining all other nano and microscale topographic features constant (FIG. 3A). Surfaces treated to present positively or negatively charged groups (quaternary amines (2) or carboxylates (3); FIG. 3A) remained hydrophilic and exhibited underwater oil contact angles of ≈158° (hysteresis ≈1°). Combined with the results above for hydroxyl-functionalized films, these results reveal surface hydrophilicity itself, and not the specific chemical nature of the groups that confer it, to be the principal chemical factor impacting maintenance of superoleophobicity.

Figures 11A, 11T:
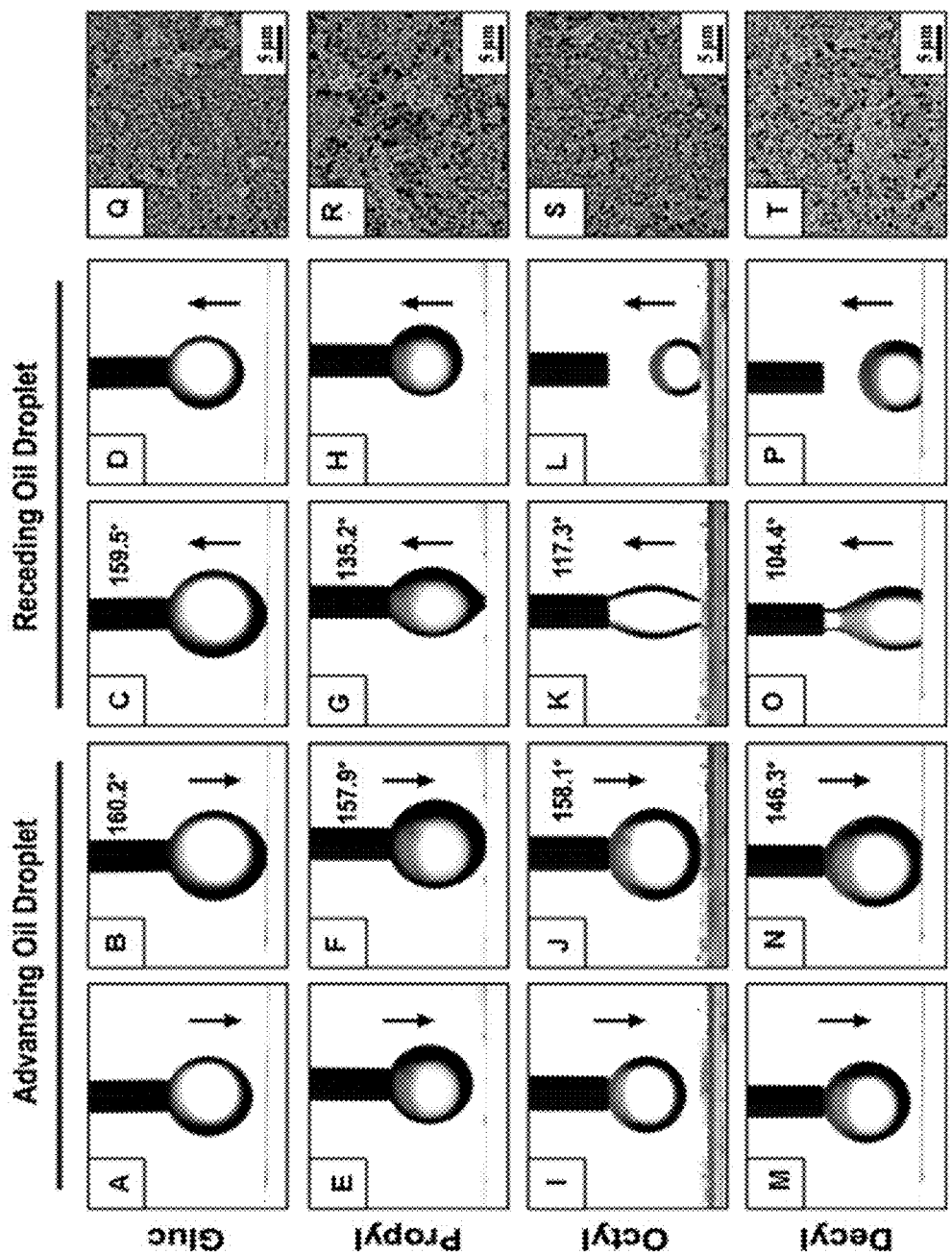
FIGS. 11A-11T provide images showing the wetting of droplets of DCE on chemically functionalized polymer multilayers, showing advancing (FIGS. 11A, 11B, 11E, 11F, 11I, 11J, 11M and 11N) and receding (FIGS. 11C, 11D, 11G, 11H, 11K, 11L, 11O and 11P) DCE droplets (10 μL) and their associated contact angles on coatings functionalized with glucamine (FIGS. 11A-11D), propylamine (FIGS. 11E-11H), octylamine (FIGS. 11I-11L), and decylamine (FIGS. 11M-11P).
Figures 13A, 13B, 13C, 13D, 13E, 13F:
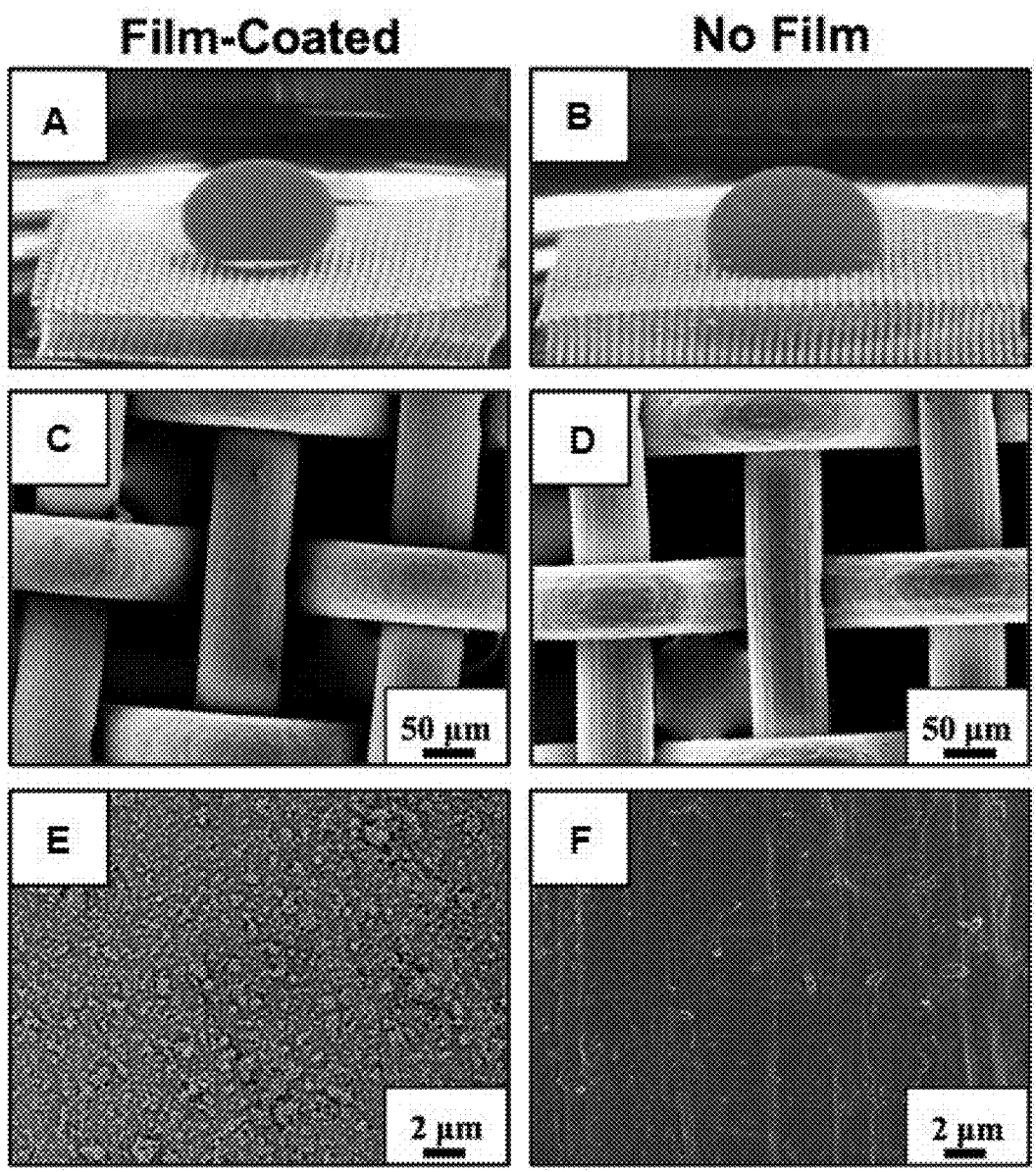
FIGS. 13A-13F show beading of a droplet of DCE on a sample of stainless steel mesh coated with glucamine-functionalized multilayers (FIG. 13A).

Interestingly, when these films were functionalized with hydrophobic propyl (C 3) groups, advancing underwater contact angles did not change significantly ($\theta \approx 158°$; Table 3 and FIG. 3D). However, the contact angle hysteresis for these hydrophobically modified films increased substantially (from ≈1° to ≈23°; Table 3 and FIG. 3D and FIG. 3E), revealing an increase in oil adhesiveness (hysteresis provides a quantitative measure of oil adhesiveness; deformation of the receding droplet shown in FIG. 3E and additional results shown in FIGS. 11A-T, provide visual indications). Decoration with more hydrophobic octyl (C 8) groups (5) also did not influence θ significantly (≈158°), but hysteresis increased substantially to ≈42° (Table 3 and FIG. 3F and FIG. 3G). Longer decyl (C 10) groups (6) resulted in a reduction of the advancing contact angle (to) ≈146°, but no further increase in droplet roll-off angles (hysteresis remained at ≈44°; Table 3 and FIG. 3H and FIG. 3I). These changes in wetting behavior and adhesiveness arise solely from differences in the chemical structures (and thus the relative surface energies) of these hydrophobically modified films; characterization by SEM revealed no change in nano/microscale topography after chemical functionalization (FIGS. 11A-11T). Taken together, these results provide the basis of a chemical and molecular-level approach that can be used to tune underwater oil adhesiveness—i.e., to create synthetic surfaces that are either (i) non-wetting and non-adhesive to oils (using hydrophilic groups) or (ii) superoleophobic, but with tunable degrees of oil adhesiveness (by varying the structures of lower energy hydrophobic groups).

TABLE 3

Contact Angles of Chemically-Functionalized films

| Film Functionality | | $\theta_{H_2O}$ in air (°) | $\theta_{DCE}$ in air (°) | $\theta_{DCE}$ under $H_2O$ (°) | $\theta_{hys}$ (°) |
|---|---|---|---|---|---|
| Hydrophilic | -Gluc (1) | ~0 | ~0 | 160.3 ± 0.9 | 0.9 ± 0.4 |
| | —NR$_3^+$ (2) | ~0 | ~0 | 158.9 ± 1.6 | 0.7 ± 0.3 |
| | —COO (3) | ~0 | ~0 | 158.1 ± 1.1 | 0.9 ± 0.3 |
| Hydrophobic | -Propyl(4) | 67.3 ± 3.9 | ~0 | 157.8 ± 0.8 | 23.1 ± 2.1 |
| | -Octyl(5) | 108.4 ± 4.5 | ~0 | 158.1 ± 1.6 | 42.4 ± 3.2 |
| | -Decyl(6) | 116.5 ± 3.2 | ~0 | 145.6 ± 2.1 | 44.2 ± 4.4 |

Table 3 shows (i) the advancing contact angles of water and DCE under air and (ii) the advancing underwater oil contact angle and hysteresis for these chemically functionalized films. Data represent the mean±s.d. (n=5).

Figures 4A, 4B, 4C, 4D, 4E, 4F, 4G, 4H, 4I, 4J, 4K:
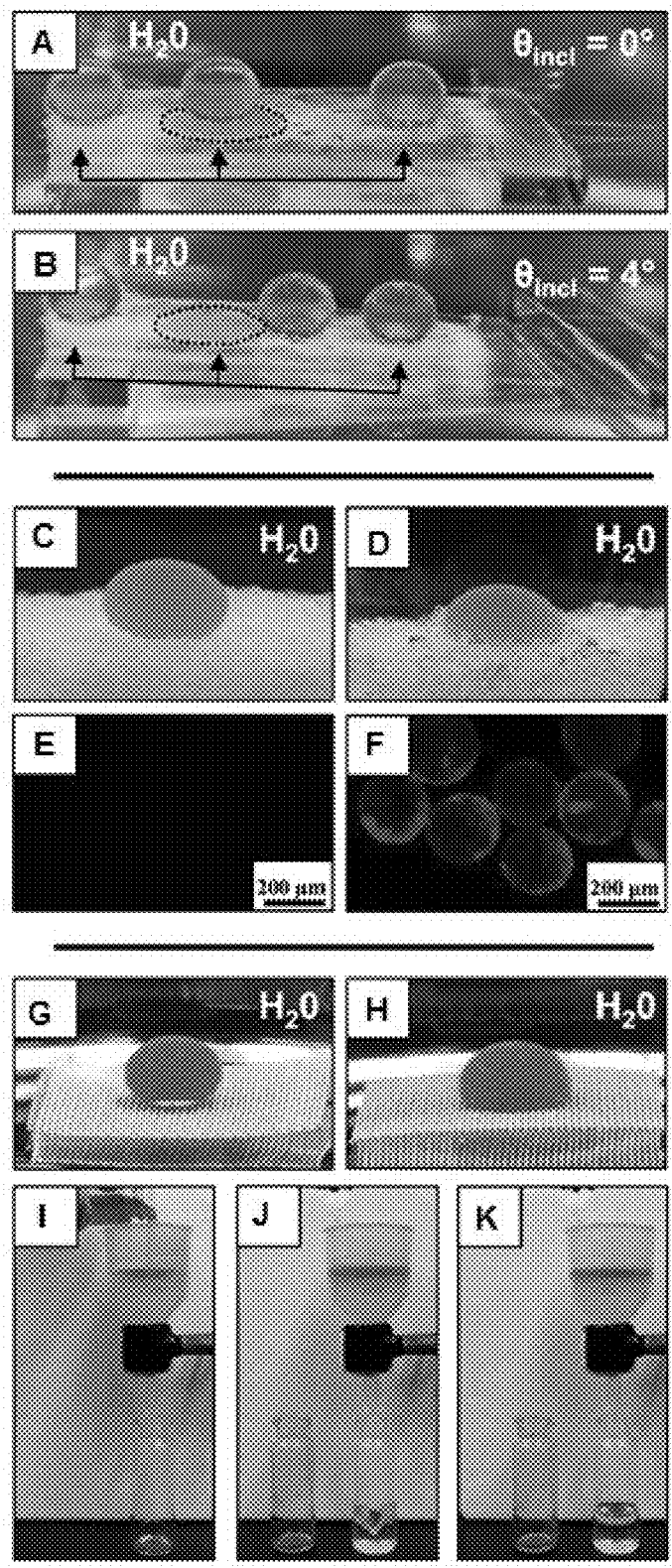
FIGS. 4A-4K illustrate chemical patterning and fabrication of underwater superoleophobic multilayers on topologically complex substrates in an embodiment of the invention.
Figures 5A, 5B, 5C, 5D, 5E, 5F, 5G, 5H:
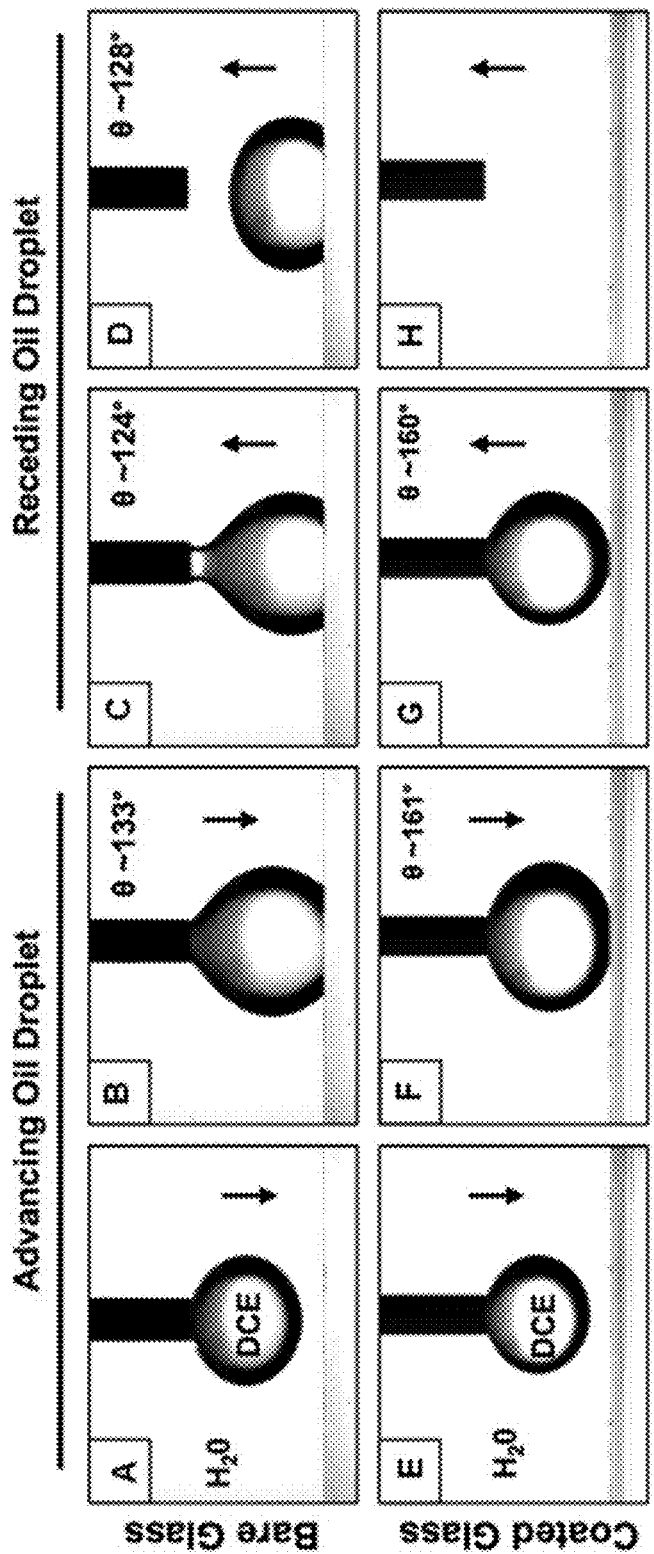
FIGS. 5A-5H illustrate the underwater advancing (FIGS. 5A, 5B, 5E and 5F) and underwater receding (FIGS. 5C, 5D, 5G and 5H) contact angles of a 10 μL droplet of DCE on both bare glass (FIGS. 5A-5D) and a glass substrate coated with a glucamine-functionalized multilayer film (FIGS. 5E-5H).
Figures 6A, 6B, 6C, 6D, 6E:
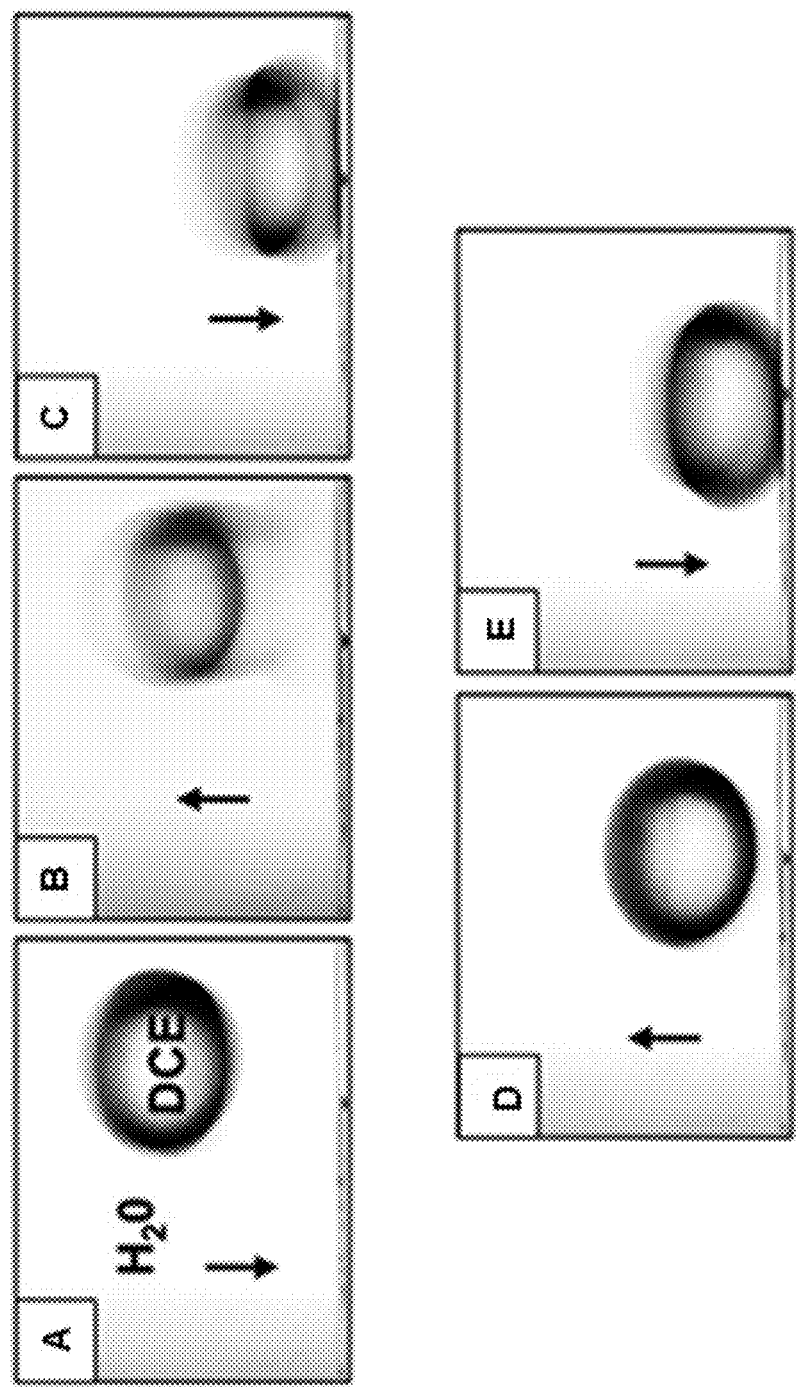
FIGS. 6A-6E show images of a droplet of DCE (~17 μL) bouncing on the surface of a submerged glucamine-functionalized multilayer coating. The droplet was dropped, underwater, onto the surface from a distance of ~5 cm. Falling droplets were observed to bounce back immediately after initially hitting the surface, as shown in (b) FIG. 6B, and again in FIG. 6D.
Figures 7A, 7B, 7C, 7D:
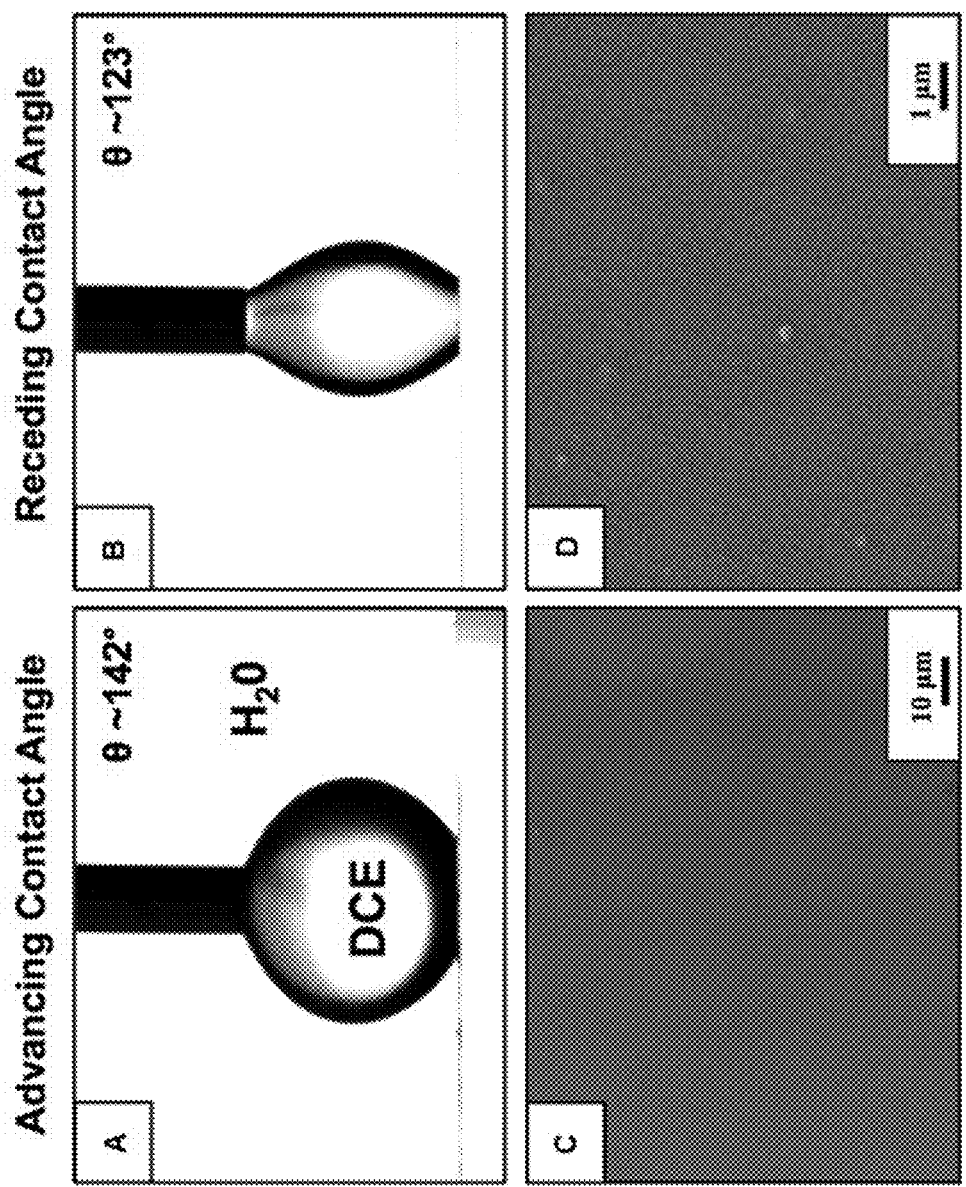
FIGS. 7A-7D provide images showing the underwater advancing contact angle θ~142° in FIG. 7A, and underwater receding contact angle θ~123°) in FIG. 7B of a droplet of DCE on thin (~60 nm thick) glucamine-functionalized multilayers that did not exhibit significant nanoscale porosity or nanoscale and microscale topographic features characteristic of the thicker and rougher films shown in FIGS. 1E and 1F.

These two conditions are similar in some respects to the non-adhesive Cassie-Baxter and adhesive Wenzel states used to describe the behavior of water on superhydrophobic surfaces (Cassie et al., Faraday Soc. (1944), 40:546; and Wenzel et al., Ind. Eng. Chem. (1936), 28:988). The results thus indicate principles that can be used to capture, release, pattern, and manipulate the transport of organic fluids on surfaces in aquatic environments. As proof of concept, FIG. 4A shows a submerged glass slide coated with a superoleophobic, but adhesive (propyl-functionalized) film, and a small, circular region spatially patterned to be non-wetting and non-adhesive (dotted circle). Droplets of DCE placed in both regions remained stationary when the substrate was held perfectly horizontal (FIG. 4A). Droplets placed in adhesive areas remained pinned and did not roll off when the substrate was tipped slightly (e.g., θ incl=4°). The droplet in the non-adhesive patterned region rolled downhill, but became pinned upon contact with the adhesive region of the pattern (FIG. 4B). These arrested droplets could be dislodged and induced to roll again by tipping substrates at angles >23° or by inducing flows in the surrounding liquid.

EXAMPLE 4

Complex Substrates and Surfaces

The process used to assemble these coatings also enables fabrication of underwater superoleophobic surfaces on a wide range of macroscale and microscale objects, including curved surfaces. Two examples of potential utility are described here to demonstrate proof of principle. FIG. 4C shows a pile of glass microspheres (diameter=200-300 μm) coated with glucamine-functionalized films. Characterization of these beads by SEM revealed topographic features similar to those found on planar surfaces (FIGS. 12A-H), and bead-beds created from these coated microspheres were non-wetting to DCE in underwater environments (θ≈163°, hysteresis ≈1°; FIG. 4C, a droplet of DCE on a pile of bare glass beads is shown in FIG. 4D). It was not possible to characterize the oleophobicity of individual beads by measurement of contact angles. However, experiments using beads dispersed in water/DCE emulsions revealed individual beads to be strongly oleophobic (FIG. 4E); relative to glass beads coated with adhesive decyl-functionalized films, FIG. 4F.

Figure 14:
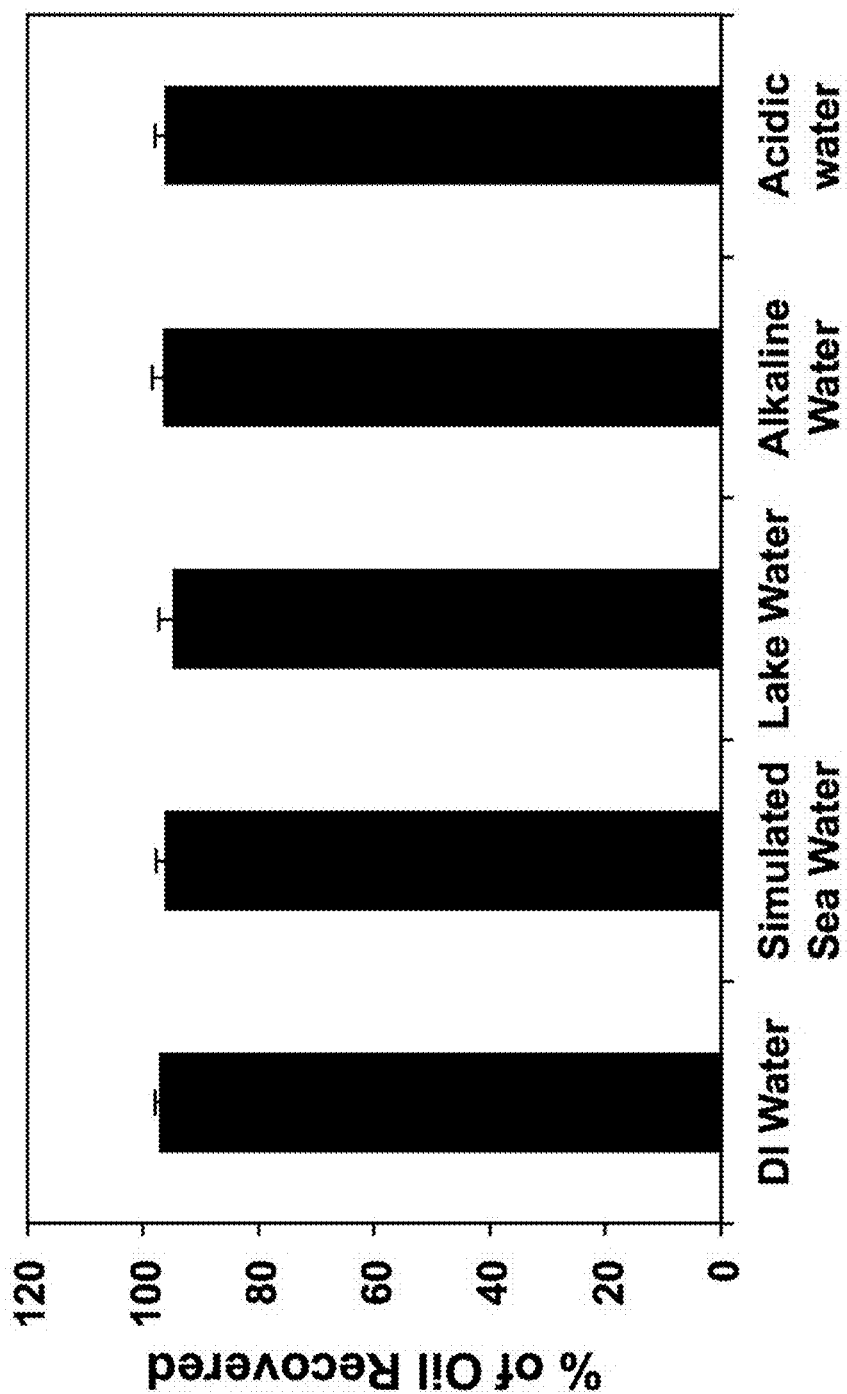
FIG. 14 provides a plot showing the percentage of oil recovered after gravity-driven separation of motor oil and water promoted by pouring oil/water mixtures through stainless steel mesh coated with glucamine-functionalized multilayers. Near quantitative recovery was achieved for oil/water mixtures prepared using automotive motor oil and either DI water, alkaline water (0.5 M, pH=11), acidic water (0.5 M, pH=1), simulated seawater, or lake water.

Finally, FIG. 4G shows stainless steel wire mesh (pore size ≈126 μm) coated with glucamine-functionalized films (see also FIGS. 13A-13F). These coatings prevented wetting by oils (θ≈162° with a hysteresis of ≈1° for DCE), and could be flexed and bent into useful shapes without loss of underwater superoleophobicity. The superhydrophilic but superoleophobic nature of these coated meshes prevented transport of oils through the pores of the mesh, but permitted the passage of water, providing a basis for gravity-driven separation of oil/water mixtures (Kota et al., Nat. Commun. (2012), 3:1; and Zhang et al., Adv. Mater. (2013), 25:2071). FIGS. 4I-4K demonstrates proof of principle using a device constructed from coated mesh and a two-piece plastic funnel. This simple setup permitted low-energy separation of mixtures of water and motor oil (5:1, v/v; ρ=0.843 g mL$^{-1}$); water passed rapidly through the mesh into a collection container (FIG. 4J), and oil free of bulk water accumulated on the mesh (FIG. 4K) and was recovered in near quantitative yields (FIG. 14). This process could be repeated multiple times and degrees of separation were unaffected when more complex oil/water mixtures prepared with acidic water (pH=1), alkaline water (pH=11), simulated seawater, and lake water were used (FIG. 14).

EXAMPLE 5

The synthetic coatings reported here mimic key chemical and structural features found on natural underwater oil-repellent materials (Liu et al., Adv. Mater. (2009), 21:665; Liu et al., Adv. Mater. (2012), 24:3401; Nishimoto et al., RSC Adv. (2013), 3:671; and Cai et al., Adv. Funct. Mater. (2014), 24:809). These results demonstrate these entirely organic materials to be mechanically durable, functionally tolerant to severe physical abrasion, and able to retain their antifouling properties upon prolonged exposure to chemically complex media—outcomes that are attributed to the crosslinked nature of the films, the chemical stability of their amide/amide-based crosslinks, and their porous structures. These unique features, along with the substrate independence of the methods used for assembly, increase the potential utility of these materials in different aqueous, aquatic, and marine environments relative to synthetic oil-repellant surfaces assembled using weak interactions or constructed from soft, brittle, or chemically erodible materials (Liu et al., Adv. Mater. (2009), 21:665; Xu et al., Adv. Mater. (2013), 25:606; Xu et al., ACS Nano (2013), 7:5077; and Zhang et al., Adv. Mater. (2013), 25:2071).

The dependence of non-wetting behavior on surface topography and hydrophilicity is consistent with previous investigations of the structures and behaviors of underwater oil-repellant surfaces. Relative to past approaches to the design of synthetic underwater superoleophobic surfaces, however, the approach above yields amine-reactive coatings that allow surface chemistry to be varied systematically and orthogonally to all other surface and microstructural features. This feature is significant in several ways. First, reactivity provides means to probe and dissect the influence of surface chemistry on non-wetting behavior in ways that are independent of surface topography.

The present results confirm surface hydrophilicity to be critical to the maintenance of superophobicity, but also reveal this property to be tolerant to the variation of exposed hydrophilic groups over a broad range of structural and functional space (e.g., from neutral hydroxyl functionality to formally charged cationic or anionic groups). It is noted here that prior studies demonstrate surfaces decorated with D-glucamine, including self-assembled monolayers (SAMs) on gold (Chapman et al., J. Am. Chem. Soc. (2000), 122: 8303; and Orner et al., J. Am. Chem. Soc. (2004), 126: 10808) and nonporous PEI/PVDMA multilayers deposited on glass (Buck et al., Biomacromolecules (2009), 10:1564), to resist fouling by proteins and cells. The ability of the porous and superoleophobic surfaces to prevent adsorption of surfactants or proteins here was not quantified, but the results reveal that prolonged exposure to proteins and other surface-active agents does not compromise anti-oil-fouling behavior. When combined, these and other unique features of this system provide a platform for the design of multi-functional interfaces that can prevent fouling by organic fluids and other substances, organisms, or environmental contaminants (or perform other useful secondary functions) more effectively.

The present results also establish the basis of an approach that can be used to vary and systematically tune the oil adhesiveness of underwater superoleophobic surfaces. The ability to create surfaces with spatially defined regions that contrast sharply in oil adhesiveness provides new principles for the capture and manipulation of organic fluids in aqueous media. In combination with more sophisticated methods for the deposition and spatial patterning of amine-based "inks," this approach can be used to create macroscale or microscale patterns or devices that enable passive or active control over the wetting behaviors of oils (e.g., to pattern bulk fluids or facilitate and direct the reversible capture and transport of emulsion droplets in microfluidic contexts, etc.). This degree of control over the patterning of adhesive and non-adhesive surface features is difficult to achieve using other methods for the design of underwater superoleophobic surfaces (Huang et al., Adv. Funct. Mater. (2011), 21: 4436).

Finally, it is noted that the amine-reactive azlactone groups of PVDMA also provide means to covalently attach these coatings to substrates bearing amine functionality (Broderick et al., Chem. Mater. (2012), 24:938), including protein-based structures with exposed lysine or other amine functional groups (Buck et al., ACS Appl. Mater. Interfaces (2010), 2:1421). Judicious selection or optimization of substrate design can thus provide other routes to improving performance that are not accessible with coatings assembled using other methods.

The soft material interfaces reported here address key obstacles to the application of non-wetting surfaces and anti-fouling "super-phobic" materials in practical, real-world scenarios. The principles and properties reported here are useful for the design of durable and injury-tolerant oil-repellant coatings and the development of advanced, multifunctional surfaces that enable new means of control over the capture, transport, manipulation, and separation of oils and other organic fluids in fundamental and applied contexts.

The following section describes materials and procedures used in the above examples.

Materials.

2-Vinyl-4,4-dimethylazlactone (VDMA) was a gift from the 3M Corporation, Minneapolis, Minn.). Poly(2-vinyl-4,4-dimethylazlactone) (PVDMA) was synthesized by free-radical polymerization of VDMA both in the presence (MW ≈20 700, PDI 2.4) and absence (MW ≈3 700, PDI 2.4) of 7 wt % of intentionally added cyclic azlactone-functionalized oligomer, as described previously (Buck et al., Chem. Mater. (2010), 22:6319). Branched poly(ethylene imine) (PEI; MW ≈25 000), ethylenediamine (99%), n-decanol (99%), decanethiol (96%), pyrenebutanol (99%), pyrene (98%), 1,8-diazabicycloundec-7-ene (DBU, 98%), hydrazine (anhydrous, 98%), octyl aldehyde (99%), n-propylamine, n-octylamine, n-decylamine (95%), acetone (HPLC grade), tetrahydrofuran (THF, HPLC grade), dichloroethane (DCE), carbon tetrachloride ($CCl_4$), dibromomethane ($CH_2Br_2$), magnesium sulfate, calcium chloride, hydrochloric acid (HCl), sodium hydroxide (NaOH), sodium dodecyl sulfate (SDS), dodecyltrimethylammonium bromide (DTAB), and Nile red were purchased from Sigma-Aldrich (Milwaukee, Wis.).

D-Glucamine (>95%) was purchased from TCI America (Portland, Oreg.). Triton X-100 was obtained from Promega (Madison, Wis.). Dimethylaminopropylamine (DMAPA) and iodine were purchased from Acros (New Jersey, USA). The thermotropic liquid crystal E7 was purchased from Licristal (Japan). Sodium chloride (NaCl), magnesium chloride ($MgCl_2$), glass microscope slides, and solid glass beads having a diameter of 200-300 μm were purchased from Fisher Scientific (Pittsburgh, Pa.). Dulbecco's modified Eagle's medium (DMEM), Opti-MEM cell culture medium, and fetal bovine serum (FBS) were purchased from Invitrogen (Carlsbad, Calif.). Valvoline motor oil was obtained from CITGO Petroleum Corporation (Oklahoma). Thin sheets of poly(ethylene terephthalate) (PET) film (0.004 in. thick) were purchased from McMaster Carr. Stainless steel wire mesh was obtained from MSC Industrial Supply Co. (Melville, N.Y.). Adhesive tape was purchased from 3M Corporation. Deionized water with a resistance of 18.2 MΩ was used to prepare aqueous phases used in all experiments unless otherwise noted. Samples of eutrophic lake water were collected from Lake Mendota (Madison, Wis.). All chemicals were used as received without further purification unless otherwise noted.

General Considerations.

Scanning electron micrographs were acquired using a LEO DSM 1530 scanning electron microscope at an accelerating voltage of 3 kV. Prior to imaging, samples were coated with a thin layer of gold using a gold sputterer operating at 45 mA under a vacuum pressure of 50 mTorr for 40 s. Digital pictures were acquired using a Canon PowerShot SX130 IS digital camera. Advancing and receding contact angle measurements were made using a Dataphysics OCA 15 Plus contact angle goniometer at ambient temperature using 10 μL of model oils both in air and under water; a minimum of five measurements was made in at least five locations on each film. The optical thicknesses of films were characterized using a Gaertner LSE ellipsometer (632.8 nm, incident angle=70°). Data were processed using the Gaertner Ellipsometer Measurement Program. Relative thicknesses were calculated assuming an average refractive index of 1.577 for the polymer multilayers. Thicknesses were determined in at least five different standardized locations on each substrate and are presented as an average with standard deviation. Characterization of optical transparency was performed using a Beckman Coulter DU520 UV-vis Spectrophotometer (Fullerton, Calif.). Simulated seawater was prepared by dissolving NaCl (26.73 g), $MgCl_2$ (2.26 g), $MgSO_4$ (3.25 g), and $CaCl_2$ (1.12 g) in 1.0 L of water. Compressed air used to dry samples was filtered through a 0.2 μm membrane syringe filter.

Fabrication of Reactive Polymer Multilayers.

Porous polymer multilayers exhibiting microscale and nanoscale topographic features were fabricated on planar glass substrates using the following general procedure: (i) substrates were submerged in a solution of PEI ($20 \times 10^{-3}$ M in acetone with respect to the polymer repeat unit) for 20 s; (ii) substrates were removed and immersed in an initial acetone bath for 20 s, followed by a second acetone bath for 20 s; (iii) substrates were submerged in a solution of PVDMA ($20 \times 10^{-3}$ M in acetone with respect to the polymer repeat unit) for 20 s; and (iv) substrates were removed and rinsed again using the procedure outlined under step (ii). This cycle was repeated 10 times to fabricate multilayers consisting of 10 PEI/PVDMA layer pairs. For these experiments, the concentrations of polymer solutions were maintained constant by addition of acetone as needed to compensate for solvent evaporation, and rinse baths were not replaced with fresh acetone during film fabrication. For thicker, hydrophobic films, this cycle was repeated 35 times, without changing the rinse solutions to yield films 35 bilayers thick.

For the fabrication of these thicker (≈1.1 μm thick) and rougher films, PVDMA synthesized in the presence of 7 wt % of intentionally added cyclic azlactone-functionalized oligomer was used (see above). Procedures used to fabricate thinner (≈60 nm thick) control coatings that did not exhibit significant porosity or nano/microscale topographic features were performed using an identical procedure, with the exception that (i) all polymer solutions and rinse baths were replaced with new solutions or solvent after every individual dipping cycle, and (ii) lower molecular weight PVDMA synthesized in the absence of added oligomers (see above) was used. Flexible PET substrates and porous stainless steel mesh substrates were coated using procedures identical to those used for planar glass substrates. Microscale glass beads were coated using a similar protocol, with the following changes: (i) glass beads (1 g) were placed in a glass tube, the bottom of which was capped by fixing laboratory cleaning paper (Kimwipes; Kimberly-Clark Corp., Neenah, Wis.) across the opening using copper wire, and (ii) the glass tube containing the beads was then immersed into the dipping solutions and rinse baths. Coatings were characterized or used in subsequent experiments immediately or dried under a stream of filtered, compressed air and stored in a vacuum desiccator until use.

Functionalization and Chemical Patterning of Multilayer-Coated Substrates.

Substrates coated with PEI/PVDMA multilayers were covalently functionalized by reaction with a variety of different hydrophilic amines (D-glucamine, DMAPA) and hydrophobic amines (n-propylamine, n-octylamine, and n-decylamine). Solutions of n-propylamine, n-octylamine, n-decylamine, and DMAPA ($20 \times 10^{-3}$ M) were prepared in THF, and solutions of D-glucamine were prepared using either DMSO or water. For experiments requiring functionalization over large areas, film-coated substrates were immersed completely in these solutions at room temperature for 2 hours. Films were then rinsed liberally with THF or DMSO and acetone and dried with filtered air. To install anionic carboxylate groups, reactive coatings were immersed in alkaline phosphate buffer (pH=9.75) to hydrolyze remaining azlactone functionality. For experiments in which patterns of both oil adhesive and non-oil-adhesive regions were desired, reactive multilayers were first patterned with small hydrophilic spots by placing droplets of aqueous solutions of glucamine (20 μL of a 20 mg mL$^{-1}$ glucamine solution in PBS buffer, pH=9.0) for 10 min. These chemically patterned samples were then immersed in n-decylamine, using the procedure described above, to react with residual azlactone functionality and render the remainder of the surrounding regions of the films hydrophobic (and oil adhesive). Functionalized films were used in subsequent experiments immediately or were dried under a stream of filtered air and stored in a vacuum desiccator until use.

Characterization of Physical and Chemical Stability.

A variety of physical and mechanical challenges and environmentally or chemically harsh conditions were used to characterize the stabilities of the underwater superoleophobic coatings. All of these tests were performed using coatings 10 bilayers thick and functionalized with D-glucamine. General protocols for each experiment are described below.

Sand Abrasion Tests:

Sand abrasion tests were performed using dry films under air. Sand (10 g, grain size ranging from ≈90 to ≈400 μm) was poured slowly onto the coatings from a distance of 20 cm, and then the underwater oil advancing and receding contact angles were measured (see FIGS. 8A and 8B) for a schematic of the setup). SEM was used to characterize nanoscale and microscale surface morphologies before and after contact with the sand.

Adhesive Tape Peeling Tests:

Adhesive tape peeling tests were performed by placing a strip of adhesive tape on the coatings using a pressure of ≈445 kPa, and then manually peeling the tape from the surfaces of the films. Underwater oil advancing and receding contact angles were then recorded. SEM was used to characterize nanoscale and microscale surface morphologies before and after placing and peeling the tape.

Sandpaper Abrasion Tests:

Sandpaper abrasion tests were performed by repeated manual rubbing with abrasive sandpaper (2 μm grit) 25 times.

Figures 8A, 8B:
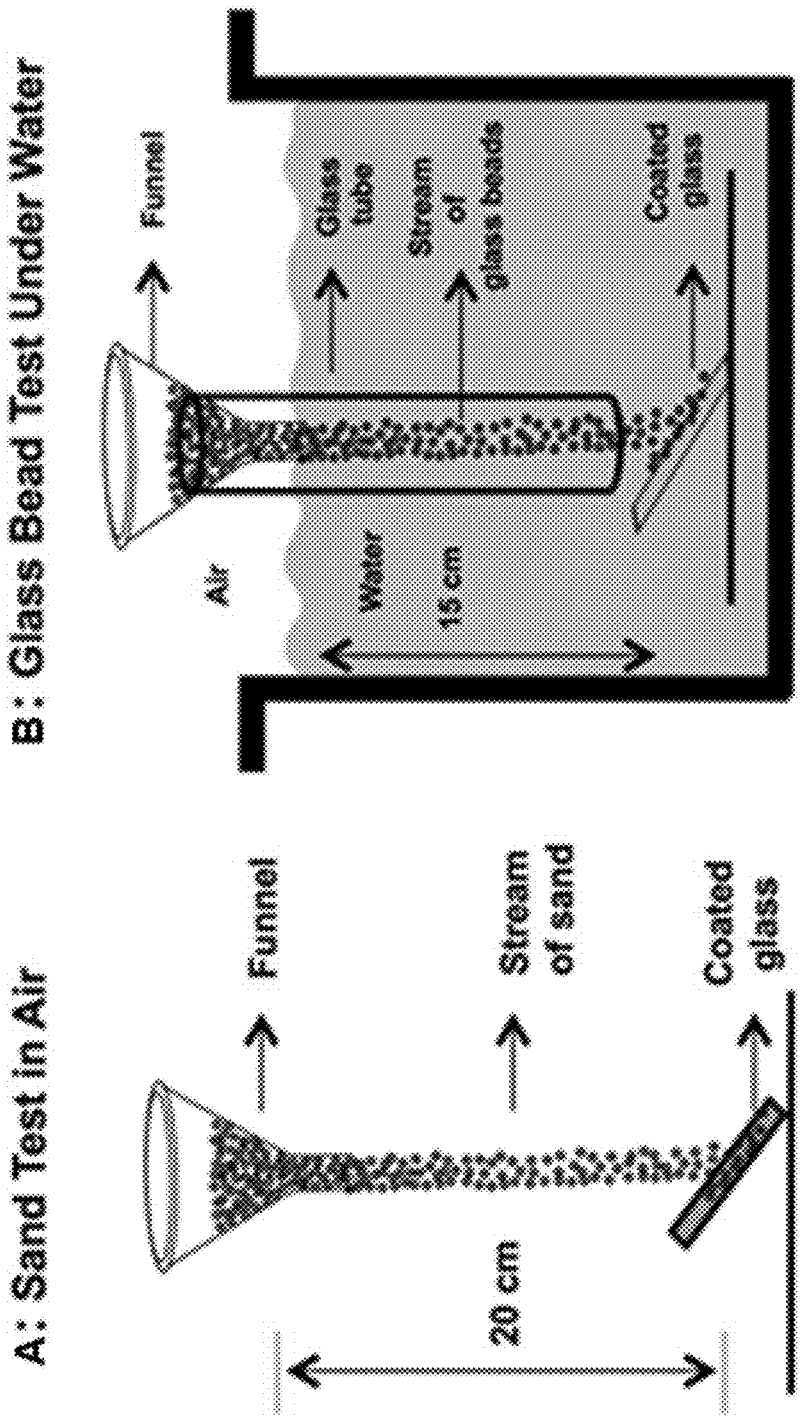
FIGS. 8A and 8B provide schematic illustrations showing experimental setups used to drop sand (under air) or glass beads (under water) onto the multilayer coatings.
Figures 9A, 9B, 9C, 9D, 9E, 9F, 9G, 9H:
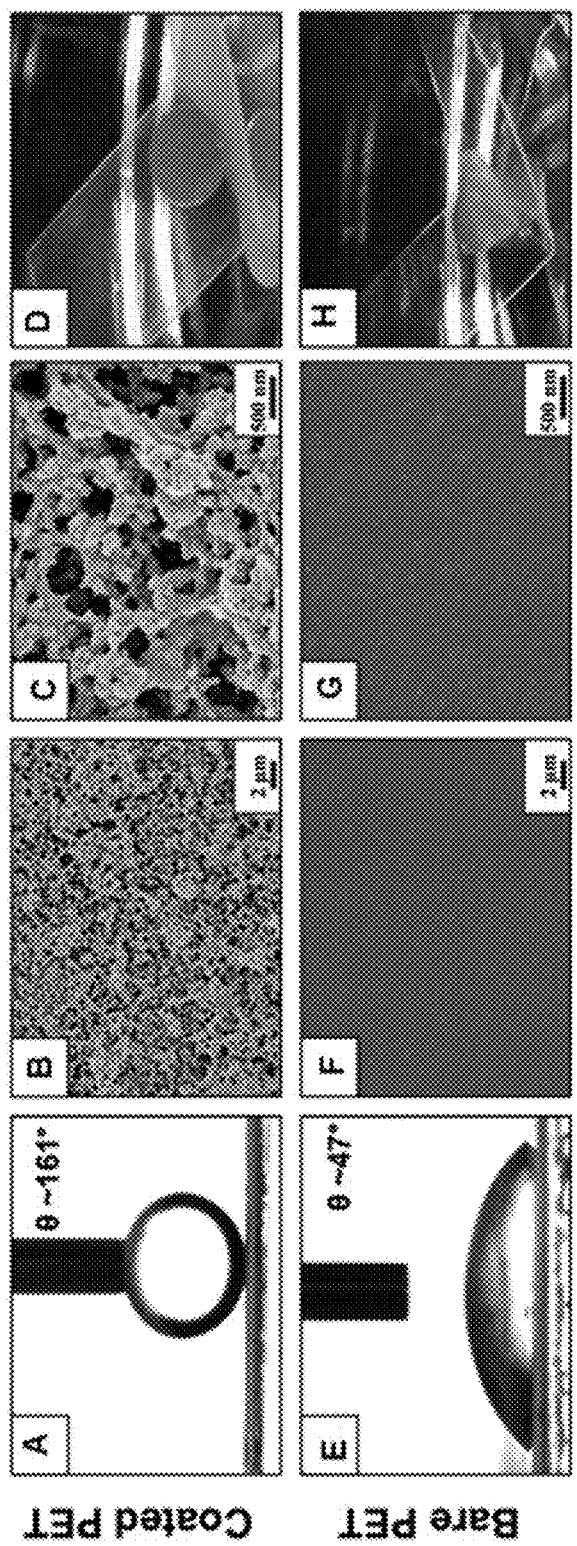
FIGS. 9A-9H show interaction of droplets with PET films.

Underwater Abrasion and Impact Tests:

Experiments to characterize the ability of hydrated films to withstand abrasion and impact were performed by placing films under 15 cm of water and then slowly pouring 50 g of solid glass beads (diameter=2-3 mm) from a distance of 15 cm using a funnel fitted with a glass tube to direct the falling beads to the coatings (a schematic of this experimental setup is shown in FIGS. 8A and 8B). Underwater oil advancing and receding contact angles were then recorded. SEM was used to characterize nanoscale and microscale surface morphologies before and after contact with the glass beads.

Contact with Rapidly Flowing Water:

Coatings were exposed to water ejected from a rapidly flowing faucet for 30 min. The flow rate of the faucet was 100 mL s$^{-1}$ and the nozzle diameter was 1.0 cm, yielding a nozzle velocity of 127.4 cm s$^{-1}$. The substrate was held at a distance of ≈2 cm from the faucet. As the diameter of the water stream did not vary over this distance, the velocity of the stream just prior to contact was estimated to be ≈127 cm s$^{-1}$. Underwater oil advancing and receding contact angles were then recorded.

Bending and Creasing:

Coatings fabricated on flexible sheets of PET were bent and flexed manually 50 times and then finally permanently creased by the application of moderate pressure. Measurements of contact angles made on creased films were performed by unfolding the substrate back into a flat sheet and placing droplets of oil in direct contact with the crease.

Exposure to Boiling Water:

For experiments designed to characterize the impact of exposure to boiling water, coated glass slides were held in boiling water for 1 hour. Underwater oil advancing and receding contact angles were then recorded.

Exposure to Freezing Conditions and Multiple Freeze/Thaw Cycles:

For experiments designed to characterize the impact of the freezing of water within and around the coatings in aqueous environments, coated glass slides were immersed completely in deionized water and the whole system was placed in a freezer at a temperature of −25° C. for 6 hours until all water was frozen solid. The resulting block of ice was removed from the freezer and allowed to thaw at room temperature. Underwater oil advancing and receding contact angles were then recorded. This cycle of freezing, thawing, and characterization was performed 10 times.

Exposure to Autoclaving Cycles:

Coated glass slides were autoclaved for 40 min at 121° C. using an Allen-Bradley Panel View Plus 600 System. Underwater oil advancing and receding contact angles were then recorded.

Exposure to Extremes of pH:

Coated glass slides were immersed in acidic (0.5 M HCl, pH=1) and alkaline (0.5 M NaOH, pH=11) solutions at ambient temperature for 30 min and then rinsed with deionized water. Underwater oil advancing and receding contact angles were then recorded.

Exposure to Extremes of Ionic Strength:

Coated glass slides were immersed in simulated seawater and solutions of 1.0 M NaCl for 4 months at ambient temperature. Underwater oil advancing and receding contact angles were recorded periodically during these experiments.

Exposure to Aqueous Solutions Containing Surface-Active Agents:

Coated glass slides were immersed in solutions containing high concentrations of cationic, anionic, and nonionic surfactants [sodium dodecyl sulfate (SDS, 5.0 M), dodecyltrimethylammonium bromide (DTAB, 5.0 M), and Triton X-100 (1.0 M)] and mammalian cell culture medium supplemented with 10% fetal bovine serum at ambient temperature for at least one month. Underwater oil advancing and receding contact angles were recorded periodically during these experiments.

Exposure to Eutrophic Lake Water:

Coated glass slides were immersed in eutrophic lake water (Lake Mendota, Madison, Wis.) containing well-characterized concentrations of dissolved and suspended organic matter, inorganic compounds, and microbial flora at ambient temperature for at least 4 months. Underwater oil advancing and receding contact angles were recorded periodically during these experiments.

Characterization of Oil Droplets on Surfaces Patterned with Patches of Non-Adhesive and Adhesive Underwater Superoleophobicity:

For these experiments (see FIGS. 4A-4B), a circular spot with a diameter of ≈3 mm was selectively patterned on the surface of a glass slide coated with a reactive, azlactone-functionalized film by (i) treatment with a droplet of aqueous glucamine, and then (ii) the remainder of the surface of the film was functionalized by treatment with propylamine using methods described above. This procedure resulted in functional surfaces containing patterned spots that exhibited a circular region of non-adhesive underwater superoleophobicity surrounded by a background that exhibited adhesive underwater superoleophobicity. The patterned film was then placed horizontally under water and a 10 μL droplet of DCE (stained with Nile red) was placed on the circular (non-adhesive superoleophobic) region. Two additional reference droplets were placed on the surrounding (adhesive superoleophobic) region. One end of the glass substrate was then raised and fixed at a desired angle of incline (e.g., 4°), and the behaviors of the droplets were characterized and recorded using a digital camera (see FIGS. 4A and 4B).

Characterization of the Interaction of Oil/Water Emulsion Droplets with Film-Coated Beads:

Experiments to characterize the nature of interactions between DCE and individual microscale beads coated with underwater superoleophobic films were conducted in the following general manner. An oil/water emulsion (20 mL, 1:10 v/v) was prepared by sonicating a mixture of water and DCE containing the water-insoluble red dye Nile red for 30 min at room temperature. Glass beads (200 mg; diameter=200-300 μm) coated with films functionalized with either glucamine (to create coatings that exhibit non-adhesive superoleophobicity on planar glass) or decylamine (to create coatings that exhibit adhesive superoleophobicity on planar glass) using methods described above. Samples of each type of coated bead were then added to 1 mL of the oil/water emulsion, shaken continuously for 10 min, and then kept steady for another 20 min to promote physical interactions with oil droplets and allow the beads to settle. The glass beads were then separated from the supernatant, washed briefly with water, and the amount of Nile red-stained DCE on the surfaces of the beads was characterized by fluorescence microscopy.

Oil/Water Separation Using Stainless Steel Mesh Coated with Underwater Superoleophobic Films:

Proof of concept demonstrations of the utility of these underwater superoleophobic coatings in the context of gravity-driven oil/water separation were performed in the following general manner. Samples of stainless steel wire mesh (1.5×2.5 cm, wire diameter ≈90 μm, pore size=126.3±3.5 μm) were coated using the protocol described above and then functionalized by treatment with D-glucamine. The coated mesh was then fixed between two halves of a disposable plastic funnel using epoxy and wet with water. A 12 mL mixture of conventional automotive motor oil and water (1:5, v/v) was then poured into the funnel. The water passed rapidly (in under one minute) through the coated mesh and into a collection vessel, and oil remained suspended on the coated mesh and was collected in near quantitative yield. Subsequent experiments were performed and similar results were obtained using mixtures of automotive motor oil and water prepared using more complex aqueous phases, including alkaline (0.5 M, pH=11) and acidic water (0.5 M, pH=1), simulated seawater, and lake water.

EXAMPLE 6

Functionalization of Azlactone-Containing Polymer Multilayers

As described above, polymers bearing amine-reactive azlactone functionality can be used to drive reactive layer-by-layer assembly with polymers that contain primary amines. Azlactones react rapidly, through ring-opening reactions, with primary amines under mild conditions (Buck et al., Polymer Chemistry (2012), 3 (1):66; and Heilmann et al. Journal of Polymer Science, Part A: Polymer Chemistry (2001), 39 (21): 3655), leading to unique and stable amide/amide-type crosslinks between polymer chains. Residual azlactone functionality in resulting PEI/PVDMA multilayers can be used as reactive handles for further functionalization by treatment with any of a broad range of readily available amine-based nucleophiles to impart a new surface and bulk properties (again, through the creation of unique and chemically stable amide/amide-type bonds as shown in Scheme 1).

Additionally, the surface and bulk properties of azlactone-containing materials can also be altered using other classes of non-amine-based nucleophiles (see Scheme 1). For example, azlactone groups are understood to react with primary alcohols and thiols under certain conditions such as in the presence of a catalyst and at higher temperatures (Heilmann et al. Journal of Polymer Science, Part A: Polymer Chemistry (2001), 39 (21): 3655; Schmitt et al., Adv. Healthcare Mater. (2015), 4(10):1555; Schmitt et al., Biomacromolecules (2016), 17(3):1040; Heilmann et al., J. Polym. Sci., Polym. Chem. Ed. (1984), 22 (5):1179; Rasmussen et al., Makromol. Chem. Rapid Commun. (1984), 5 (2):67; Heilmann et al., Tetrahedron (1998), 54(40):12151; and Pereira et al., Tetrahedron (2014), 70(20):3271).

The use of these nucleophiles to design new materials is far less developed than approaches that exploit the reactivity of azlactones with more nucleophilic primary amines. Strategies for the rapid and robust functionalization of azlactone groups in polymer assemblies using primary alcohols and thiols could be broadly useful in at least two ways. First, such methods would substantially increase the pool of commercially or readily available molecules that is available for post-fabrication functionalization (and, thus, expand the range of new properties that could be imparted to azlactone-containing assemblies). Second, the reaction of azlactones with primary alcohols and thiols results in the formation of unique amide/ester- and amide/thioester-type bonds that, in contrast to the amide/amide bonds formed by reactions with primary amines, can be hydrolyzed under relatively mild conditions. Methods for the functionalization of surfaces and coatings using these labile and stimuli-responsive linkages thus provide new approaches to the design of surfaces and coatings with dynamic or stimuli-responsive properties.

Functionalization of azlactone-containing PEI/PVDMA multilayers using primary alcohol and thiol-containing nucleophiles is thus provided. Alcohol- or thiol-containing compounds can react uniformly and extensively with the residual azlactone functionality in these materials when an organic catalyst is used, and the properties of these compounds (e.g., whether they are hydrophobic or hydrophilic, etc.) can be used to dictate important interfacial properties and pattern useful surface features. It is further demonstrated that the amide/ester and amide/thioester groups that result from these new reactions can be cleaved under mild conditions in aqueous environments, leading to dynamic and stimuli responsive materials that can release covalently-bound molecules into surrounding media or undergo stimuli-responsive changes in wetting behaviors. The post-fabrication conversion of installed thioester groups to acylhydrazine functionality can react through 'click-like' reactions with aldehydes (Xin et al., Polymer Chemistry (2012), 3(11):3045; and Kool et al., Journal of the American Chemical Society (2013), 135(47):17663) to anchor new surface features through acid-responsive imine bonds. These results expand the range of chemical functionality and new functions that can be imparted to azlactone-containing materials beyond those that can be attained by functionalization using primary amines. The strategies reported here, demonstrated using model polymer-based reactive multilayer coatings, also prove useful for the design of new materials based on other types of azlactone-functionalized polymers, assemblies, and coatings.

Functionalization of Polymer Multilayers Using Amine, Alcohol, and Thiol-Containing Nucleophiles.

PEI/PVDMA multilayers were fabricated on glass substrates using the general procedure described above. Films were then functionalized with nucleophiles using the following general procedure. Treatment with pyrenebutanol and pyrene (serving as a control) was performed by immersing a 10-bilayer film (0.9×1 cm) on a glass substrate in 1.5 mL of the desired fluorophore solution (40 mg/mL in DCE) in a glass vial, followed by the addition of 2 μL of DBU. The vial was capped, sealed with parafilm, and left on a shaker plate overnight at room temperature. Films were removed and rinsed copiously with DCE, and then placed in large vials containing fresh DCE rinse solution for several days in order to remove any non-specifically adsorbed fluorophore and the DBU catalyst. The rinse solution was changed several times each day. Films were finally rinsed with ~25 mL each of DCM, methanol, water, and acetone, and then dried in a stream of compressed air.

Decanol and decanethiol treatments were performed in a similar manner by immersing films (~0.9 cm×3 cm) in ~4 mL of the desired nucleophile solution (1:1 wt/wt in DCE) in a glass vial followed by addition of 54 μL of DBU. The vial was capped, sealed with parafilm, and left on a shaker plate overnight. Films were rinsed copiously with DCE and then DCM before being placed in DCM rinse vials for several days, as above. Decylamine and hydrazine functionalization reactions were performed by immersing a film (~0.9 cm×3 cm) in a ~4 mL solution of either decylamine (20 mg/mL in THF) or anhydrous hydrazine (20 mg/mL in MeOH) overnight and then rinsing with THF or MeOH, respectively, and then acetone, before drying in a stream of compressed air.

Hydrolysis of Ester and Thioester Bonds in Functionalized Films.

Experiments designed to characterize the hydrolysis of the ester bonds in multilayers functionalized using decanol were performed by placing small droplets of aqueous NaOH (0.05 M) onto the surface of a film and incubating it in a humid chamber for pre-determined periods of time. The NaOH droplet was rinsed from the surface of the film using Millipore water and then subsequently with acetone before drying in compressed air. To facilitate imaging, newly created hydrophilic spots on these films were loaded selectively with TMR by submersion of the entire film into an aqueous solution of the dye (~0.05 mg/mL) for ~2 seconds. To demonstrate the reactivity of thioester bonds in decanethiol treated films, samples (0.9×1 cm) were immersed in 1.5 mL of hydrazine solution (20 mg/mL in MeOH) at 50° C., removed at pre-determined time intervals, rinsed in MeOH and acetone, and then dried in compressed air prior to characterization.

Reversible Reactions of Imine Bonds in Hydrazine-Functionalized Multilayers.

Films functionalized by treatment with hydrazine were treated with octylaldehyde (20 mg/mL in MeOH) for 1 hour at room temperature and then rinsed copiously with MeOH and acetone before being dried in a stream of compressed air. These superhydrophobic films were cut to desired sizes (1×1 cm) and immersed in 2 mL of a 1 M HCl solution (1:1 $H_2O$:THF, v/v) overnight at room temperature. The resulting hydrophilic films were then removed and rinsed copiously with THF, water, and acetone before being dried in a stream of compressed air for contact angle analysis. Experiments were also performed without HCl by placing films into solutions of 1:1 v/v $H_2O$:THF and removing after pre-determined periods of time. This process was repeated several times to characterize the reversibility of the imine bond formation/hydrolysis reaction.

Functionalization of Azlactone-Containing Multilayers Using Alcohol-Based Nucleophiles.

The reactivity of the residual azlactone groups in PEI/PVDMA multilayers with primary alcohol-based nucleophiles were characterized. These initial experiments were conducted using PEI/PVDMA multilayers 10 bilayers (~160 nm) thick and pyrenebutanol as a model fluorescent primary alcohol to facilitate characterization. Prior to experiments using azlactone-containing multilayers, studies were conducted using solutions of pyrenebutanol and PVDMA to identify reaction conditions that lead to efficient coupling. Past studies demonstrate that reactions between azlactones and alcohols do not occur substantially in the absence of a catalyst, but that these reactions can be promoted by catalytic amounts of trifluoroacetic acid or strong amidine bases such as 1,8-diazabicycloundec-7-ene (DBU) (Heilmann et al., Journal of Polymer Science, Part A: Polymer Chemistry (2001), 39(21): 3655; Pereira et al., Tetrahedron (2014), 70(20): 3271; and Sun et al., Journal of Controlled Release (2010), 148(1):91). DBU was selected as a catalyst for these studies because this approach is more general and because it can also be used to promote reactions between azlactones and thiols (trifluoroacetic acid can catalyze the addition of alcohols to azlactone groups, but does not promote reactions using thiols). The addition of pyrenebutanol to solutions of PVDMA in the presence of DBU (0.05 eq. pyrenebutanol, 0.1 eq. DBU with respect to pyrenebutanol) yielded random copolymers containing both reactive azlactone functionality and pyrenebutanol-based side chains attached to the backbone through amide/ester linkages, as characterized by $^1H$ NMR spectroscopy and gel permeation chromatography.

Modification of Interfacial Properties Using Alcohol- and Thiol-Based Nucleophiles.

Previous experiments demonstrate that the surface energies and wetting behaviors of native (azlactone-containing) PEI/PVDMA films can be permanently modified (through the creation of amide/amide-type bonds) by treatment with primary amines functionalized with hydrophobic or hydrophilic groups. Those prior experiments reveal that when these covalent modifications are made to multilayers possessing nano- and microscale topographic features, this approach can also be used to design films that are superhydrophobic, or extremely non-wetting to water [superhydrophobic surfaces are defined here having advancing water contact angles (WCAs) >150°, with low water roll-off angles]. The functionalization of nanoporous PEI/PVDMA films ~3.5 μm thick by reaction with n-decylamine yielded an increase in WCA from 135.6° (±1.9°) (FIG. 15A and FIG. 15E for native, azlactone-functionalized films) to 158.3° (±1.7°) (FIG. 15B and FIG. 15F).

Figures 15A, 15B, 15C, 15D, 15E, 15F, 15G, 15H, 15I:
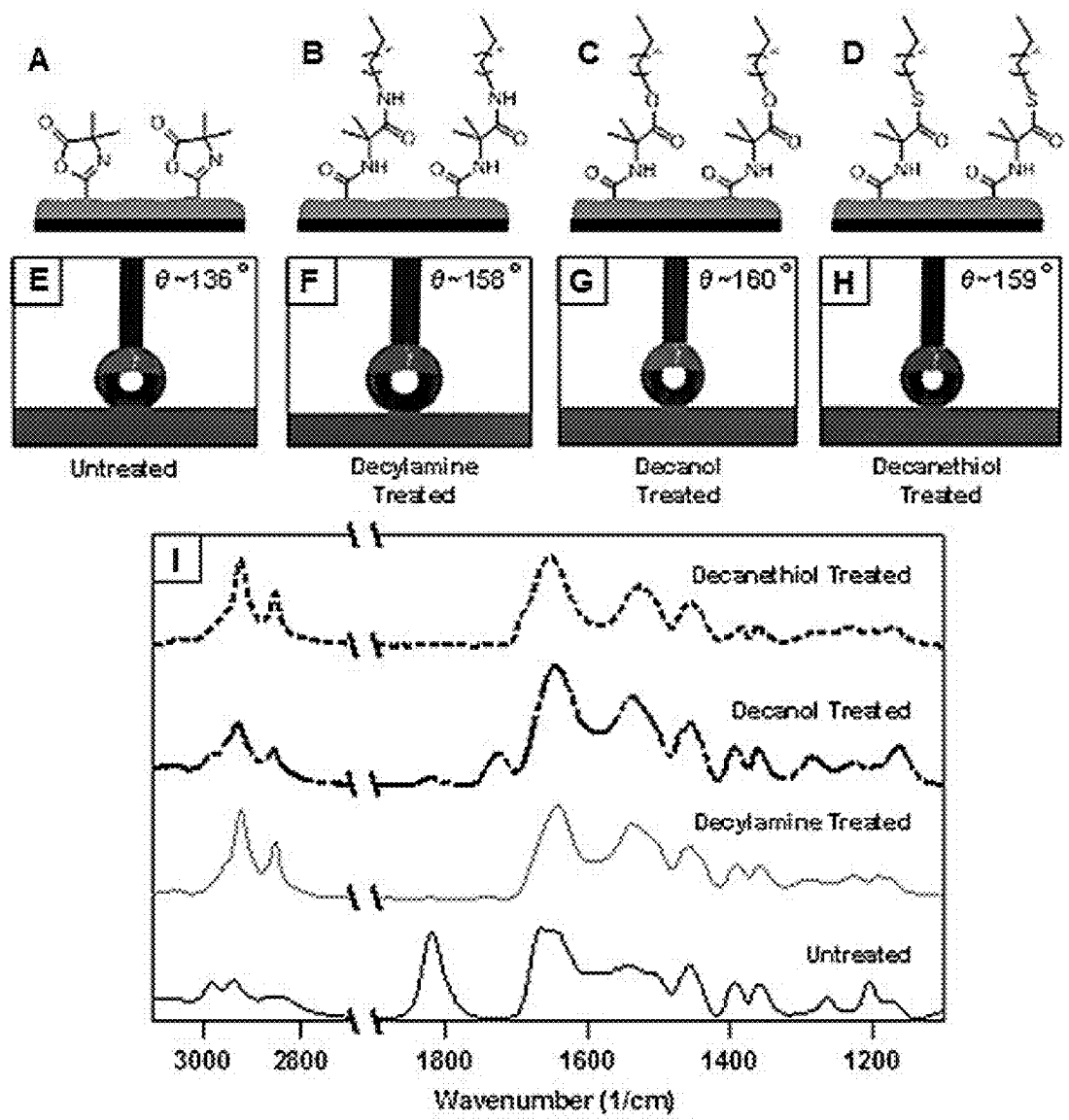
FIGS. 15A-15I show chemical structures representing PEI/PVDMA LbL films and thin film spectra for treated and untreated films. These figures show an azlactone-containing, unfunctionalized film (FIG. 15A), and films functionalized with decylamine (FIG. 15B), decanol (FIG. 15C) and decanethiol (FIG. 15D). Representative advancing WCA measurements for the corresponding films in FIGS. 15A-15D are provided in FIGS. 15E-15H.

The images in FIGS. 15C, 15D, 15G and 15H reveal that superhydrophobicity can also be achieved by the DBU-catalyzed reaction of residual azlactones with the hydrophobic alcohol n-decanol (WCA=160.3±1.8°; FIG. 15G) and the hydrophobic thiol n-decanethiol (WCA=159.0±1.6°; FIG. 15H). These decanol- and decanethiol-functionalized films were uniformly superhydrophobic across the entirety of the material, with properties and behaviors that were both quantitatively and qualitatively similar to those exhibited by decylamine-functionalized films when placed in contact with or immersed in water.

FIG. 15I shows representative ATR IR spectra of an untreated (azlactone-containing) PEI/PVDMA film and decylamine-, decanol-, and decanethiol-treated films used in the experiments above. The IR spectrum of the untreated film exhibited a cyclic carbonyl C=O stretch characteristic of residual azlactone groups at 1819 $cm^{-1}$; the two coalescing absorbance bands with peaks at 1666 $cm^{-1}$ and 1646 $cm^{-1}$ correspond to the C=N functionality in the azlactone ring and the C=O stretch of amide bonds that make up the crosslinks of the film, respectively. For films treated with decylamine, the peak corresponding to the azlactone functionality at 1819 $cm^{-1}$ was completely consumed, suggesting exhaustive reaction of the azlactone groups with the incoming amine-based nucleophile and consistent with the results of past studies. For films treated with decanol, the intensity of the azlactone carbonyl stretch at 1819 $cm^{-1}$ was also substantially reduced, and a carbonyl C=O stretch at 1724 $cm^{-1}$ appeared, consistent with the formation of ester bonds upon the reaction of the azlactone groups with this alcohol-based nucleophile. Finally, for films treated with decanethiol, the azlactone peak was also consumed and close inspection of the data reveals a shoulder on the amide C=O stretch (near 1652 $cm^{-1}$) that were attributed to the C=O carbonyl stretching of thioester functionality. These results, when combined, are consistent with the ring-opening of residual azlactone rings by these alcohol- and thiol-based nucleophiles under these DBU-catalyzed conditions.

The results of additional experiments demonstrated that, whereas the superhydrophobicity of decylamine-treated films can be maintained for long periods in aqueous environments, the extremely non-wetting behaviors of decanol- and decanethiol-treated films could be permanently erased and eliminated by exposure to aqueous analytes that cleave ester and thioester bonds. For these experiments, PEI/PVDMA films fabricated on amine-functionalized poly(ethylene terephthalate) (PET) substrates were used to improve stability at the film/substrate interface and reduce the likelihood of film delamination.

Figures 16A, 16B, 16C, 16D, 16E, 16F, 16G, 16H:
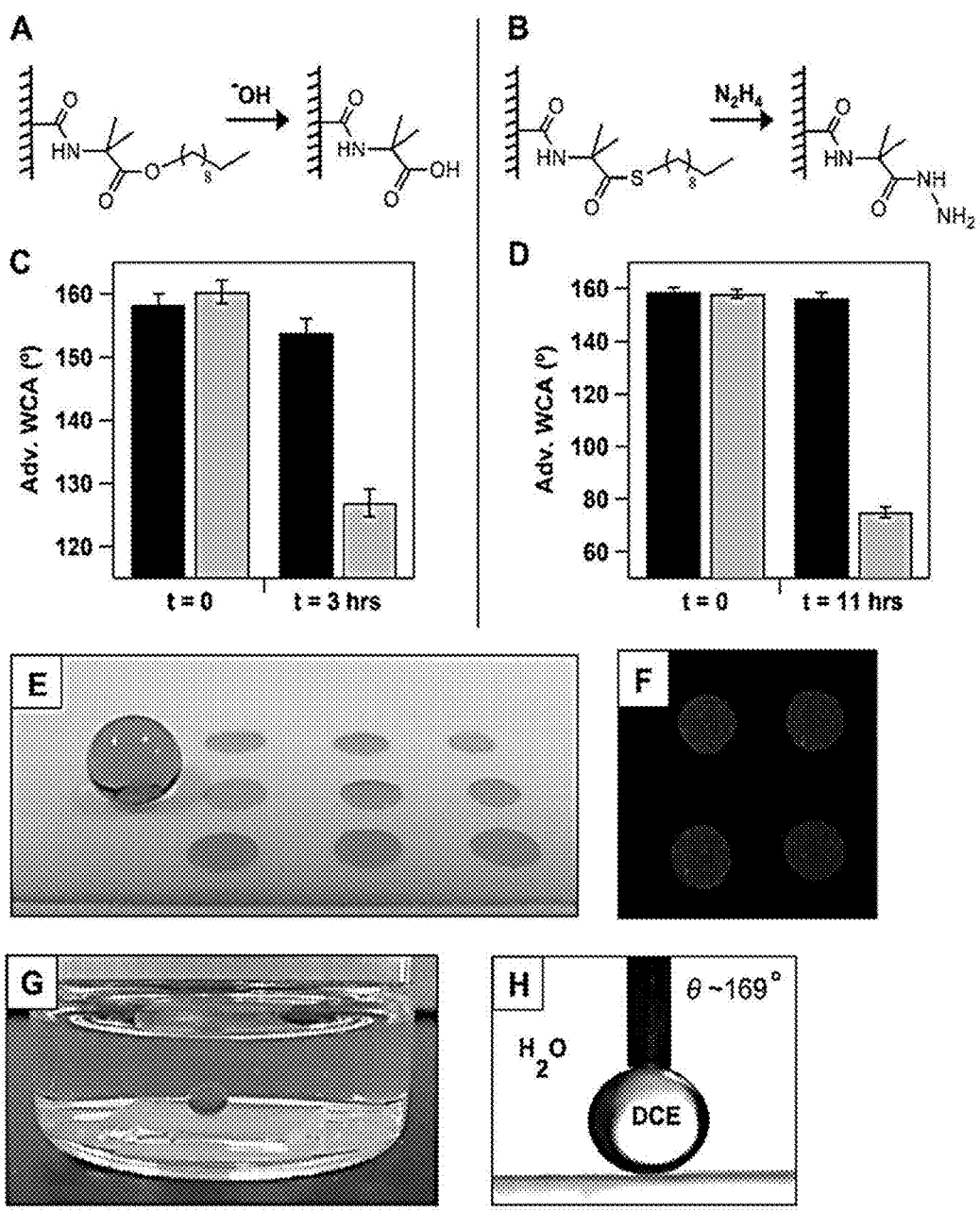
FIGS. 16A-16H illustrate the effects of functionalized films. These figures provide chemical structures for PEI/PVDMA films functionalized with decanol (FIG. 16A), and the result after treatment by hydroxyl ions, and films functionalized with decanethiol (FIG. 16B), and the result after treatment with hydrazine.

In an initial series of experiments, the wetting behaviors of decylamine- and decanol-treated films exposed to aqueous base were characterized, with the reasoning that the hydrolysis of ester bonds would reveal hydrophilic carboxylic acid groups (e.g., FIG. 16A) and result in large reductions in WCAs. FIG. 16C shows the results of an experiment in which a large aqueous droplet of 50 mM NaOH was placed onto the surfaces of both decylamine- and decanol-treated films in a humid environment for ~3 hours at room temperature. Inspection of these results reveals a large reduction in the WCA of the decanol-treated film (from ~160° to ~126.9±2.2°; FIG. 16C, gray bars) in the areas of the film treated with aqueous base. In contrast, the WCA of the decylamine-treated films remained largely unaffected under these conditions (FIG. 16C, black bars). These results are also consistent with the hydrolysis of the ester bonds of decanol-treated materials. The hydrolyzed regions of the decanol-treated films were rapidly and uniformly wet when contacted with water, whereas surrounding areas that were not treated remained superhydrophobic and were jacketed by a layer of air, as is typical of superhydrophobic surfaces in the Wenzel-Cassie state, when immersed in water. This observation suggests new approaches to the chemical patterning of superhydrophobic materials and provides a basis for the design of new surfaces with patterned contrasts in wettability. The selective deposition of small (10 µL) droplets of aqueous base were used to pattern a small array of hydrophilic spots distributed within a superhydrophobic background (FIG. 16E; small droplets of colored water show the locations of the hydrophilic spots; a larger droplet reveals the maintenance of superhydrophobicity in surrounding, untreated areas). These arrays of hydrophilic spots could also be used to directly capture and position small samples of water by direct dipping into aqueous solutions without substantial wetting or contamination of the surrounding superhydrophobic surfaces (FIG. 16F).

A similar series of experiments using superhydrophobic decanethiol-treated films to determine if these thioester-functionalized films could be induced to undergo changes in structure and wetting behavior in response to a specific chemical stimulus. For these experiments, hydrazine was used as a model nucleophile to attack the thioester and displace hydrophobic decyl chains (FIG. 16B). FIG. 16D shows the results of experiments in which decanethiol-functionalized films were treated with hydrazine over a period of ~11 hours. These results reveal a dramatic reduction in WCA from >150° to ~75.0° (±6.2°) for decanethiol-functionalized films (gray bars; results using decylamine-functionalized films treated with hydrazine were again stable and did not exhibit changes in contact angle under these conditions; FIG. 16D; black bars). A formal loss of superhydrophobicity was also observed in decanethiol-functionalized films at shorter reaction times; for example, WCAs decreased to ~134.2° (±5.3°) after ~5 hours, suggesting that lower exposure times could be used in instances where simple transitions in wetting states are desired. These results are consistent with the hydrazine-mediated cleavage of the hydrophobic thioester groups and the installation of more hydrophilic acylhydrazine groups (FIG. 16B).

The inherent nano- and microscale roughness of these superhydrophobic coatings, combined with the degree of hydrophilicity induced by treatment with hydrazine and the cleavage of hydrophobic thioester functionality, resulted in films that were highly absorbent to water but extremely repellant of oils when placed in aqueous environments (a phenomenon known as 'underwater superoleophobicity'). FIG. 16G shows a droplet of a model oil (dichloroethane, stained with a red hydrophobic dye) placed on a hydrazine-treated film submerged in water. As shown in FIG. 16H, this surface exhibits an underwater advancing oil contact angle of approximately 169°, indicating a transition to a robust and extremely oil repellant state (whereas the surface is fully wet by water in air). This feature, combined with the ability to chemically pattern regions of hydrophilicity on these substrates are useful for the design of new surfaces that can capture, manipulate, and guide the transport of oily substances in underwater environments.

Characterization of Reactive Acylhydrazine-Functionalized Multilayers.

Figures 17A, 17B, 17C, 17D:
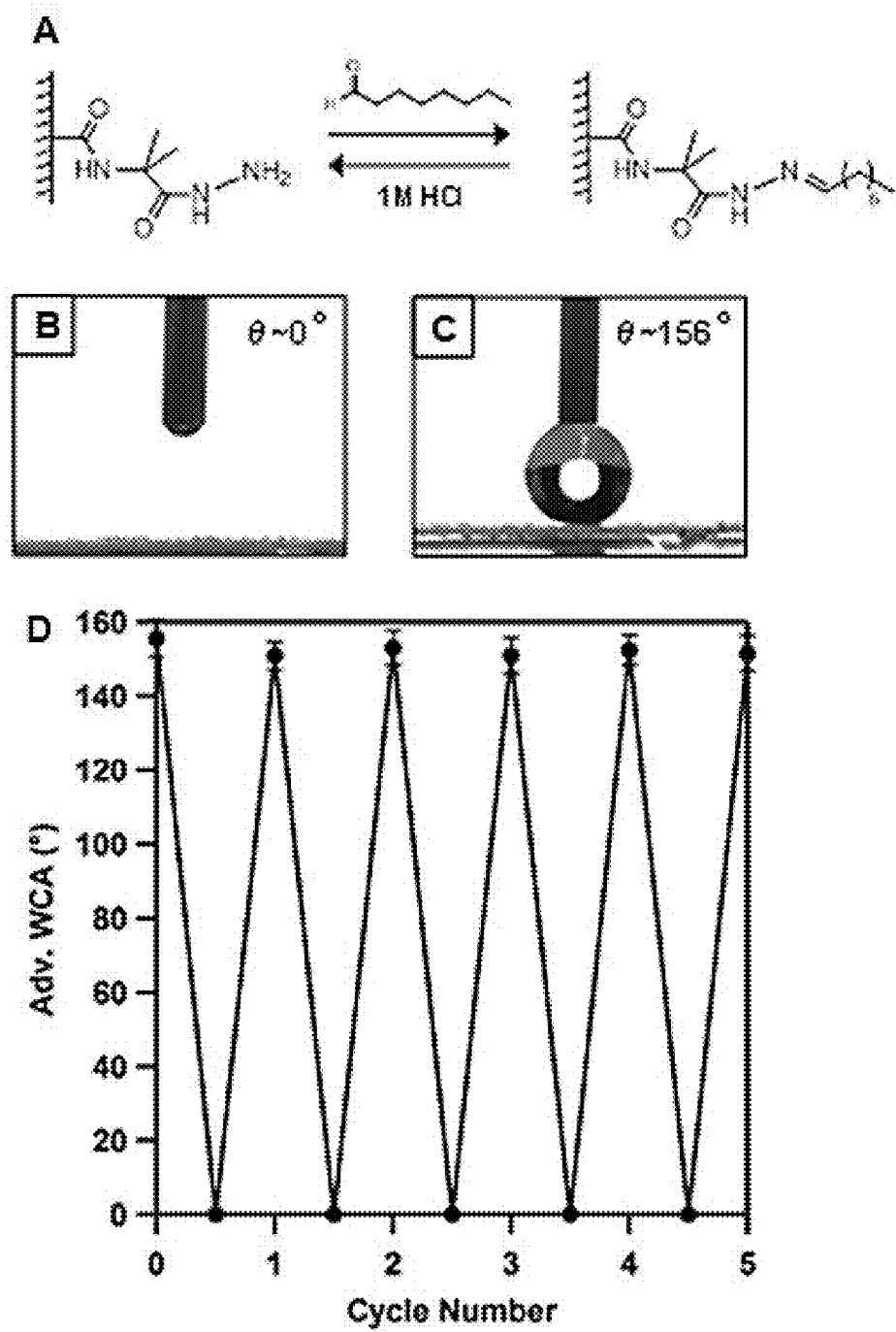
FIGS. 17A-17D illustrate the functionalization of PEI/PCDMA films.

The ability to functionalize azlactone-containing films using alcohol- and thiol-based nucleophiles substantially expands the range of additional molecules that can be installed and, as described above, introduces new functionality (e.g., the introduction of chemically labile linkers) that can lead to materials with new and useful behaviors that differ substantially from those designed using primary amine-based nucleophiles. The introduction of acylhydrazine groups in the work described above—a byproduct of treatment with hydrazine to cleave surface-bound thioester functionality—could also be used as a useful reactive synthon that could further expand the range of functional groups that could be installed in these materials (i.e., by broadening the pool further, to include the immobilization of aldehyde-containing molecules; FIG. 17A) and, thus, the range of functionality that can be achieved through the installation of acid-labile imine bonds and other chemically reversible groups.

To explore the feasibility of this approach, experiments were performed using nanoporous PEI/PVDMA multilayers reacted exhaustively with hydrazine (20 mg/mL in methanol, overnight). These acylhydrazine-functionalized films were superhydrophilic (they exhibited WCAs of ~0°; FIG. 17B) and were extremely non-wetting to oils when submerged in water, as expected from our observations described above. These acylhydrazine-functionalized coatings were treated with octyl aldehyde to install hydrophobic octyl groups through a rapid and 'click-like' reaction that results in the formation of an acid-sensitive imine linker (20 mg/mL in methanol, 1 hour; FIG. 17A). Characterization of these surfaces after octyl aldehyde treatment revealed these coatings to exhibit robust superhydrophobicity (WCA ~156; FIG. 17C) similar to those obtained by treatment with hydrophobic amine-, alcohol-, and thiol-based nucleophiles (e.g., FIGS. 15A-15I).

The introduction of imine bonds rendered these surfaces sensitive to acidic conditions—exposure to acidic media (1.0 M HCl; 1:1 THF/$H_2O$) resulted in the cleavage of the imine bonds, the recovery of acylhydrazine functionality on the coatings, and the concurrent return of superhydrophilic surface character (WCAs ~0°) and underwater-superoleophobic behavior. Because this acid-catalyzed cleavage process regenerates acylhydrazine functionality, superhydrophobicity could be restored by re-treatment with octyl aldehyde—transitions between superhydrophobicity and superhydrophilicity/underwater superoleophobicity could be cycled reversibly at least 5 times without erosion of expected wetting behaviors (FIG. 17D).

Thus, new approaches for the chemical modification of azlactone-functionalized polymer multilayers using alcohol- and thiol-based nucleophiles or by direct treatment with hydrazine are hereby provided. These methods broaden the pool of compounds available for the post-fabrication functionalization of these reactive multilayers substantially (e.g., to include molecules functionalized with alcohol, thiol, or aldehyde groups) and provide strategies for the design of thin films and surface coatings with novel amide/ester-, amide/thioester-, and amide/imine-type bonds that are, in contrast to those produced by reactions with primary amines, chemically labile and stimuli responsive. These results open the door to the design of new environmentally responsive materials and coatings, including surfaces that can promote the traceless release of covalently-immobilized molecules and coatings that undergo dynamic and predictable changes in extreme wetting behaviors, such as superhydrophobicity, superhydrophilicity, or underwater superoleophobicity, in response to environmental stimuli. The properties and behaviors of these materials could prove useful in emerging applications of special-wetting surfaces, including the design of surfaces that can capture and guide the passive transport of fluids, new materials for oil/water separation, and in areas such as controlled release, where controlled and time-dependent changes in extreme wetting behaviors could be used to control the ingress of water into a coating (and, thus, provide control over the rate at imbedded water-soluble or water-sensitive agents are released). Overall, the results of this example broaden the range of chemical functionality that can be installed in azlactone-containing multilayers, and thus also expand the range of new functions and properties that can be imparted, beyond those that can be attained by functionalization using primary amines.

Having now fully described the present invention in some detail by way of illustration and examples for purposes of clarity of understanding, it will be obvious to one of ordinary skill in the art that the same can be performed by modifying or changing the invention within a wide and equivalent range of conditions, formulations and other parameters without affecting the scope of the invention or any specific embodiment thereof, and that such modifications or changes are intended to be encompassed within the scope of the appended claims.

One of ordinary skill in the art will appreciate that starting materials, reagents, purification methods, materials, substrates, device elements, analytical methods, assay methods, mixtures and combinations of components other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that the use of such terms and expressions exclude any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms.

When a group of materials, compositions, components or compounds is disclosed herein, it is understood that all individual members of those groups and all subgroups thereof are disclosed separately. When a Markush group or other grouping is used herein, all individual members of the group and all combinations and subcombinations possible of the group are intended to be individually included in the disclosure. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. In the disclosure and the claims, "and/or" means additionally or alternatively. Moreover, any use of a term in the singular also encompasses plural forms.

All references cited herein are hereby incorporated by reference in their entirety to the extent that there is no inconsistency with the disclosure of this specification. Some references provided herein are incorporated by reference to provide details concerning sources of starting materials, additional starting materials, additional reagents, additional methods of synthesis, additional methods of analysis, additional biological materials, and additional uses of the invention. All headings used herein are for convenience only. All patents and publications mentioned in the specification are indicative of the levels of skill of those skilled in the art to which the invention pertains, and are herein incorporated by reference to the same extent as if each individual publication, patent or patent application was specifically and individually indicated to be incorporated by reference. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

The invention claimed is:

1. A method for preventing or reducing fouling by hydrophobic materials on a substrate comprising the steps of:
    depositing an anti-fouling superoleophobic material on said substrate, wherein said superoleophobic material comprises a multilayer polymer film attached to said substrate, said multilayer film comprising one or more bilayers,
    wherein each bilayer comprises a first polymer layer covalently linked with a second polymer layer, wherein the first polymer layer comprises a functionalized azlactone polymer, wherein at least a portion of residual functional groups in the one or more bilayers is functionalized with a hydrophilic group, and wherein said multilayer polymer film attached to said substrate has nanoscale porosity and is non-wetting to oils when covered with an aqueous liquid.

2. The method of claim 1 wherein said multilayer polymer film comprises 10 or more bilayers.

3. The method of claim 1 wherein said material is superoleophobic at a pH range from 1 to 11.

4. The method of claim 1 wherein the first polymer layer comprises a functionalized azlactone having the formula:

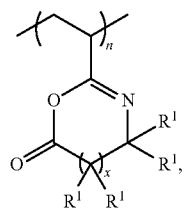

wherein x is 0 or the integers 1 or 2; and each $R^1$ is independently selected from the group consisting of: hydrogen, alkyl groups, alkenyl groups, alkynyl groups, carbocyclic groups, heterocyclic groups, aryl groups, heteroaryl groups, alkoxy groups, aldehyde groups, ether groups, and ester groups, any of which may be substituted or unsubstituted.

5. The method of claim 1 wherein the first polymer layer comprises a polymer selected from the group consisting of poly(vinyl-4,4-dimethylazlactone), poly(2-vinyl-4,4-dimethy 1-2-oxazolin-5 -one), poly(2-isopropeny 1-4,4-dimethyl-2-oxazolin-5-one), poly(2-viny 1-4,4-diethy 1-2-oxazolin-5-one), poly(2-vinyl-4-ethyl-4-methyl-2-oxazolin-5-one), poly(2-vinyl-4-dodecyl-4-methyl-2-oxazolin-5-one), poly(2-vinyl-4,4-pentamethy lene-2-oxazolin -5 -one), poly (2-viny 1-4-methy 1-4-pheny 1-2-oxazolin -5 -one), poly(2-isopropenyl-4-benzyl-4-methyl-2-oxazolin-5-one), and poly (2-vinyl-4,4-dimethyl-1 ,3-oxazin-6-one).

6. The method of claim 1 wherein the first polymer layer comprises poly(vinyl-4,4-dimethylazlactone) (PVDMA).

7. The method of claim 6 wherein the PVDMA is synthesized in the presence of cyclic azlactone-functionalized oligomers.

8. The method of claim 1 wherein the second polymer layer comprises a primary amine functionalized polymer, an alcohol functionalized polymer, or a thiol functionalized polymer.

9. The method of claim 1 wherein the second polymer layer comprises an optionally functionalized polymer selected from the group consisting of polyolefins, poly (alkyls), poly(alkenyls), poly(ethers), poly(esters), poly(imides), polyamides, poly(aryls), poly(heterocycles), poly(ethylene imines), poly(urethanes), poly($\alpha,\beta$-unsaturated carboxylic acids), poly($\alpha,\beta$-unsaturated carboxylic acid derivatives), poly(vinyl esters of carboxylic acids), poly (vinyl halides), poly(vinyl alkyl ethers), poly(N-vinyl compounds), poly(vinyl ketones), poly(vinyl aldehydes) and any combination thereof.

10. The method of claim 1 wherein at least a portion of residual functional groups in the one or more bilayers is reacted with an amine, hydroxyl group, thiol group, or hydrazine group having the formula R—$NH_2$, R—OH, R—SH or R—$NHNH_2$, where R is hydrophilic.

11. The method of claim 1 wherein at least a second portion of residual functional groups in the one or more bilayers is reacted with a hydrophobic amine, an amino sugar, an amino alcohol, an amino polyol, glucamine, dimethylaminopropylamine (DMAPA), or combinations thereof.

12. The method of claim 1 wherein at least a portion of the residual functional groups in the one or more bilayers is reacted to form chemically labile amide/ester-, amide/thioester-, or amide/imine-type bonds.

13. The method of claim 1 wherein the multilayer film comprises one or more PVDMA/PEI bilayers, which are further functionalized with D-glucamine.

14. The method of claim 1 wherein the substrate is curved or irregularly shaped.

15. The method of claim 1 wherein the multilayer polymer film, material, or both are at least partially optically transparent.

16. A superoleophobic material comprising:
    a) a substrate; and
    b) a multilayer polymer film attached to said substrate, said multilayer film comprising one or more bilayers, wherein each bilayer comprises a first polymer layer covalently linked with a second polymer layer, wherein the first polymer layer comprises a functionalized azlactone polymer, wherein at least a portion of residual functional groups in the one or more bilayers is functionalized with a hydrophilic group, wherein said multilayer polymer film attached to said substrate has nanoscale or microscale porosity and is non-wetting to oils when covered with an aqueous liquid.

17. The material of claim 16 wherein said multilayer polymer film has a thickness of 10 μm or less.

18. The material of claim 16 wherein the multilayer film comprises 10 or more bilayers.

19. The material of claim 16 wherein the first polymer layer comprises a functionalized azlactone having the formula:

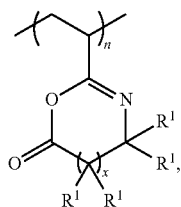

wherein x is 0 or the integers 1 or 2; and each $R^1$ is independently selected from the group consisting of: hydrogen, alkyl groups, alkenyl groups, alkynyl groups, carbocyclic groups, heterocyclic groups, aryl groups, heteroaryl groups, alkoxy groups, aldehyde groups, ether groups, and ester groups, any of which may be substituted or unsubstituted.

20. The material of claim 16 wherein the first polymer layer comprises a polymer selected from the group consisting of poly(vinyl-4,4-dimethylazlactone), poly(2-vinyl-4,4-dimethy 1-2-oxazolin-5 -one), poly(2-isopropeny 1-4,4-dimethyl-2-oxazolin-5-one), poly(2-viny 1-4,4-diethy 1-2-oxazolin-5-one), poly(2-vinyl-4-ethyl-4-methyl-2-oxazolin-5-one), poly(2-vinyl-4-dodecyl-4-methyl-2-oxazolin-5-one), poly(2-vinyl-4,4-pentamethy lene-2-oxazolin -5 -one), poly (2-viny 1-4-methy 1-4-pheny 1-2-oxazolin -5 -one), poly(2-isopropenyl-4-benzyl-4-methyl-2-oxazolin-5-one), and poly(2-vinyl-4,4-dimethyl-1 ,3-oxazin-6-one).

21. The material of claim 16 wherein the first polymer layer comprises poly(vinyl-4,4-dimethylazlactone) (PVDMA).

22. The material of claim 16 wherein the second polymer layer comprises a primary amine functionalized polymer, an alcohol functionalized polymer, or a thiol functionalized polymer.

23. The material of claim 16 wherein the second polymer layer comprises an optionally functionalized polymer selected from the group consisting of polyolefins, poly (alkyls), poly(alkenyls), poly(ethers), poly(esters), poly(imides), polyamides, poly(aryls), poly(heterocycles), poly(ethylene imines), poly(urethanes), poly(α,β-unsaturated carboxylic acids), poly(α,β-unsaturated carboxylic acid derivatives), poly(vinyl esters of carboxylic acids), poly (vinyl halides), poly(vinyl alkyl ethers), poly(N-vinyl compounds), poly(vinyl ketones), poly(vinyl aldehydes) and any combination thereof.

24. The material of claim 16 wherein at least a portion of residual functional groups in the one or more bilayers is reacted with an amine, hydroxyl group, thiol group, or hydrazine group having the formula R—$NH_2$ , R—OH, R—SH or R—$NHNH_2$, where R is hydrophilic.

25. The material of claim 16 wherein at least a second portion of residual functional groups in the one or more bilayers is reacted with a hydrophobic amine, an amino sugar, an amino alcohol, an amino polyol, glucamine, dimethylaminopropylamine (DMAPA), or combinations thereof.

26. The material of claim 25 wherein the hydrophobic amine is selected from the group consisting of n-propylamine, n-octylamine, and n-decylamine.

27. The material of claim 16 wherein at least a portion of the residual functional groups in the one or more bilayers is reacted to form chemically labile amide/ester-, amide/thioester-, or amide/imine-type bonds.

28. The material of claim 16 wherein the multilayer polymer film comprises 10 or more PVDMA/PEI bilayers, which are further functionalized with a hydrophobic amine.

29. The material of claim 16 wherein at least 5% of individual monomer units in the one or more bilayers is functionalized with the hydrophilic group.

30. The material of claim 16 wherein the hydrophilic group is glucamine.

31. A superoleophobic material comprising:
a) a substrate; and
b) a multilayer polymer film attached to said substrate, said multilayer film comprising one or more bilayers, wherein each bilayer comprises a first polymer layer covalently linked with a second polymer layer,
wherein at least a portion of residual functional groups in the one or more bilayers is reacted with an amine, hydroxyl group, thiol group, or hydrazine group having the formula R—$NH_2$, R—OH, R—SH or R—$NHNH_2$, where R is hydrophilic, and
wherein said multilayer polymer film attached to said substrate has nanoscale or microscale porosity and is non-wetting to oils when covered with an aqueous liquid.

32. A superoleophobic material comprising:
a) a substrate; and
b) a multilayer polymer film attached to said substrate, said multilayer film comprising one or more bilayers, wherein each bilayer comprises a first polymer layer covalently linked with a second polymer layer,
wherein at least a portion of the residual functional groups in the one or more bilayers is reacted to form chemically labile amide/ester-, amide/thioester-, or amide/imine-type bonds, and
wherein said multilayer polymer film attached to said substrate has nanoscale or microscale porosity and is non-wetting to oils when covered with an aqueous liquid.

33. A method for fabricating an anti-fouling superoleophobic material on a substrate comprising the steps of:
a) exposing the surface of the substrate to a first solution comprising a functionalized first polymer wherein a layer of the first polymer is deposited on at least a portion of the substrate, wherein the first polymer layer comprises a functionalized azlactone polymer;
b) exposing the substrate to a second solution comprising a second polymer wherein the second polymer covalently reacts with the first polymer layer and a layer of the second polymer is deposited on at least a portion of the first polymer layer, thereby forming a bilayer on said substrate, wherein at least a portion of residual functional groups in the bilayers is functionalized with a hydrophilic group, wherein said superoleophobic material attached on said substrate is nanoporous and non-wetting to oils when said substrate is covered with an aqueous liquid.

34. The method of claim 33 wherein steps a) and b) are repeated 10 or more times.

35. The method of claim 33 further comprising a rinsing step comprising exposing or washing the substrate with a rinse solvent or solution each time step a) is performed and each time step b) is performed.

* * * * *